United States Patent
Sugawara et al.

(10) Patent No.: US 11,985,423 B2
(45) Date of Patent: May 14, 2024

(54) IMAGING ELEMENT, IMAGING APPARATUS, OPERATION METHOD OF IMAGING ELEMENT, AND PROGRAM IMPROVING REAL-TIME OUTPUT OF SHAKE DEGREE INFORMATION

(71) Applicant: FUJIFILM CORPORATION, Tokyo (JP)

(72) Inventors: Kazufumi Sugawara, Saitama (JP); Makoto Kobayashi, Saitama (JP); Tomoyuki Kawai, Saitama (JP); Hitoshi Sakurabu, Saitama (JP); Ryo Hasegawa, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 254 days.

(21) Appl. No.: 17/504,505

(22) Filed: Oct. 19, 2021

(65) Prior Publication Data

US 2022/0038631 A1  Feb. 3, 2022

Related U.S. Application Data

(63) Continuation of application No. PCT/JP2020/016901, filed on Apr. 17, 2020.

(30) Foreign Application Priority Data

Apr. 26, 2019 (JP) .................................. 2019-085262

(51) Int. Cl.
*H04N 23/68* (2023.01)
*G02B 7/14* (2021.01)
(Continued)

(52) U.S. Cl.
CPC ............. *H04N 23/683* (2023.01); *G02B 7/14* (2013.01); *G02B 27/646* (2013.01); *G03B 17/14* (2013.01); *H04N 23/685* (2023.01)

(58) Field of Classification Search
CPC .. H04N 23/683; H04N 23/685; H04N 23/672; H04N 25/50; H04N 23/00;
(Continued)

(56) References Cited

U.S. PATENT DOCUMENTS

2011/0149163 A1* 6/2011 Nishi ................... H04N 23/683
 348/E5.022
2016/0006923 A1  1/2016 Imamura
(Continued)

FOREIGN PATENT DOCUMENTS

JP  2009-145852 A  7/2009
JP  2015-222925 A  12/2015
(Continued)

OTHER PUBLICATIONS

International Search Report issued in International Application No. PCT/JP2020/016901 dated Jun. 23, 2020.
(Continued)

*Primary Examiner* — Gevell V Selby
(74) *Attorney, Agent, or Firm* — SOLARIS Intellectual Property Group, PLLC

(57) ABSTRACT

An imaging element incorporates a memory and a processor. The memory stores image data obtained by performing imaging at a first frame rate. The processor is configured to output the image data at a second frame rate. In addition, the processor derives shake degree information indicating a degree of shake included in an image indicated by the image data, using the image data, and outputs the derived shake degree information at a rate greater than or equal to the second frame rate. The first frame rate is a frame rate greater than or equal to the second frame rate.

22 Claims, 31 Drawing Sheets

(51) Int. Cl.
*G02B 27/64* (2006.01)
*G03B 17/14* (2021.01)

(58) Field of Classification Search
CPC ...... H04N 23/687; G02B 7/14; G02B 27/646; G03B 17/14; G03B 2205/0007; G03B 5/00

See application file for complete search history.

(56) References Cited

U.S. PATENT DOCUMENTS

2016/0330372 A1\* 11/2016 Kuriyama .............. H04N 23/68
2016/0360081 A1\* 12/2016 Tsubaki ............... H04N 23/683
2019/0141307 A1\*  5/2019 Youn ....................... H04N 23/62
2019/0394405 A1\* 12/2019 Shibaike .............. H04N 23/667

FOREIGN PATENT DOCUMENTS

JP  2017-188760 A  10/2017
WO  2014/156442 A1  10/2014

OTHER PUBLICATIONS

Written Opinion of the ISA issued in International Application No. PCT/JP2020/016901 dated Jun. 23, 2020.

\* cited by examiner

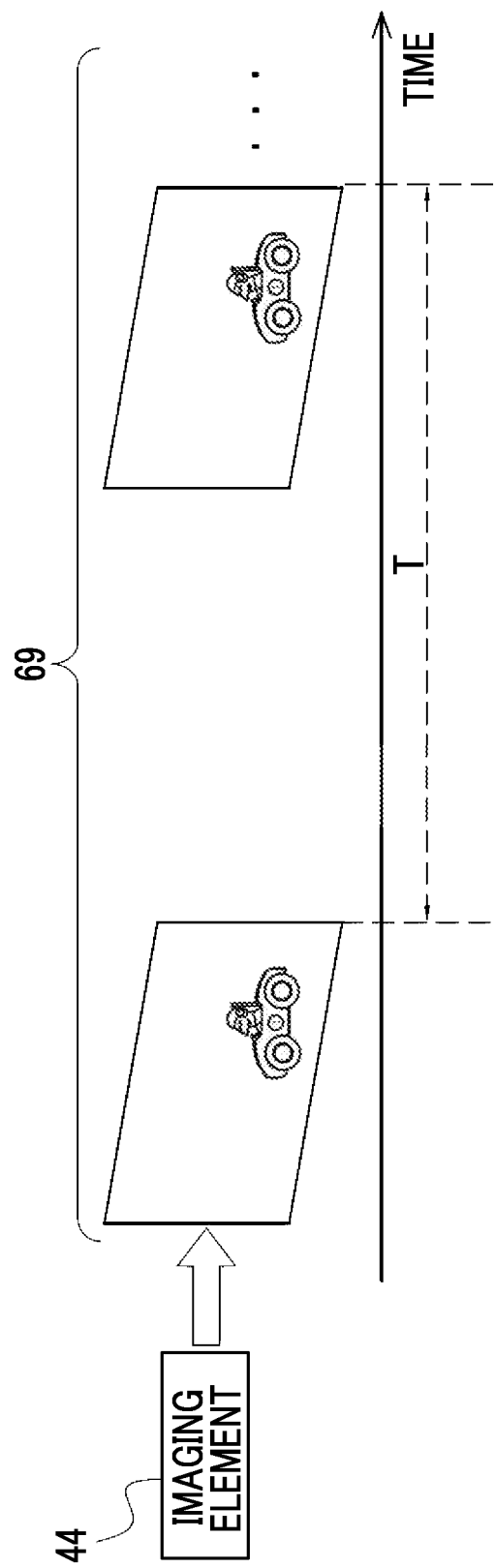

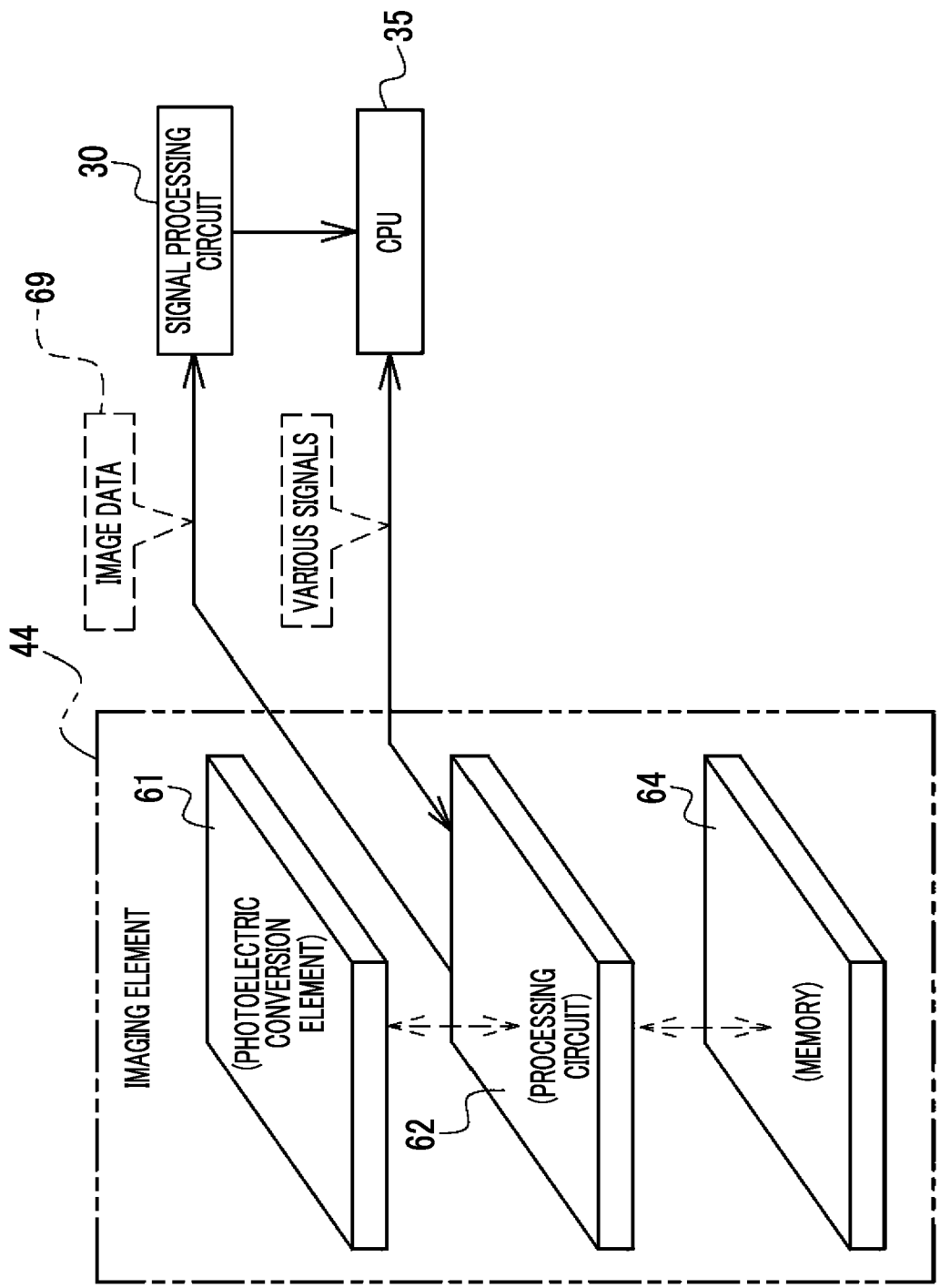

FIG. 11

| TEMPERATURE (°C) | REFERENCE OUTPUT LEVEL (mdps) | CHANGED REFERENCE OUTPUT LEVEL (mdps) | USED REFERENCE OUTPUT LEVEL (mdps) |
|---|---|---|---|
| 20.0 | 500 | | 500 |
| 20.5 | 501 | | 501 |
| 21.0 | 502 | | 502 |
| 21.5 | 503 | | 503 |
| 22.0 | 504 | | 504 |
| 22.5 | 505 | | 505 |
| 23.0 | 506 | 510 | 510 |
| 23.5 | 507 | 511 | 511 |
| 24.0 | 508 | 512 | 512 |
| 24.5 | 509 | 513 | 513 |
| 25.0 | 510 | 514 | 514 |
| 25.5 | 511 | 515 | 515 |
| 26.0 | 512 | 516 | 516 |
| 26.5 | 513 | | 513 |
| 27.0 | 514 | | 514 |

62C1

FIG. 16
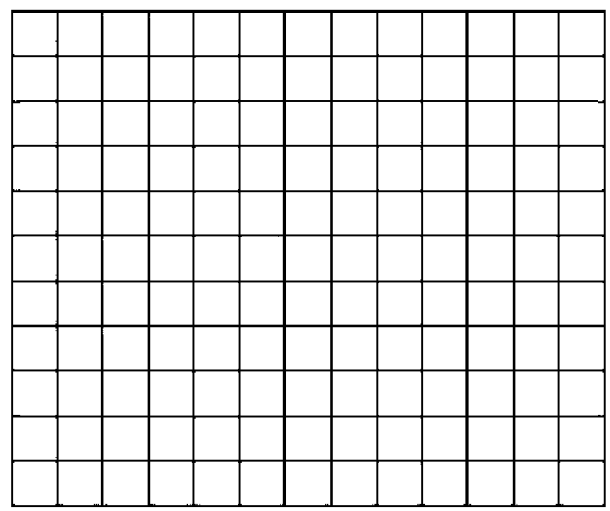
[STILL PICTURE IMAGE]
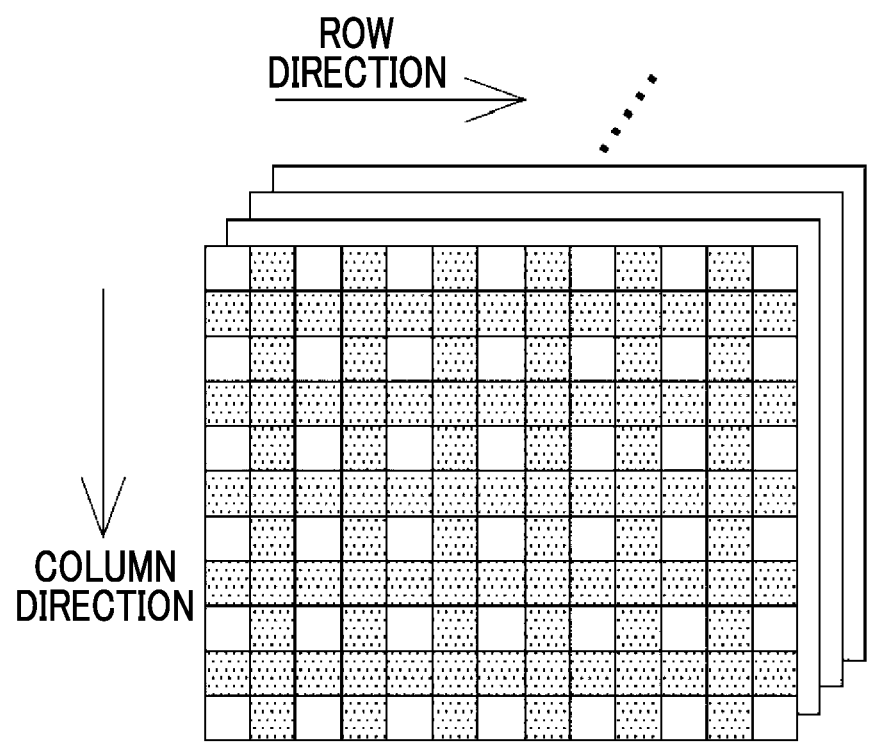
[LIVE VIEW IMAGE]

IMAGING ELEMENT, IMAGING APPARATUS, OPERATION METHOD OF IMAGING ELEMENT, AND PROGRAM IMPROVING REAL-TIME OUTPUT OF SHAKE DEGREE INFORMATION

CROSS-REFERENCE TO RELATED APPLICATIONS

This application is a continuation application of International Application No. PCT/JP2020/016901, filed Apr. 17, 2020, the disclosure of which is incorporated herein by reference in its entirety. Further, this application claims priority from Japanese Patent Application No. 2019-085262, filed Apr. 26, 2019, the disclosure of which is incorporated by reference herein in its entirety.

BACKGROUND

1. Technical Field

The technology of the present disclosure relates to an imaging element, an imaging apparatus, an operation method of an imaging element, and a program.

2. Description of the Related Art

JP2017-188760A discloses a laminated imaging element in which a memory substrate and a signal processing substrate are laminated. The memory substrate includes a memory such as a dynamic random access memory (DRAM) that temporarily stores a pixel signal output by a pixel substrate. The signal processing substrate executes various types of signal processing on the pixel signal stored in the memory substrate. In the laminated imaging element disclosed in JP2017-188760A, in a case where a moving object is detected in the pixel signal by an analysis portion included in the signal processing substrate, signal processing is executed by a signal processing portion included in the signal processing substrate.

JP2015-222925A discloses a shake correction device. The shake correction device disclosed in JP2015-222925A comprises a shake detection unit, a movement vector detection unit, a first shake correction unit, a second shake correction unit, a first shake correction control unit, and a second shake correction control unit.

In the shake correction device disclosed in JP2015-222925A, the shake detection unit detects a shake based on angular velocity information and generates a shake signal. In imaging a subject in a first imaging mode by the imaging element, the movement vector detection unit detects a movement vector based on an imaging signal generated by imaging the subject in a second imaging mode. The first shake correction unit optically corrects the shake of a subject image. The second shake correction unit electronically corrects the shake of the subject image. The first shake correction control unit decides a first correction amount with which the shake of the subject image is corrected, based on the shake signal and corrects the shake of the subject image by controlling the first shake correction unit in accordance with the first correction amount. The second shake correction control unit decides a second correction amount with which the shake of the subject image is corrected, based on the movement vector and corrects the shake of the subject image by controlling the second shake correction unit in accordance with the second correction amount.

In the shake correction device disclosed in JP2015-222925A, in the first imaging mode, the first shake correction control unit and the second shake correction control unit correct the shake of the subject image, and the first shake correction control unit corrects the shake of the subject image in accordance with the first correction amount and the second correction amount.

SUMMARY

An embodiment according to the technology of the present disclosure provides an imaging element, an imaging apparatus, an operation method of an imaging element, and a program capable of improving real-timeness of output of shake degree information with respect to output of image data, compared to a case where the shake degree information is output at a time interval longer than a period defined by an output frame rate of the image data.

A first aspect according to the technology of the present disclosure is an imaging element comprising a storage portion that stores image data obtained by performing imaging at a first frame rate and is incorporated in the imaging element, a processing portion that processes the image data and is incorporated in the imaging element, a first output portion that outputs the image data processed by the processing portion at a second frame rate and is incorporated in the imaging element, and a second output portion that outputs shake degree information indicating a degree of shake included in an image indicated by the image data and is incorporated in the imaging element, in which the processing portion derives the shake degree information using the image data, the second output portion outputs the shake degree information derived by the processing portion at a rate greater than or equal to the second frame rate, and the first frame rate is a frame rate greater than or equal to the second frame rate.

A second aspect according to the technology of the present disclosure is the imaging element according to the first aspect, in which a resolution of the image data used by the processing portion is higher than a resolution of the image data output by the first output portion.

A third aspect according to the technology of the present disclosure is the imaging element according to the first aspect, in which a resolution of the image data used by the processing portion is a maximum resolution.

A fourth aspect according to the technology of the present disclosure is the imaging element according to any one of the first to third aspects, in which the image data used by the processing portion is partial image data indicating a partial image.

A fifth aspect according to the technology of the present disclosure is the imaging element according to the fourth aspect, further comprising a photosensitive pixel group, in which the partial image data is image data obtained from a region of the photosensitive pixel group in which a focused state is set.

A sixth aspect according to the technology of the present disclosure is the imaging element according to the fifth aspect, in which the region in which the focused state is set is a region in which the focused state is continuously maintained in an operation mode in which the focused state is continuously maintained.

A seventh aspect according to the technology of the present disclosure is the imaging element according to the fifth or sixth aspect, in which the photosensitive pixel group includes a plurality of phase difference pixels, and the region in which the focused state is set is specified by the processing portion from the photosensitive pixel group based on pixel data of a phase difference pixel of at least a part of the plurality of phase difference pixels.

An eighth aspect according to the technology of the present disclosure is the imaging element according to any one of the first to seventh aspects, in which the image data is time series data obtained by performing imaging at the first frame rate.

A ninth aspect according to the technology of the present disclosure is the imaging element according to the eighth aspect, in which first frame data related to a part of frames of the time series data is output by the first output portion, and second frame data related to the remaining frames is used for deriving the shake degree information by the processing portion.

A tenth aspect according to the technology of the present disclosure is the imaging element according to the ninth aspect, in which the second frame data is frame data indicating a plurality of frames, and the processing portion derives the shake degree information for each periodically determined frame based on the second frame data.

An eleventh aspect according to the technology of the present disclosure is the imaging element according to the tenth aspect, in which the periodically determined frames are frames determined at a time interval that is longer than a period defined by the first frame rate and less than or equal to a period defined by the second frame rate.

A twelfth aspect according to the technology of the present disclosure is the imaging element according to any one of the first to eleventh aspects, in which at least a photoelectric conversion element and the storage portion are formed in one chip.

A thirteenth aspect according to the technology of the present disclosure is the imaging element according to the twelfth aspect, in which the imaging element is a laminated imaging element in which the photoelectric conversion element is laminated with the storage portion.

A fourteenth aspect according to the technology of the present disclosure is an imaging apparatus comprising the imaging element according to any one of the first to thirteenth aspects, a vibration sensor that detects an exerted vibration, and a correction portion that corrects the shake based on vibration data output from the vibration sensor and the shake degree information output from the second output portion.

A fifteenth aspect according to the technology of the present disclosure is the imaging apparatus according to the fourteenth aspect, in which the processing portion derives the shake degree information based on the image data in which the shake is corrected by the correction portion, the imaging apparatus further includes a rear stage circuit that receives the shake degree information output from the second output portion, the rear stage circuit performs a control for causing the correction portion to correct the shake, using the vibration data and a reference output level of the vibration sensor, and the rear stage circuit changes the reference output level in accordance with the shake degree information output from the second output portion.

A sixteenth aspect according to the technology of the present disclosure is the imaging apparatus according to the fourteenth aspect, in which the processing portion derives the shake degree information based on the image data in which the shake is corrected by the correction portion, the imaging element further includes a correction control portion that performs the control for causing the correction portion to correct the shake, using the vibration data and the reference output level of the vibration sensor, and the correction control portion changes the reference output level in accordance with the shake degree information output from the second output portion.

A seventeenth aspect according to the technology of the present disclosure is the imaging apparatus according to the fifteenth or sixteenth aspect, in which a changed amount of the reference output level is restricted within a range that does not exceed a degree of reduction of the number of pixels of the image data used by the processing portion.

An eighteenth aspect according to the technology of the present disclosure is the imaging apparatus according to any one of the fifteenth to seventeenth aspects, in which the image data is time series data obtained by performing imaging at the first frame rate, first frame data related to a part of frames of the time series data is output by the first output portion, second frame data related to the remaining frames of the time series data is frame data indicating a plurality of frames and is used for deriving the shake degree information by the processing portion for each periodically determined frame, and the plurality of frames are frames that are obtained by reflecting the reference output level after change on correction of the shake by the correction portion each time the reference output level is changed.

A nineteenth aspect according to the technology of the present disclosure is the imaging apparatus according to any one of the fourteenth to eighteenth aspects, in which the correction portion optically corrects the shake.

A twentieth aspect according to the technology of the present disclosure is the imaging apparatus according to any one of the fourteenth to nineteenth aspects, further comprising a control portion that performs at least one of a control for storing the image data output from the first output portion in a storage device or a control for displaying an image based on the image data output from the first output portion on a display device.

A twenty-first aspect according to the technology of the present disclosure is an operation method of an imaging element incorporating a storage portion that stores image data obtained by performing imaging at a first frame rate, a processing portion that processes the image data, a first output portion that outputs the image data processed by the processing portion at a second frame rate, and a second output portion, the operation method comprising, by the processing portion, deriving shake degree information indicating a degree of shake included in an image indicated by the image data, using the image data, and by the second output portion, outputting the shake degree information derived by the processing portion at a rate greater than or equal to the second frame rate, in which the first frame rate is a frame rate greater than or equal to the second frame rate.

A twenty-second aspect according to the technology of the present disclosure is a program causing a computer to function as a processing portion, a first output portion, and a second output portion included in an imaging element incorporating a storage portion that stores image data obtained by performing imaging at a first frame rate, the processing portion that processes the image data, the first output portion that outputs the image data processed by the processing portion at a second frame rate, and the second output portion, in which the processing portion derives shake degree information indicating a degree of shake included in an image indicated by the image data, using the image data, the second output portion outputs the shake degree information derived by the processing portion at a rate greater than or equal to the second frame rate, and the first frame rate is a frame rate greater than or equal to the second frame rate.

BRIEF DESCRIPTION OF THE DRAWINGS

Exemplary embodiments of the technology of the disclosure will be described in detail based on the following figures, wherein:

FIG. 3B is a conceptual diagram for describing an output frame rate of the imaging element included in the imaging apparatus according to the first and second embodiments;

FIG. 4 is a block diagram illustrating an example of a laminated structure of the imaging element according to the first embodiment, and an example of a connection relationship among the imaging element, a signal processing portion, and a CPU;

FIG. 11 is a conceptual diagram illustrating an example of a configuration of a reference output table stored in a storage circuit included in the imaging element according to the first embodiment;

FIG. 16 is a conceptual diagram illustrating an example of a still picture image indicated by still picture image data generated as actual image data by an actual image data generation portion of a processing portion included in the control circuit according to the first embodiment, and an example of a live view image indicated by live view image data generated as the actual image data by the actual image data generation portion;

DETAILED DESCRIPTION

Hereinafter, an example of embodiments of an imaging element, an imaging apparatus, an operation method of an imaging element, and a program according to the embodiments of the technology of the present disclosure will be described in accordance with the appended drawings.

First, meanings of terms used in the following description will be described.

The abbreviation CPU stands for "Central Processing Unit". The abbreviation GPU stands for "Graphics Processing Unit". The abbreviation RAM stands for "Random Access Memory". The abbreviation ROM stands for "Read Only Memory". The abbreviation DRAM stands for "Dynamic Random Access Memory". The abbreviation SRAM stands for "Static Random Access Memory".

The abbreviation LSI stands for "Large-Scale Integration". The abbreviation ASIC stands for "Application Specific Integrated Circuit". The abbreviation PLD stands for "Programmable Logic Device". The abbreviation FPGA stands for "Field-Programmable Gate Array".

The abbreviation SSD stands for "Solid State Drive". The abbreviation USB stands for "Universal Serial Bus". The abbreviation HDD stands for "Hard Disk Drive". The abbreviation EEPROM stands for "Electrically Erasable and Programmable Read Only Memory".

The abbreviation CCD stands for "Charge Coupled Device". The abbreviation CMOS stands for "Complementary Metal Oxide Semiconductor". The abbreviation EL stands for "Electro-Luminescence". The abbreviation A/D stands for "Analog/Digital". The abbreviation I/F stands for "Interface". The abbreviation UI stands for "User Interface". The abbreviation PC stands for "Personal Computer". The abbreviation AF stands for "Auto-Focus". The abbreviation AE stands for "Automatic Exposure". The abbreviation SoC stands for "System-on-a-chip".

The abbreviation OIS stands for "Optical Image Stabilization". The abbreviation BIS stands for "Body Image Stabilization". The abbreviation EIS stands for "Electronic Image Stabilization".

First Embodiment According to Technology of Present Disclosure

Figure 1:
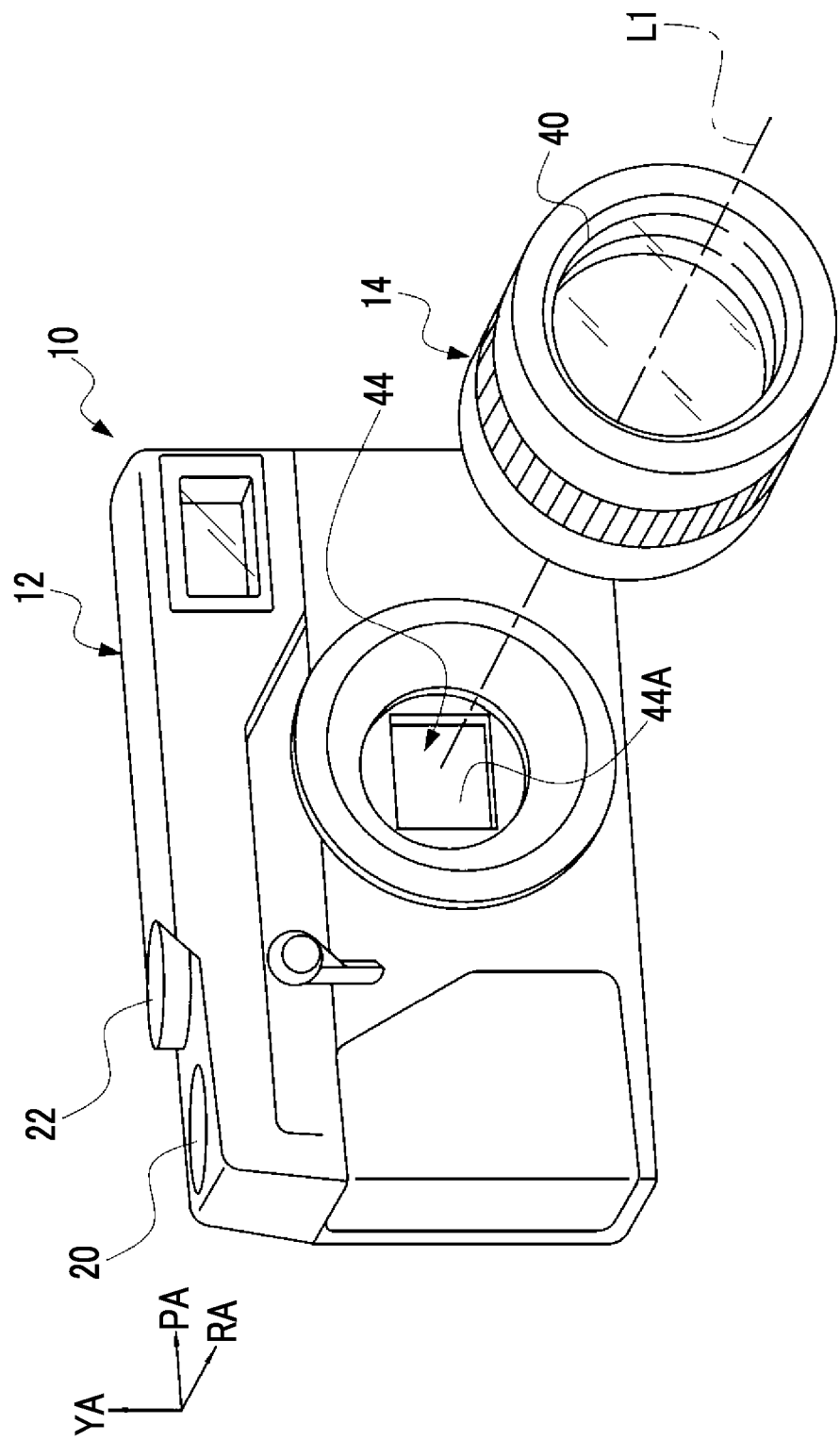
FIG. 1 is a perspective view illustrating an example of an exterior of an imaging apparatus according to first and second embodiments.

As illustrated in FIG. 1 as an example, an imaging apparatus 10 is an interchangeable lens camera. The imaging apparatus 10 comprises an imaging apparatus main body 12 and an interchangeable lens 14 that is interchangeably mounted on the imaging apparatus main body 12.

An imaging element 44 is disposed in the imaging apparatus main body 12. The interchangeable lens 14 includes an imaging lens 40. In a case where the interchangeable lens 14 is mounted on the imaging apparatus main body 12, subject light showing a subject is transmitted through the imaging lens 40, and an image of the subject light is formed on an imaging surface 44A of the imaging element 44.

A release button 20 and a dial 22 are disposed on an upper surface of the imaging apparatus main body 12. The dial 22 is operated in a case of setting an operation mode of an imaging system, an operation mode of a playback system, and the like. The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (hereinafter, referred to as a "half push position") from a standby position, and the imaging instruction state refers to a state where a push is performed to a final push position (hereinafter, referred to as a "full push position") exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, a display motion picture imaging mode and a recording imaging mode are selectively set as an operation mode in accordance with an instruction of a user. In each of the display motion picture imaging mode and the recording imaging mode, an AF mode is set in accordance with the instruction of the user.

In the display motion picture imaging mode, in a case where the AF mode is set, imaging for a display motion picture image is performed by setting an exposure state by performing an AE function and performing a focusing control by performing an AF function for each frame. A live view image is generated by performing imaging for the display motion picture image. Generally, the live view image is also referred to as a live preview image.

The recording imaging mode is broadly divided into a motion picture image recording imaging mode and a still picture image recording imaging mode. The motion picture image recording imaging mode and the still picture image recording imaging mode are selectively set in accordance with the instruction of the user. In the imaging apparatus 10, in the motion picture image recording imaging mode, in a case where the AF mode is set, imaging for a recording motion picture image is performed by setting the exposure state by performing the AE function and performing the focusing control by performing the AF function for each frame. A motion picture image obtained by performing the imaging for the recording motion picture image has a higher resolution than the live view image and is stored in a predetermined storage device such as a memory card, a USB memory, an SSD, or an HDD (hereinafter, simply referred to as the "predetermined storage device"). The predetermined storage device is an example of a "storage device" according to the embodiments of the technology of the present disclosure.

In the still picture image recording imaging mode, in a case where the AF mode is set, an imaging condition is adjusted by setting the release button 20 to the half push state. Then, in a case where the full push state is subsequently set, imaging for a still picture image is performed. That is, by setting the release button 20 to the half push state, the exposure state is set by performing the AE function, and then, the focusing control is performed by performing the AF function. In a case where the release button 20 is set to the full push state, imaging for a recording still picture image is performed. A still picture image obtained by performing the imaging for the recording still picture image is stored in the predetermined storage device.

In the imaging apparatus 10, the AF mode is broadly divided into a normal AF mode and a continuous AF mode. The normal AF mode and the continuous AF mode are selectively set in accordance with the instruction of the user. The normal AF mode is the AF mode in which the focusing control is performed in a state where a position of a focal point is fixed during the half push state. The continuous AF mode is the AF mode in which a focused state for the designated subject is continuously maintained without fixing the position of the focal point during the half push state.

Figure 2:
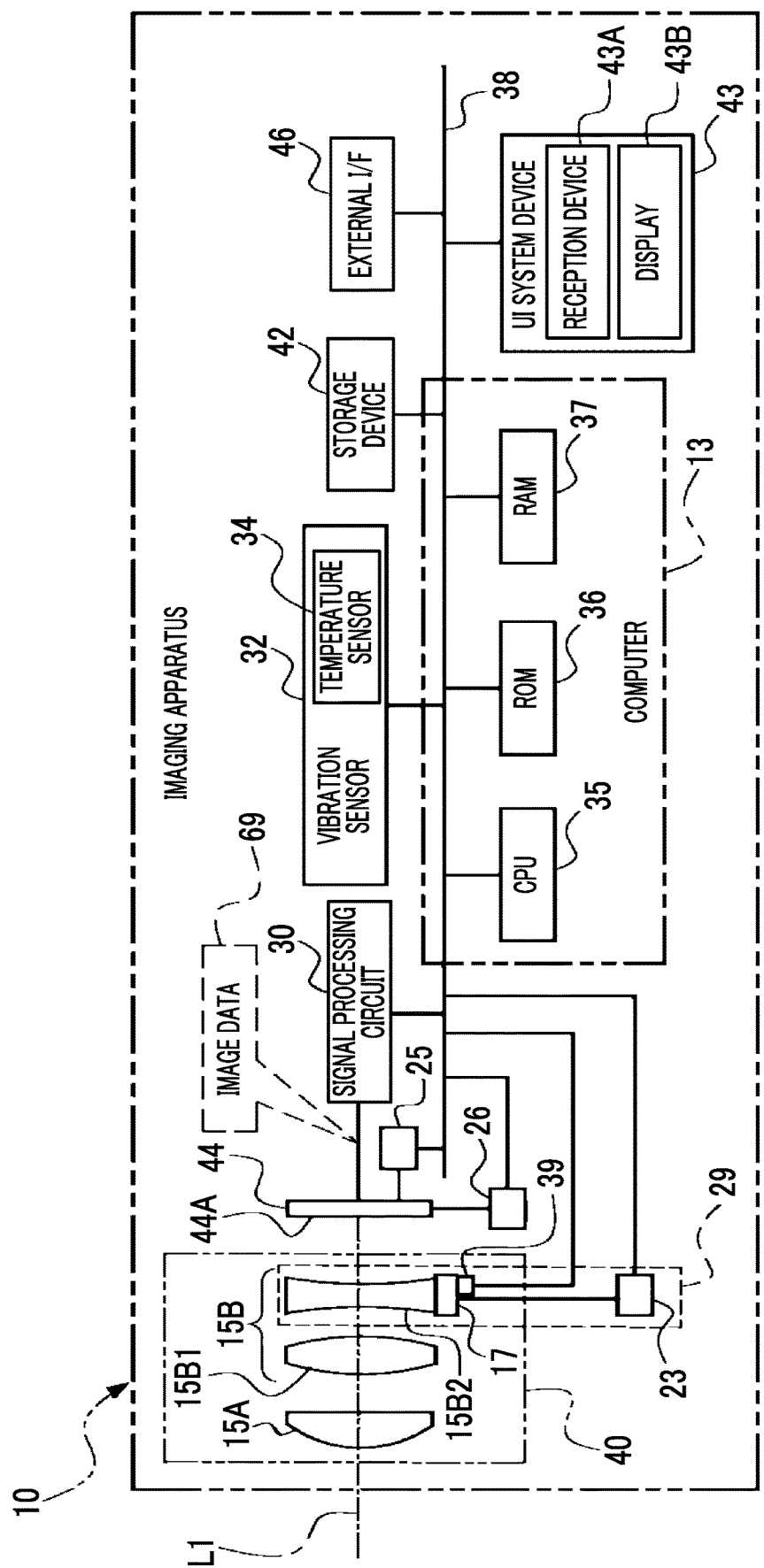
FIG. 2 is a block diagram illustrating an example of a configuration of the imaging apparatus according to the first embodiment.

As illustrated in FIG. 2 as an example, the imaging apparatus 10 comprises a computer 13, drivers 23 and 26, a communication I/F 25, a signal processing circuit 30, a vibration sensor 32, a position detection sensor 39, a storage device 42, an external I/F 46, and a UI system device 43.

The computer 13 comprises a CPU 35, a ROM 36, and a RAM 37. The CPU 35, the ROM 36, and the RAM 37 are connected to each other through a busline 38. In addition, the drivers 23 and 26, the communication I/F 25, the signal processing circuit 30, the vibration sensor 32, the position detection sensor 39, the storage device 42, the external I/F 46, and the UI system device 43 are connected to the busline 38.

The CPU 35 controls the entire imaging apparatus 10. The ROM 36 stores various programs. The CPU 35 reads out the various programs from the ROM 36 and loads the read various programs into the RAM 37. The CPU 35 controls the entire imaging apparatus 10 in accordance with the various programs loaded in the RAM 37.

The storage device 42 is a non-volatile storage device such as an SSD, an HDD, or an EEPROM. The CPU 35 reads out and writes various types of information in the storage device 42.

The external I/F 46 is a communication device including an FPGA. The predetermined storage device is connected to the external I/F 46. The CPU 35 reads out and writes various types of information in the predetermined storage device through the external I/F 46. In addition, an operation apparatus such as a PC or a server is connected to the external I/F 46. The external I/F 46 exchanges various types of information between the CPU 35 and the operation apparatus.

The UI system device 43 is a device that receives the instruction from the user or presents information to the user. The UI system device 43 comprises a reception device 43A and a display 43B. A liquid crystal display is exemplified as an example of the display 43B. Instead of the liquid crystal display, the display 43B may be a display of other types such as an organic EL display. The display 43B displays various images such as the live view image and the still picture image and also text information under control of the CPU 35. The display 43B is an example of a "display device" according to the embodiments of the technology of the present disclosure. In addition, the CPU 35 is an example of a "control portion (control processor)" according to the embodiments of the technology of the present disclosure.

The reception device 43A comprises a hard key portion, a touch panel, and the like. The hard key portion includes a plurality of hard keys including the release button 20 (refer to FIG. 1) and the dial 22 (refer to FIG. 1). The touch panel is a transmissive touch panel and is overlaid on a surface of a display region of the display 43B. The touch panel detects a contact of an instruction object such as a finger or a stylus pen. The CPU 35 operates in accordance with various instructions received by the reception device 43A.

The vibration sensor 32 is a device including a gyro sensor and detects a vibration exerted on the imaging apparatus 10. For example, a vibration exerted on the imaging apparatus 10 by the user holding the imaging apparatus 10, a vibration caused by a wind to the imaging apparatus 10 installed on a support table such as a tripod, and a vibration exerted from a vehicle are exemplified as the vibration exerted on the imaging apparatus 10.

The gyro sensor detects a rotation amount about each axis (refer to FIG. 1) of a pitch axis PA, a yaw axis YA, and a roll axis RA (axis parallel to an optical axis L1). The vibration sensor 32 detects the vibration of the imaging apparatus 10 by converting the rotation amount about the pitch axis PA and the rotation amount about the yaw axis YA detected by the gyro sensor into a displacement amount in a two-dimensional plane parallel to the pitch axis PA and the yaw axis YA. The vibration sensor 32 outputs vibration data indicating the detected vibration to the CPU 35. A meaning of being parallel in the first embodiment according to the technology of the present disclosure includes a meaning of being completely parallel and also a meaning of being approximately parallel including an error allowed in design and manufacturing.

The imaging lens 40 comprises an objective lens 15A and a lens group 15B. The imaging element 44 is positioned on a rear stage of the imaging lens 40. The objective lens 15A and the lens group 15B are arranged in an order of the objective lens 15A and the lens group 15B along the optical axis L1 from a subject side to an imaging element 44 side.

The vibration sensor 32 incorporates a temperature sensor 34. The temperature sensor 34 measures a temperature in the vibration sensor 32 and outputs temperature data indicating the measured temperature to the CPU 35.

The communication I/F 25, the driver 26, and the signal processing circuit 30 are connected to the imaging element 44. The communication I/F 25 is a communication device including an FPGA and exchanges various signals between the CPU 35 and the imaging element 44. The driver 26 supplies a timing control signal to the imaging element 44 under control of the CPU 35. For example, the timing control signal refers to a vertical synchronization signal and a horizontal synchronization signal. The vertical synchronization signal is a signal for defining a timing at which imaging of one frame is started. The horizontal synchronization signal is a signal for defining a timing at which imaging of one horizontal line is started.

The signal processing circuit 30 is a device including an ASIC. Image data 69 obtained by imaging the subject by the imaging element 44 is input into the signal processing circuit 30. The image data 69 is data indicating an image of the subject. The signal processing circuit 30 performs various types of signal processing on the image data 69 input from the imaging element 44. The various types of signal processing include well-known signal processing such as white balance adjustment, sharpness adjustment, gamma correction, color space conversion processing, and color difference correction.

While the device including the ASIC is illustrated as the signal processing circuit 30 in the first embodiment according to the technology of the present disclosure, the technology of the present disclosure is not limited thereto. The signal processing circuit 30 may be a device including an ASIC, an FPGA, and/or a PLD. In addition, the signal processing circuit 30 may be a computer including a CPU, a ROM, and a RAM. The number of CPUs may be singular or plural. In addition, the signal processing circuit 30 may be implemented by a combination of a hardware configuration and a software configuration.

The imaging lens 40 comprises the objective lens 15A and the lens group 15B. The objective lens 15A and the lens group 15B are arranged in an order of the objective lens 15A and the lens group 15B along the optical axis L1 from the subject side to an imaging surface 44A side.

A movable stop (not illustrated) and a mechanical shutter (not illustrated) are arranged between the lens group 15B and the imaging element 44. The stop and the mechanical shutter are arranged in an order of the stop and the mechanical shutter along the optical axis L1 from a lens group 15B side to the imaging element 44 side. The stop operates by receiving motive power from a driving source (not illustrated) such as a motor. Operating the stop changes an opening degree of the stop. Accordingly, exposure is adjusted. The mechanical shutter operates by receiving motive power from a driving source (not illustrated) such as a motor. The subject light is transmitted through the imaging lens 40, and the image of the subject light is formed on the imaging surface 44A through the mechanical shutter.

The lens group 15B includes a focus lens 15B1, a zoom lens (not illustrated), and a vibration-proof lens 15B2. The focus lens 15B1, the zoom lens, and the vibration-proof lens 15B2 are arranged in an order of the focus lens 15B1, the zoom lens, and the vibration-proof lens 15B2 along the optical axis L1 from an objective lens 15A side to the imaging element 44 side.

The focus lens 15B1 and the zoom lens move along the optical axis L1 in response to the provided motive power. The vibration-proof lens 15B2 changes in a direction perpendicular to an optical axis of the vibration-proof lens 15B2. A meaning of being perpendicular in the first embodiment according to the technology of the present disclosure includes a meaning of being completely perpendicular and also a meaning of being approximately perpendicular including an error allowed in design and manufacturing.

In the AF mode, by moving the focus lens 15B1 along the optical axis L1 under control of the CPU 35, the image of the subject light is formed on the imaging surface 44A at a focal position corresponding to a subject distance. The "focal position" here refers to a position of the focus lens 15B1 on the optical axis L1 in an in-focus state. Hereinafter, for convenience of description, a control for aligning the focus lens 15B1 to the focal position will be referred to as an "AF control".

In the imaging apparatus 10, a shake occurs due to the vibration exerted on the imaging apparatus 10 (hereinafter, simply referred to as the "vibration"). In the first embodiment according to the technology of the present disclosure, the "shake" refers to a phenomenon in which the subject image obtained by forming the image on the imaging surface 44A changes by inclination of the optical axis L1 with respect to a reference axis due to the vibration. For example, the "reference axis" here refers to the optical axis L1 in a state where the vibration is not exerted. An optical image and an electronic image (image) are exemplified as the subject image. The subject image changes by a change in positional relationship between the optical axis L1 and the imaging surface 44A.

The imaging apparatus 10 comprises an optical shake correction portion 29 for correcting a shift. The optical shake correction portion 29 is an example of a "correction portion" according to the embodiments of the technology of the present disclosure. Here, the "correction portion" can be replaced with a "correction device", a "correction mechanism", an "optical correction device", or an "optical correction mechanism". The optical shake correction portion 29 operates under control of the CPU 35, described later, and optically corrects the shake based on the vibration data output from the vibration sensor 32. In the first embodiment according to the technology of the present disclosure, "correction of the shake" includes a meaning of removing the shake and also a meaning of reducing the shake.

For convenience of description, the following description assumes that the shake is corrected by the optical shake correction portion 29 to an extent that the shake that occurs due to the vibration exerted on the imaging apparatus 10 is not visually perceived from the image obtained by imaging the subject by the imaging apparatus 10.

The optical shake correction portion 29 comprises the vibration-proof lens 15B2, an actuator 17, the driver 23, and the position detection sensor 39. Various well-known methods can be employed as a method of correcting the shake by the optical shake correction portion 29. In the first embodiment according to the technology of the present disclosure, the OIS is employed as the method of correcting the shake. The OIS refers to a method of correcting the shake by moving the vibration-proof lens 15B2 based on the vibration data obtained by detecting the vibration by the vibration sensor 32 (described later). Specifically, the shake is corrected by moving the vibration-proof lens 15B2 in a direction of canceling the shake by an amount with which the shake is canceled.

The actuator 17 is attached to the vibration-proof lens 15B2. The actuator 17 is a shift mechanism in which a coil motor is mounted, and changes the vibration-proof lens 15B2 in the direction perpendicular to the optical axis of the vibration-proof lens 15B2 by driving the coil motor. Here, while the shift mechanism in which the coil motor is mounted is illustrated as the actuator 17, the technology of the present disclosure is not limited thereto. Other motive power sources such as a stepping motor or a piezo element may be applied instead of the coil motor.

The actuator 17 is controlled by the driver 23. Driving the actuator 17 under control of the driver 23 mechanically changes a position of the vibration-proof lens 15B2 with respect to the optical axis L1.

The position detection sensor 39 detects the current position of the vibration-proof lens 15B2 and outputs a position signal indicating the detected current position. Here, a device including a hall element is employed as an example of the position detection sensor 39. Here, the current position of the vibration-proof lens 15B2 refers to the current position in a two-dimensional plane of the vibration-proof lens. The two-dimensional plane of the vibration-proof lens refers to a two-dimensional plane perpendicular to the optical axis of the vibration-proof lens 15B2. Here, while the device including the hall element is employed as an example of the position detection sensor 39, the technology of the present disclosure is not limited thereto. A magnetic sensor, a photosensor, or the like may be employed instead of the hall element.

The imaging element 44 is an example of a "laminated imaging element" according to the embodiments of the technology of the present disclosure. In the first embodiment according to the technology of the present disclosure, the imaging element 44 is a CMOS image sensor. In addition, while the CMOS image sensor is illustrated here as the imaging element 44, the technology of the present disclosure is not limited thereto. For example, the technology of the present disclosure is also established in a case where the imaging element 44 is a CCD image sensor.

Figure 3A:
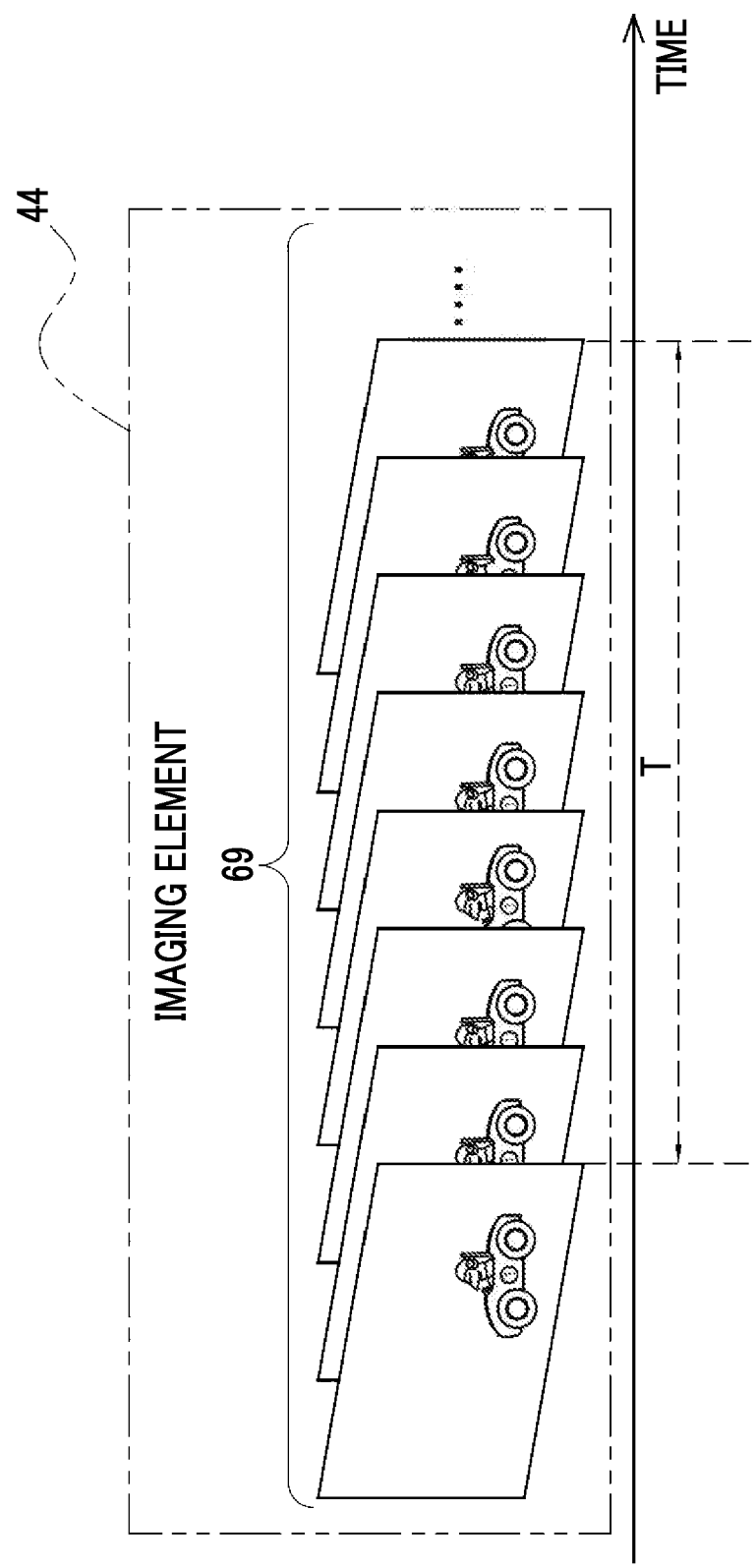
FIG. 3A is a conceptual diagram for describing an imaging frame rate of an imaging element included in the imaging apparatus according to the first and second embodiments.

In the imaging element 44, as illustrated in FIG. 3A as an example, a plurality of pieces of image data 69 each indicating the image of the subject are generated by imaging the subject at an imaging frame rate. In addition, in the imaging element 44, the generated plurality of pieces of image data 69 are output at an output frame rate. Any of the imaging frame rate and the output frame rate is a variable frame rate. The imaging frame rate is an example of a "first frame rate" according to the embodiments of the technology of the present disclosure, and the output frame rate is an example of a "second frame rate" according to the embodiments of the technology of the present disclosure.

The imaging frame rate and the output frame rate have a relationship of "imaging frame rate > output frame rate". That is, the imaging frame rate is a frame rate higher than the output frame rate and is defined by the vertical synchronization signal that is one type of timing control signal. As illustrated in FIG. 3A as an example, the imaging frame rate is a frame rate at which imaging of eight frames is performed within a period T, and the output frame rate is a frame rate at which two frames are output within the period T as illustrated in FIG. 3B. Specifically, 240 frames per second (fps) is exemplified as an example of the imaging frame rate, and 60 fps is exemplified as an example of the output frame rate. Here, while an example of a form in which the imaging frame rate and the output frame rate have a relationship of "imaging frame rate >output frame rate" is illustratively described, the technology of the present disclosure is also established in a case of "imaging frame rate=output frame rate".

As illustrated in FIG. 4 as an example, the imaging element 44 incorporates a photoelectric conversion element 61, a processing circuit 62, and a memory 64. Here, the processing circuit 62 is an example of a "processor" according to the embodiments of the technology of the present disclosure, and the memory 64 is an example of a "storage portion (memory)" according to the embodiments of the technology of the present disclosure. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. While a three-layer structure of the photoelectric conversion element 61, the processing circuit 62, and the memory 64 is illustrated here, the technology of the present disclosure is not limited thereto. A two-layer structure of the photoelectric conversion element 61 and a memory layer in which the processing circuit 62 and the memory 64 are formed in one layer may be used. Alternatively, a two-layer structure of the memory 64 and a processor layer in which the processing circuit 110 and the photoelectric conversion elements 42 are formed in one layer may be used. In addition, the processing circuit 62 may incorporate the memory 64.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is a device including an ASIC and an FPGA and controls the entire imaging element 44 in accordance with an instruction of the CPU 35. While an example of implementing the processing circuit 62 by the device including the ASIC and the FPGA is exemplified here, the technology of the present disclosure is not limited thereto. For example, a device including an ASIC, an FPGA, and/or a PLD may be used. In addition, a computer including a CPU, a ROM, and a RAM may be employed as the processing circuit 62. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are exemplified as an example of the plurality of photodiodes.

Color filters are arranged in each photodiode included in the photoelectric conversion element 61. The color filters include a G filter corresponding to green (G) that most contributes to obtaining a brightness signal, an R filter corresponding to red (R), and a B filter corresponding to blue (B). The photoelectric conversion element 61 includes R pixels, G pixels, and B pixels (refer to FIG. 5). The R pixels are pixels corresponding to photodiodes in which the R filter is arranged. The G pixels are pixels corresponding to photodiodes in which the G filter is arranged. The B pixels are pixels corresponding to photodiodes in which the B filter is arranged.

The imaging element 44 has a so-called electronic shutter function and controls an electric charge accumulation time period of each photodiode in the photoelectric conversion element 61 by performing the electronic shutter function under control of the CPU 35. The electric charge accumulation time period refers to a so-called shutter speed.

In the imaging apparatus 10, the imaging for the still picture image and imaging for the motion picture image are performed using a rolling shutter method. While the rolling shutter method is illustrated here, the technology of the present disclosure is not limited thereto. A global shutter method may be applied instead of the rolling shutter method.

The processing circuit 62 reads out the image data 69 obtained by imaging the subject by the photoelectric conversion element 61. The image data 69 is signal electric charges accumulated in the photoelectric conversion element 61. The processing circuit 62 performs A/D conversion on the analog image data 69 read out from the photoelectric conversion element 61. The processing circuit 62 stores the digital image data 69 obtained by performing the A/D conversion on the analog image data 69 in the memory 64. The memory 64 comprises a plurality of storage regions. For example, each of the plurality of storage regions stores the digital image data 69 at addresses corresponding to the pixels of the photoelectric conversion element 61 in units of pixels for each frame. In addition, the plurality of storage regions are randomly accessed by the processing circuit 62.

The processing circuit 62 is connected to the CPU 35 and the signal processing circuit 30. The processing circuit 62 exchanges various signals with the CPU 35. In addition, the processing circuit 62 outputs the digital image data 69 to the signal processing circuit 30.

Figure 5:
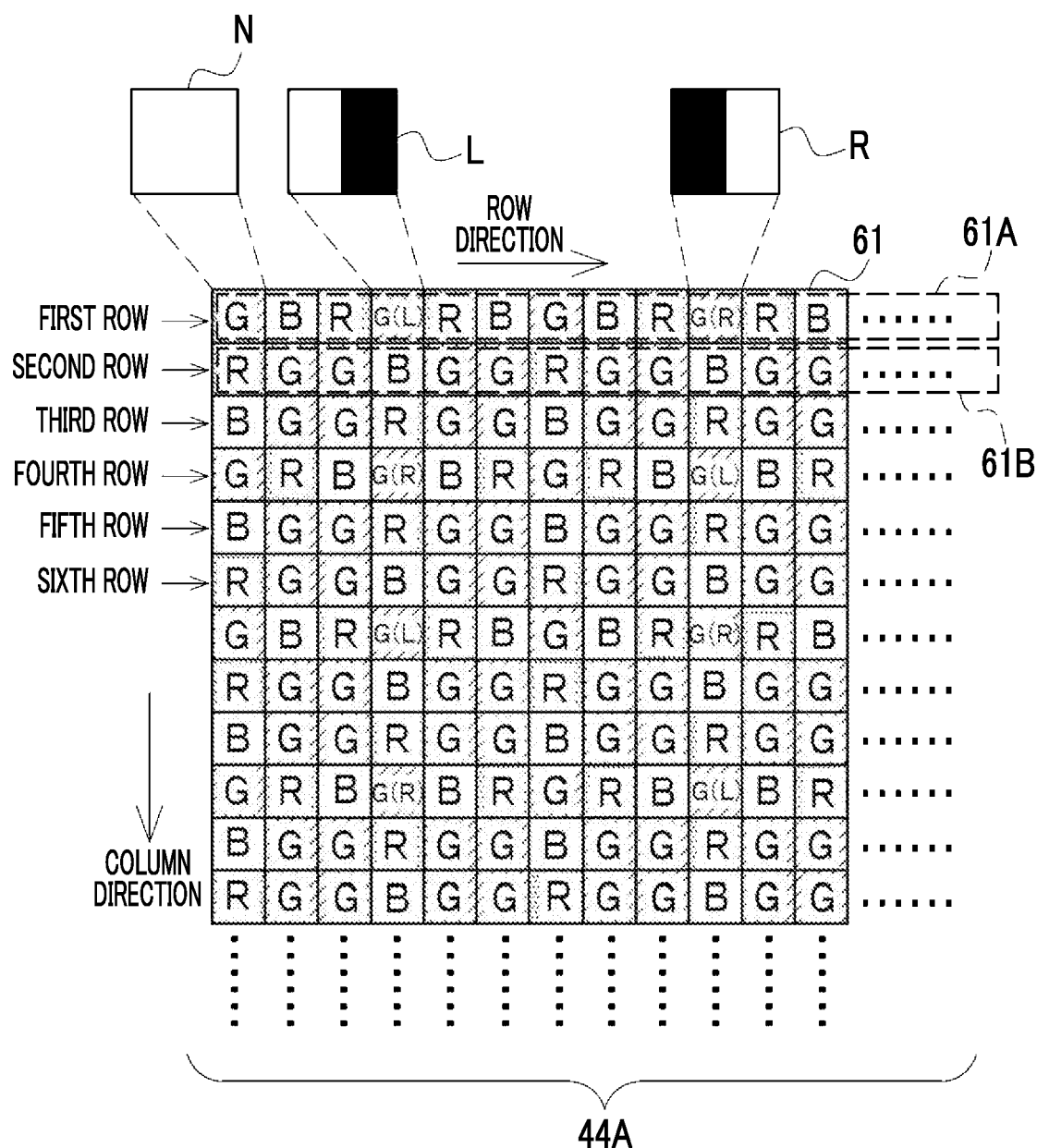
FIG. 5 is an arrangement diagram illustrating an example of arrangement, on an imaging surface, of each pixel included in a photoelectric conversion element of the imaging element included in the imaging apparatus according to the first embodiment.

As illustrated in FIG. 5 as an example, the R pixels, the G pixels, and the B pixels are arranged on the imaging surface 44A of the photoelectric conversion element 61 with predetermined periodicity in each of a row direction (horizontal direction) and a column direction (vertical direction). In the first embodiment according to the technology of the present disclosure, the R pixels, the G pixels, and the B pixels are arranged with periodicity corresponding to X-Trans (registered trademark) arrangement. While the X-Trans arrangement is illustrated in the example illustrated in FIG. 5, the technology of the present disclosure is not limited thereto. Arrangement of the R pixels, the G pixels, and the B pixels may be Bayer arrangement or honeycomb arrangement.

In the example illustrated in FIG. 5, in a first row, the R pixels, the G pixels, and the B pixels are arranged in circulation in an order of the G pixel, the B pixel, the R pixel, the G pixel, the R pixel, and the B pixel in the row direction. In addition, in a second row, the R pixels, the G pixels, and the B pixels are arranged in circulation in an order of the R pixel, the G pixel, the G pixel, the B pixel, the G pixel, and the G pixel in the row direction. In addition, in a third row, the R pixels, the G pixels, and the B pixels are arranged in circulation in an order of the B pixel, the G pixel, the G pixel, the R pixel, the G pixel, and the G pixel in the row direction. In addition, in a fourth row, the R pixels, the G pixels, and the B pixels are arranged in circulation in an order of the G pixel, the R pixel, the B pixel, the G pixel, the B pixel, and the R pixel in the row direction. In addition, in a fifth row, the R pixels, the G pixels, and the B pixels are arranged in circulation in an order of the B pixel, the G pixel, the G pixel, the R pixel, the G pixel, and the G pixel in the row direction. Furthermore, in a sixth row, the R pixels, the G pixels, and the B pixels are arranged in circulation in an order of the R pixel, the G pixel, the G pixel, the B pixel, the G pixel, and the G pixel in the row direction. An arrangement pattern of the R pixels, the G pixels, and the B pixels of the entire photoelectric conversion element 61 is formed by repetition of an arrangement pattern of the R pixels, the G pixels, and the B pixels of the first row to the sixth row in units of six rows in the column direction.

The photoelectric conversion elements 61 is formed to include a photosensitive pixel group. The photosensitive pixel group includes two types of photosensitive pixels of phase difference pixels and non-phase difference pixels N that are pixels different from the phase difference pixels. Generally, the non-phase difference pixels N are also referred to as normal pixels. A plurality of phase difference pixel lines 61A and a plurality of non-phase difference pixel lines 61B are arranged on the imaging surface 44A. The phase difference pixel lines 61A are horizontal lines including the phase difference pixels. Specifically, the phase difference pixel lines 61A are horizontal lines in which the phase difference pixels and the non-phase difference pixels N coexist. The non-phase difference pixel lines 61B are horizontal lines including only a plurality of non-phase difference pixels N, that is, horizontal lines consisting of a plurality of non-phase difference pixels N.

As illustrated in FIG. 5 as an example, the phase difference pixel lines 61A and a predetermined number of lines of the non-phase difference pixel lines 61B are alternately arranged on the imaging surface 44A in the column direction. For example, the "predetermined number of lines" here refer to two lines. While two lines are illustrated here as the predetermined number of lines, the technology of the present disclosure is not limited thereto. The predetermined number of lines may be a few lines more than or equal to three lines, ten and a few lines, a few tens of lines, a few hundred lines, or the like.

The phase difference pixel lines 61A are arranged in the column direction by skipping two lines at a time from the first row to a last row. Pixels of a part of the phase difference pixel lines 61A are the phase difference pixels. Specifically, the phase difference pixel lines 61A are horizontal lines in which the phase difference pixels and the non-phase difference pixels N are periodically arranged. The phase difference pixels are broadly divided into first phase difference pixels L and second phase difference pixels R. In the phase difference pixel lines 61A, the first phase difference pixels L and the second phase difference pixels R are alternately arranged at intervals of a few pixels in the line direction as the G pixels.

The first phase difference pixels L and the second phase difference pixels R are arranged to alternately appear in the column direction. In the example illustrated in FIG. 5, in a fourth column, the first phase difference pixel L, the second phase difference pixel R, the first phase difference pixel L, and the second phase difference pixel R are arranged in this order in the column direction from the first row. That is, the first phase difference pixels L and the second phase difference pixels R are alternately arranged in the column direction from the first row. In addition, in the example illustrated in FIG. 5, in a tenth column, the second phase difference pixel R, the first phase difference pixel L, the second phase difference pixel R, and the first phase difference pixel L are arranged in this order in the column direction from the first row. That is, the second phase difference pixels R and the first phase difference pixels L are alternately arranged in the column direction from the first row.

Figure 6:
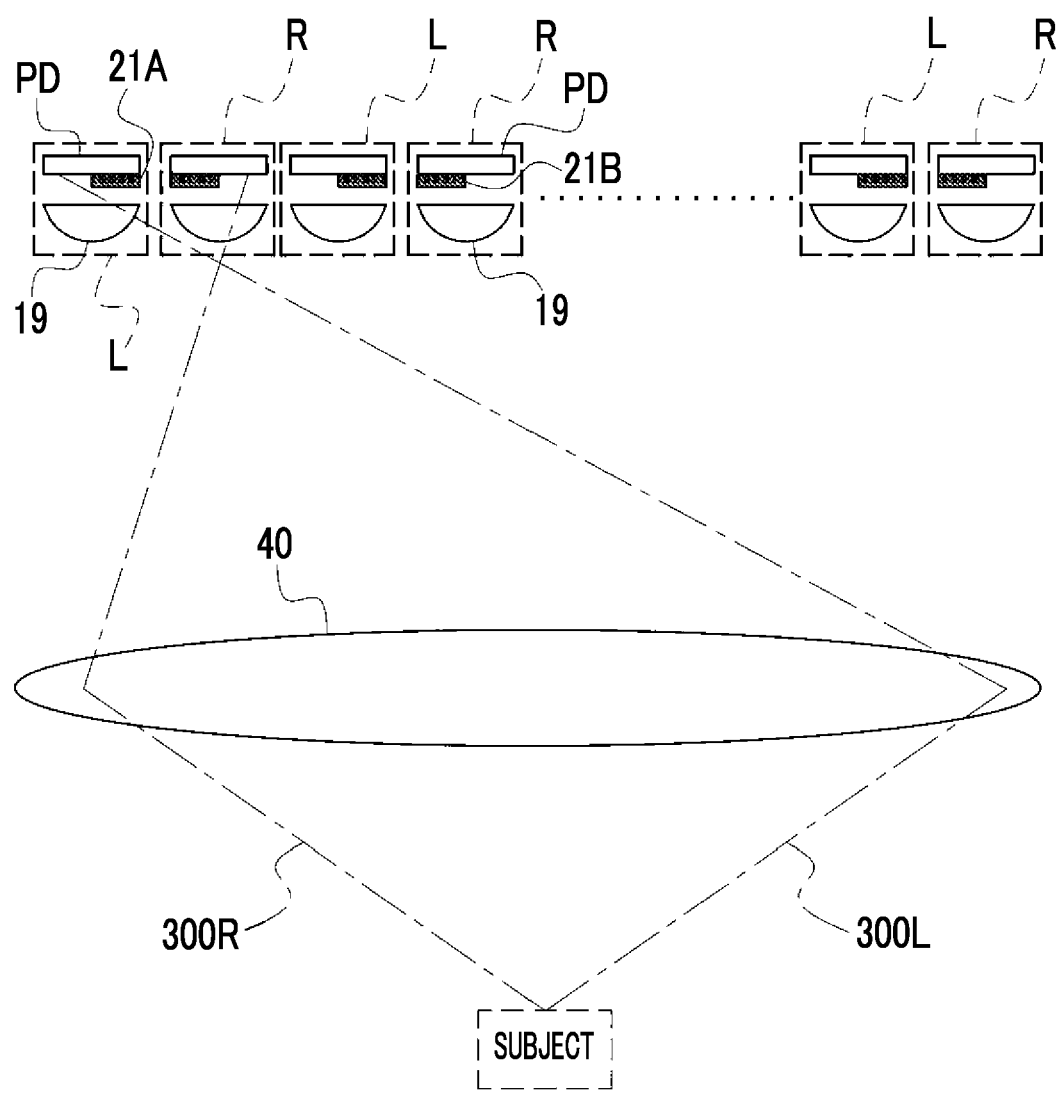
FIG. 6 is a conceptual diagram illustrating an example of incidence characteristics of subject light with respect to a first phase difference pixel and a second phase difference pixel included in the photoelectric conversion element illustrated in FIG. 5.

As illustrated in FIG. 6 as an example, each first phase difference pixel L comprises a microlens 19, a light shielding member 21A, and a photodiode PD. In the first phase difference pixel L, the light shielding member 21A is arranged between the microlens 19 and a light receiving surface of the photodiode PD. A left half (left side in a case of facing the subject from the light receiving surface (in other words, a right side in a case of facing the light receiving surface from the subject)) of the light receiving surface of the photodiode PD in the row direction is shielded against light by the light shielding member 21A.

Each second phase difference pixel R comprises the microlens 19, a light shielding member 21B, and the photodiode PD. In the second phase difference pixel R, the light shielding member 21B is arranged between the microlens 19 and the light receiving surface of the photodiode PD. A right half (right side in a case of facing the subject from the light receiving surface (in other words, a left side in a case of facing the light receiving surface from the subject)) of the light receiving surface of the photodiode PD in the row direction is shielded against light by the light shielding member 21B.

Luminous flux passing through an exit pupil of the imaging lens 40 is broadly divided into left region passing light 300L and right region passing light 300R. The left region passing light 300L refers to luminous flux of a left half of the luminous flux passing through the exit pupil of the imaging lens 40 in a case of facing a subject side from a phase difference pixel side. The right region passing light 300R refers to luminous flux of a right half of the luminous flux passing through the exit pupil of the imaging lens 40 in a case of facing the subject side from the phase difference pixel side. The luminous flux passing through the exit pupil of the imaging lens 40 is divided leftward and rightward by the microlens 19 and the light shielding members 21A and 21B functioning as a pupil separation portion. The first phase difference pixel L receives the left region passing light 300L as the subject light, and the second phase difference pixel R receives the right region passing light 300R as the subject light. Consequently, first phase difference image data indicating a first phase difference image corresponding to a subject image corresponding to the left region passing light 300L and second phase difference image data indicating a second phase difference image corresponding to a subject image corresponding to the right region passing light 300R are generated by the imaging element 44.

Hereinafter, for convenience of description, the first phase difference pixel L and the second phase difference pixel R will be referred to as the "phase difference pixel" unless otherwise necessary to distinguish therebetween. In addition, hereinafter, for convenience of description, the light shielding members 21A and 21B will be referred to as the "light shielding member" without the reference signs unless otherwise necessary to distinguish therebetween. In addition, the first phase difference image data and the second phase difference image data will be referred to as the "phase difference image data" unless otherwise necessary to distinguish therebetween.

Figure 7:
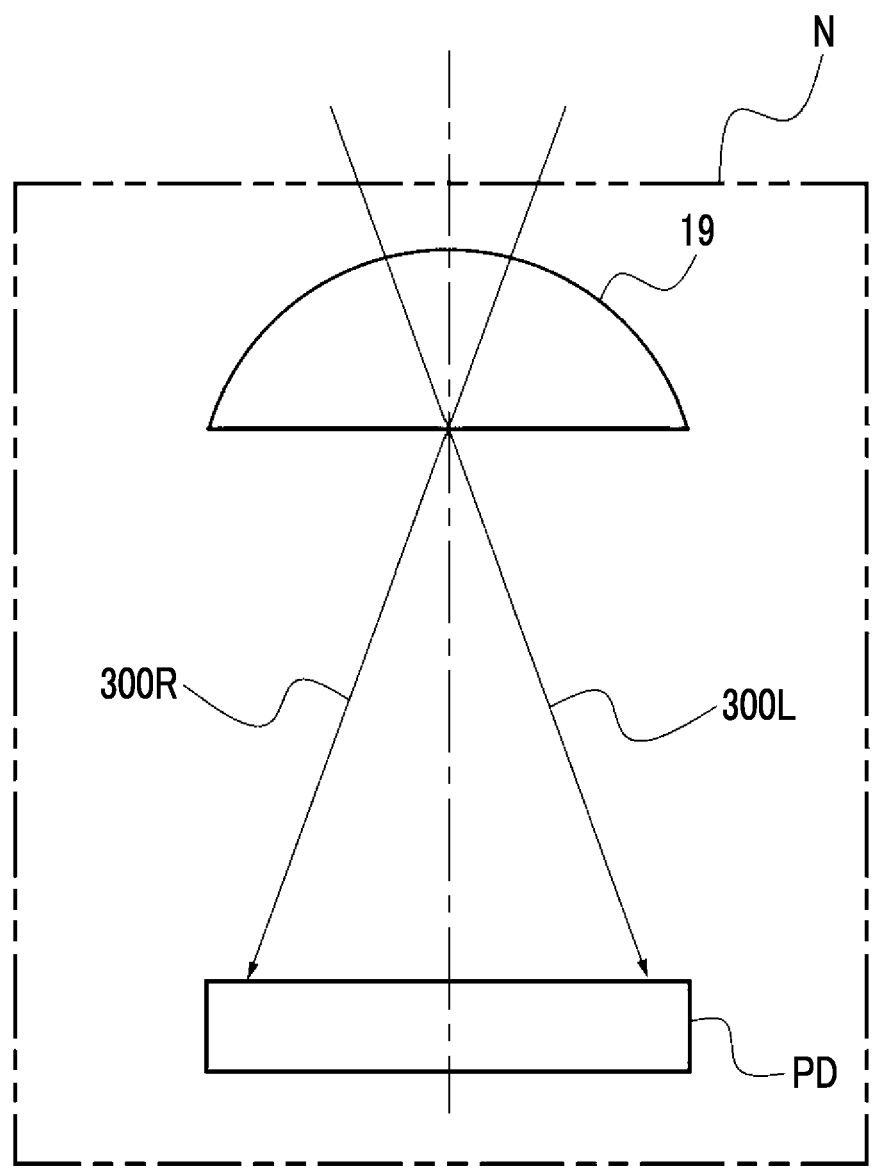
FIG. 7 is a schematic configuration diagram illustrating an example of a configuration of a non-phase difference pixel included in the photoelectric conversion element illustrated in FIG. 5.

As illustrated in FIG. 7 as an example, the non-phase difference pixel is different from the phase difference pixel in that the light shielding member is not included. The photodiode PD of the non-phase difference pixel receives the left region passing light 300L and the right region passing light 300R as the subject light. Consequently, non-phase difference image data indicating a non-phase difference image corresponding to the subject light is generated by the imaging element 44.

Figure 8:
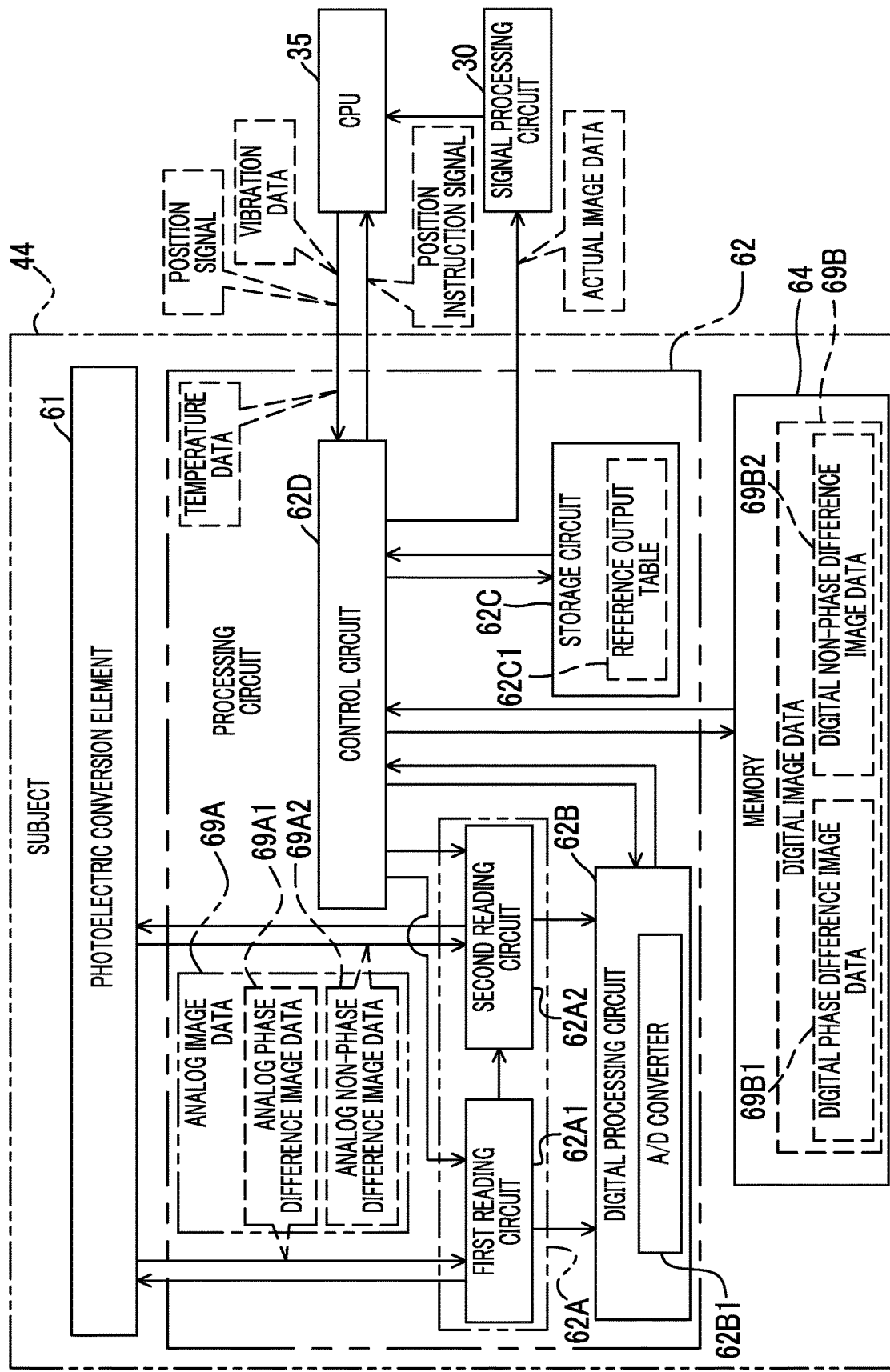
FIG. 8 is a block diagram illustrating an example of a configuration of an electric system of the imaging element according to the first embodiment.

As illustrated in FIG. 8 as an example, the processing circuit 62 comprises a reading circuit 62A, a digital processing circuit 62B, a storage circuit 62C, and a control circuit 62D.

The reading circuit 62A comprises a first reading circuit 62A1 and a second reading circuit 62A2. Each of the first reading circuit 62A1 and the second reading circuit 62A2 is connected to the photoelectric conversion element 61, the digital processing circuit 62B, and the control circuit 62D. Each of the digital processing circuit 62B, the storage circuit 62C, and the memory 64 is connected to the control circuit 62D. The control circuit 62D is connected to the signal processing circuit 30 and the CPU 35.

The image data 69 is broadly divided into analog image data 69A and digital image data 69B. Hereinafter, for convenience of description, the analog image data 69A and the digital image data 69B will be referred to as the "image data 69" unless otherwise necessary to distinguish therebetween.

The analog image data 69A is broadly divided into analog phase difference image data 69A1 that is analog phase difference image data related to the phase difference pixel, and analog non-phase difference image data 69A2 that is analog non-phase difference image data related to the non-phase difference pixel N. The digital image data 69B is broadly divided into digital phase difference image data 69B1 and digital non-phase difference image data 69B2. The digital phase difference image data 69B1 is image data obtained by digitizing the analog phase difference image data 69A1. The digital non-phase difference image data 69B2 is image data obtained by digitizing the analog non-phase difference image data 69A2. The analog image data 69A and the digital image data 69B are an example of "image data" according to the embodiments of the technology of the present disclosure.

Various signals such as the temperature data, the position signal, and the vibration data are supplied to the control circuit 62D from the CPU 35. In addition, the timing control signal is supplied to the control circuit 62D from the driver 26 (refer to FIG. 2).

The reading circuit 62A reads out, in units of horizontal lines, the analog image data 69A that is obtained by imaging the subject at the imaging frame rate. That is, the reading circuit 62A controls the photoelectric conversion element 61 and reads out the analog image data 69A from the photoelectric conversion element 61 in units of horizontal lines under control of the control circuit 62D. The imaging frame rate is defined by the vertical synchronization signal that is one type of timing control signal supplied from the driver 26 (refer to FIG. 2). A reading timing in units of horizontal lines is determined in accordance with the horizontal synchronization signal that is one type of timing control signal.

The reading circuit 62A is a circuit that can selectively read out the analog phase difference image data 69A1 and the analog non-phase difference image data 69A2 for all pixels included in the photoelectric conversion element 61. As will be described in detail later, selective reading of the analog phase difference image data 69A1 and the analog non-phase difference image data 69A2 is implemented by the first reading circuit 62A1 and the second reading circuit 62A2.

While an example of a form of selectively reading out the analog phase difference image data 69A1 and the analog non-phase difference image data 69A2 for all pixels included in the photoelectric conversion element 61 is exemplified here, the technology of the present disclosure is not limited thereto. For example, the analog phase difference image data 69A1 and the analog non-phase difference image data 69A2 may be selectively read out for a designated pixel group of a part of all pixels included in the photoelectric conversion element 61.

The vertical synchronization signal is supplied to the control circuit 62D from the driver 26 (refer to FIG. 2). The control circuit 62D transfers the vertical synchronization signal to the reading circuit 62A. In a case where the vertical synchronization signal is input from the control circuit 62D, the reading circuit 62A starts reading out the analog image data 69A of one frame from the photoelectric conversion element 61.

Specifically, the control circuit 62D transfers the vertical synchronization signal supplied from the driver 26 (refer to FIG. 2) to the first reading circuit 62A1 and the second reading circuit 62A2. In a case where the vertical synchronization signal is input into each of the first reading circuit 62A1 and the second reading circuit 62A2, reading of the analog phase difference image data 69A1 from the phase difference pixel and reading of the analog non-phase difference image data 69A2 from the non-phase difference pixel N are independently performed. Reading of the analog phase difference image data 69A1 is performed by the first reading circuit 62A1, and reading of the analog non-phase difference image data 69A2 is performed by the second reading circuit 62A2.

More specifically, in a case where the vertical synchronization signal is input from the control circuit 62D, the first reading circuit 62A1 starts reading out the analog phase difference image data 69A1 of one frame from the photoelectric conversion element 61. The first reading circuit 62A1 reads out the analog phase difference image data 69A1 from each phase difference pixel for each phase difference pixel line 61A in accordance with the horizontal synchronization signal input from the control circuit 62D. The second reading circuit 62A2 starts reading out the analog non-phase difference image data 69A2 of one frame from the photoelectric conversion element 61 in a case where a reading start condition (described later) is satisfied. The second reading circuit 62A2 reads out the analog non-phase difference image data 69A2 from each non-phase difference pixel N for each non-phase difference pixel line 61B in accordance with the horizontal synchronization signal input from the control circuit 62D.

The "reading start condition" here refers to a condition that the vertical synchronization signal is input from the control circuit 62D, and that reading of the analog phase difference image data 69A1 of one frame by the first reading circuit 62A1 is completed.

The reading circuit 62A performs analog signal processing on the analog image data 69A read out from the photoelectric conversion element 61. The analog signal processing includes well-known processing such as noise cancelation processing and analog gain processing. The noise cancelation processing is processing of canceling a noise caused by variations in characteristics between pixels included in the photoelectric conversion element 61. The analog gain processing is processing of applying a gain to the analog image data 69A. The analog image data 69A on which the analog signal processing is performed in such a manner is output to the digital processing circuit 62B by the reading circuit 62A.

The digital processing circuit 62B comprises an A/D converter 62B1. The digital processing circuit 62B performs digital signal processing on the analog image data 69A input from the reading circuit 62A. For example, the digital signal processing includes correlative double sampling, A/D conversion performed by the A/D converter 62B1, and digital gain processing.

The correlative double sampling is performed on the analog image data 69A by the digital processing circuit 62B. The A/D converter 62B1 performs the A/D conversion on the analog image data 69A on which signal processing of the correlative double sampling is performed. Accordingly, the analog image data 69A is digitized, and the digital image data 69B is obtained. The digital gain processing is performed on the digital image data 69B by the digital processing circuit 62B. The digital gain processing refers to processing of applying a gain to the digital image data 69B.

The control circuit 62D acquires the digital image data 69B, which is obtained by performing the digital signal processing, from the digital processing circuit 62B and stores the acquired digital image data 69B in the memory 64.

The memory 64 is a memory that can store the digital image data 69B of a plurality of frames. The memory 64 has a plurality of storage regions. The digital image data 69B is stored in a corresponding storage region of the memory 64 in units of pixels by the control circuit 62D.

The control circuit 62D can randomly access the memory 64 and acquires the digital non-phase difference image data 69B2 from the memory 64. The control circuit 62D performs signal processing on the digital non-phase difference image data 69B2 acquired from the memory 64. Demosaicing, digital thinning processing, digital addition processing, data filling processing, and the like are exemplified as the "signal processing" here.

The demosaicing is processing of calculating every color information for each pixel from a mosaic image corresponding to arrangement of the color filters. For example, in a case of an imaging element consisting of color filters of three colors of R, G, and B, color information on all of R, G, and B is calculated from a mosaic image consisting of R, G, and B for each pixel.

The digital thinning processing is processing of thinning out pixels included in the digital non-phase difference image data 69B2 in units of lines. For example, the units of lines refer to units of horizontal lines and/or units of vertical lines. The digital addition processing is, for example, processing of calculating an arithmetic mean of pixel values for a plurality of pixels included in the digital non-phase difference image data 69B2. Processing of filling a lower empty bit of the digital non-phase difference image data 69B2 with specific data, or the like is exemplified as the data filling processing. For example, information for specifying a method of the digital thinning processing performed on the digital non-phase difference image data 69B2, or a frame number for specifying a frame is exemplified as the "specific data" here.

The control circuit 62D outputs the digital phase difference image data 69B1 and actual image data (described later) that is the digital non-phase difference image data 69B2 after the signal processing to the signal processing circuit 30 at the output frame rate. The digital phase difference image data 69B1 is transferred to the CPU 35 through the signal processing circuit 30. The CPU 35 performs the AF control based on the digital phase difference image data 69B1. The actual image data is also transferred to the CPU 35 through the signal processing circuit 30. The CPU 35 performs various types of processing on the actual image data. For example, the various types of processing refer to processing of displaying an image indicated by the actual image data on the display 43B and processing of storing the actual image data in the predetermined storage device.

The storage circuit 62C stores a reference output table 62C1 (refer to FIG. 11). As will be described in detail later, the reference output table 62C1 is a table in which the temperature of the vibration sensor 32 and a reference output level of the vibration sensor 32 (hereinafter, simply referred to as the "reference output level") are associated. In the first embodiment according to the technology of the present disclosure, a unit of temperature is "° C.", and a unit of output level (in the example illustrated in FIG. 11 and FIG. 19, the reference output level) of the vibration sensor 32 is "mdps". The reference output level refers to the output level of the vibration sensor 32 in a non-vibrating state. The non-vibrating state refers to a state where the vibration sensor 32 stands still, that is, a state where the vibration is not exerted on the imaging apparatus 10. Hereinafter, for convenience of description, a state where the vibration sensor 32 is moving, that is, a state where the vibration is exerted on the imaging apparatus 10, will be referred to as a "vibrating state". In addition, in the following description, the unit of output level (in the example illustrated in FIG. 11 and FIG. 19, the reference output level) of the vibration sensor 32 will be omitted.

As will be described in detail later, the control circuit 62D generates a position instruction signal based on the reference output level of the reference output table 62C1 stored in the storage circuit 62C and the temperature data, the position signal, and the vibration data supplied from the CPU 35. The control circuit 62D outputs the generated position instruction signal to the CPU 35. The position instruction signal refers to a signal for providing an instruction for the position of the vibration-proof lens 15B2 (refer to FIG. 2) in the two-dimensional plane of the vibration-proof lens. The CPU 35 controls the optical shake correction portion 29 in accordance with the position instruction signal input from the control circuit 62D. The optical shake correction portion 29 corrects the shake by aligning the position of the vibration-proof lens 15B2 to the position of the instruction provided by the position instruction signal.

Figure 9:
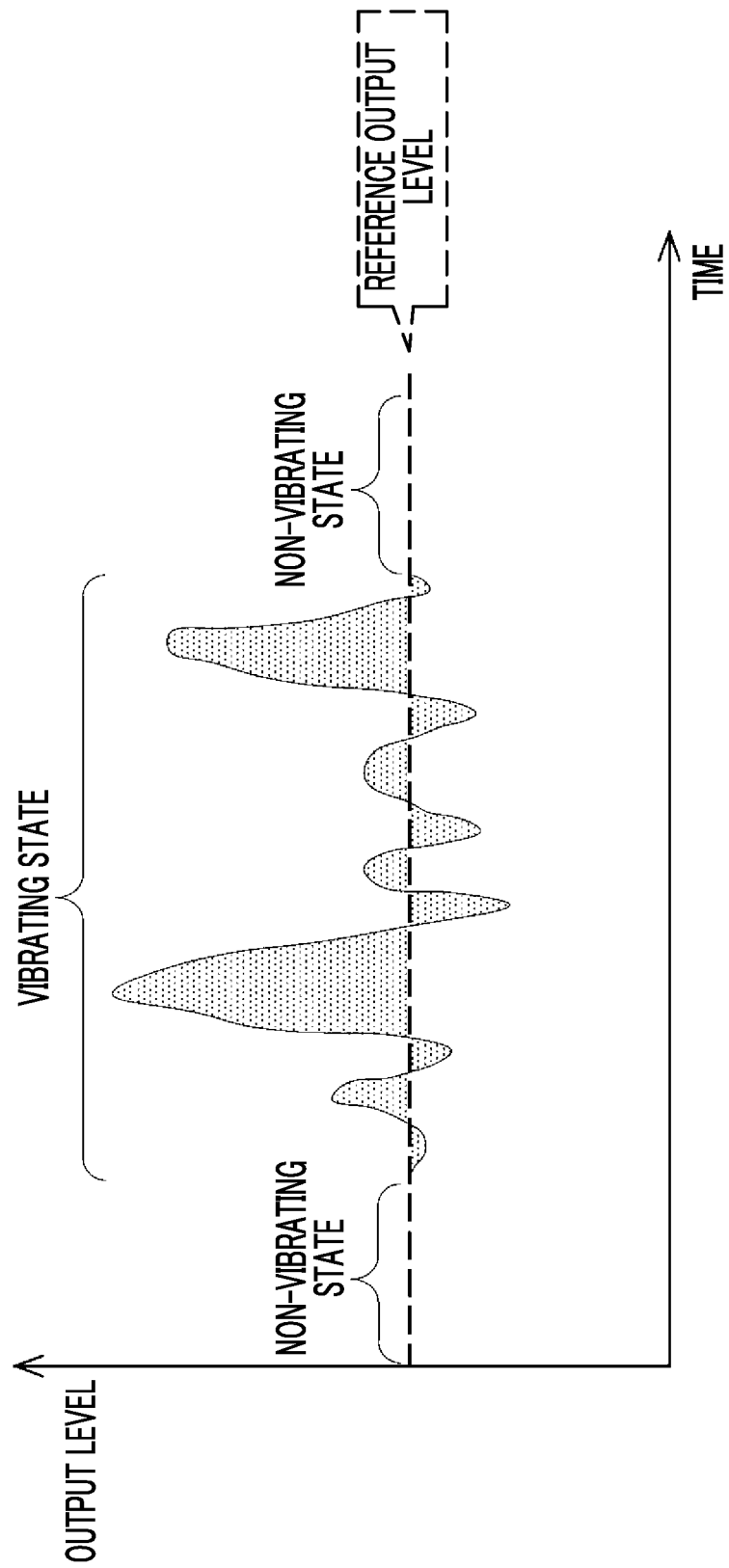
FIG. 9 is a graph illustrating an example of an aspect of change in output level of a vibration sensor included in the imaging apparatus according to the first embodiment in a state where a reference output level of the vibration sensor is not shifted.

In the control circuit 62D, a correction amount (hereinafter, referred to as a "shake correction amount") necessary for correcting the shake is calculated, and the position instruction signal is decided in accordance with the calculated shake correction amount. As illustrated in FIG. 9 as an example, a time integral value (in the example illustrated in FIG. 9, an area of a hatched region) of a difference between the reference output level and the current output level of the vibration sensor 32 (hereinafter, referred to as the "current output level") corresponds to the shake correction amount. In the non-vibrating state, the current output level matches the reference output level. However, in the vibrating state, the current output level is higher or lower than the reference output level.

Figure 10:
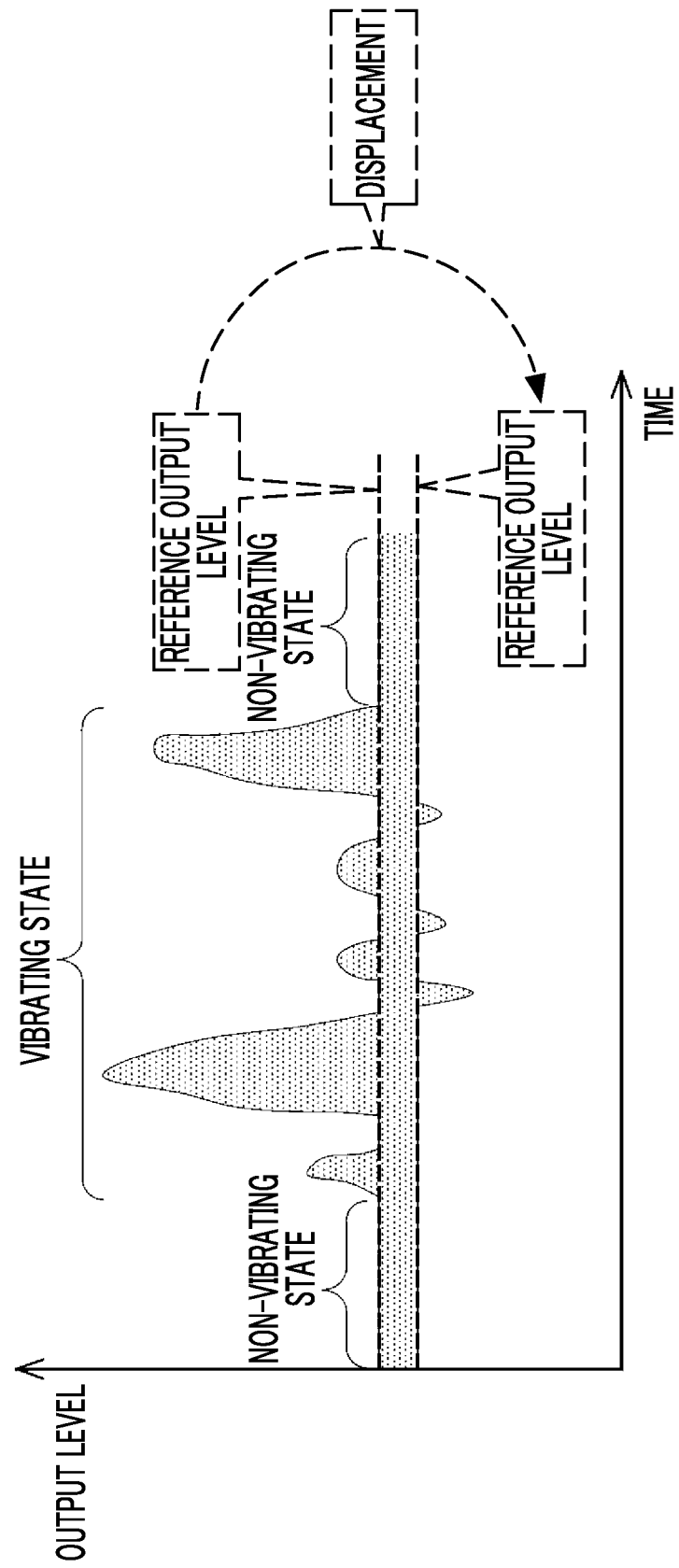
FIG. 10 is a graph illustrating an example of an aspect of change in output level of the vibration sensor included in the imaging apparatus according to the first embodiment in a state where the reference output level of the vibration sensor is shifted.

As an assumption for calculating the shake correction amount by the control circuit 62D, it is ideal that the reference output level is constant as in the example illustrated in FIG. 9. However, in actuality, the reference output level is not constant and is displaced as illustrated in FIG. 10 as an example. An environment in which the vibration sensor 32 is installed, temporal degradation, and the like are exemplified as a cause of displacement of the reference output level. In a case where the reference output level is displaced, an amount of displacement of the reference output level is calculated as the time integral value. Thus, an error of the amount of displacement of the reference output level is included in the shake correction amount. In this case, in the vibrating state, a shake correction amount greater than the actually necessary shake correction amount is calculated. In addition, in the non-vibrating state, the shake correction amount is a value other than "0". Thus, the optical shake correction portion 29 operates as in a case where the shake is present, regardless of the fact that it is not necessary to correct the shake.

Therefore, in the imaging element 44, as illustrated in FIG. 11 as an example, the reference output level of the reference output table 62C1 is optimized, and the shake correction amount is calculated based on the optimized reference output level. The reference output level varies for each temperature in the vibration sensor 32. Thus, the reference output table 62C1 includes a plurality of temperatures in the vibration sensor 32 and the reference output level, and different reference output levels are associated in advance with each of the plurality of temperatures.

In the example illustrated in FIG. 11, the plurality of temperatures are defined at a pitch of 0.5° C. within a range of 20.0° C. to 27.0° C. In the reference output table 62C1, both of the temperature and the reference output level associated with each other are fixed values. A changed reference output level is the reference output level after displacement in a state where the shake is corrected by the optical shake correction portion 29. In the example illustrated in FIG. 11, the changed reference output level is associated with each temperature within a range of 23.0° C. to 26.0° C.

A used reference output level is used for calculating the time integral value, that is, calculating the shake correction amount. In a case where the changed reference output level is not obtained yet from the vibration sensor 32, the reference output level is employed as the used reference output level. In a case where the changed reference output level is obtained from the vibration sensor 32, the changed reference output level is employed as the used reference output level. In the example illustrated in FIG. 11, the reference output level is employed as the used reference output level for each temperature within a range of 20.0° C. to 22.5° C. and a range of 26.5° C. to 27.0° C. In addition, in the example illustrated in FIG. 11, the changed reference output level is employed as the used reference output level for each temperature within a range of 23.0° C. to 26.0° C.

Figure 12:
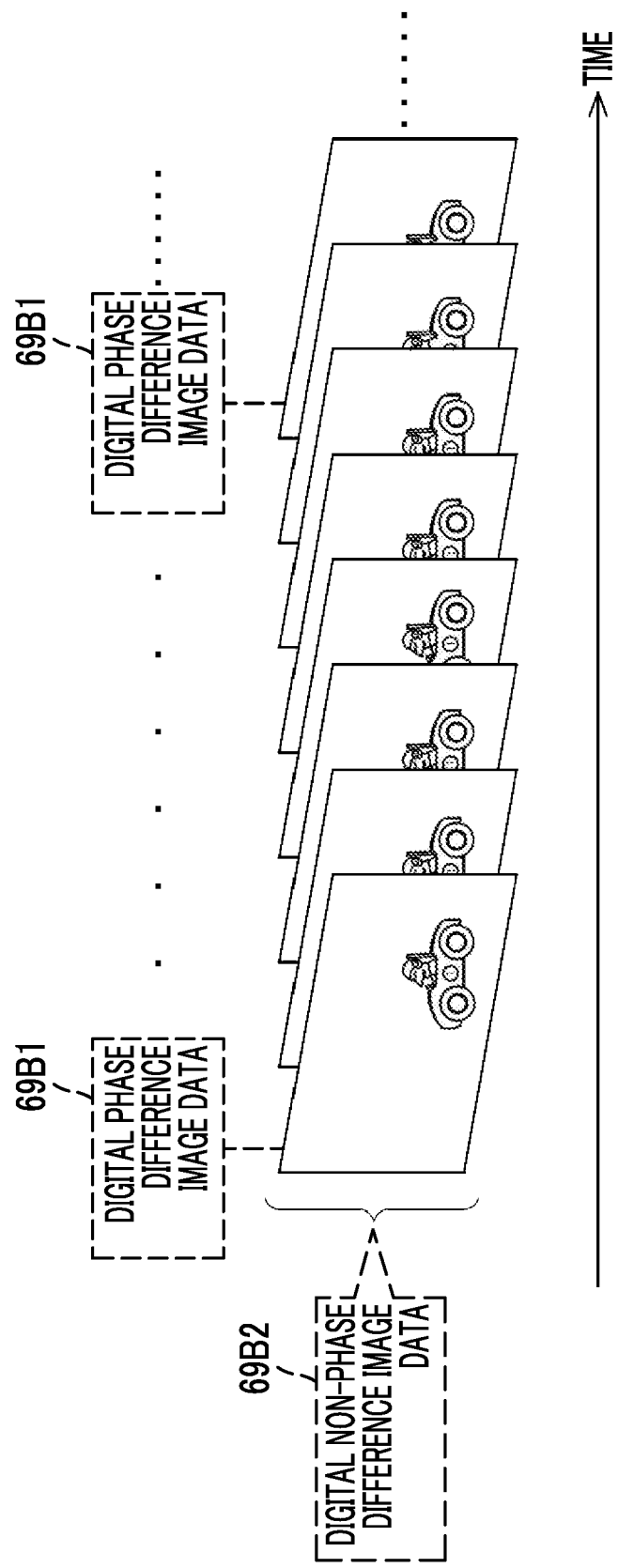
FIG. 12 is a conceptual diagram illustrating an example of a correspondence relationship between digital non-phase difference image data and digital phase difference image data obtained by imaging performed by the imaging apparatus according to the first embodiment.

As illustrated in FIG. 12 as an example, for each frame, the digital phase difference image data 69B1 is associated in time series with each digital non-phase difference image data 69B2 of a time series obtained by performing imaging at the imaging frame rate by the photoelectric conversion element 61. That is, the digital phase difference image data 69B1 and the digital non-phase difference image data 69B2 are acquired by the control circuit 62D in units of frames.

Figure 13:
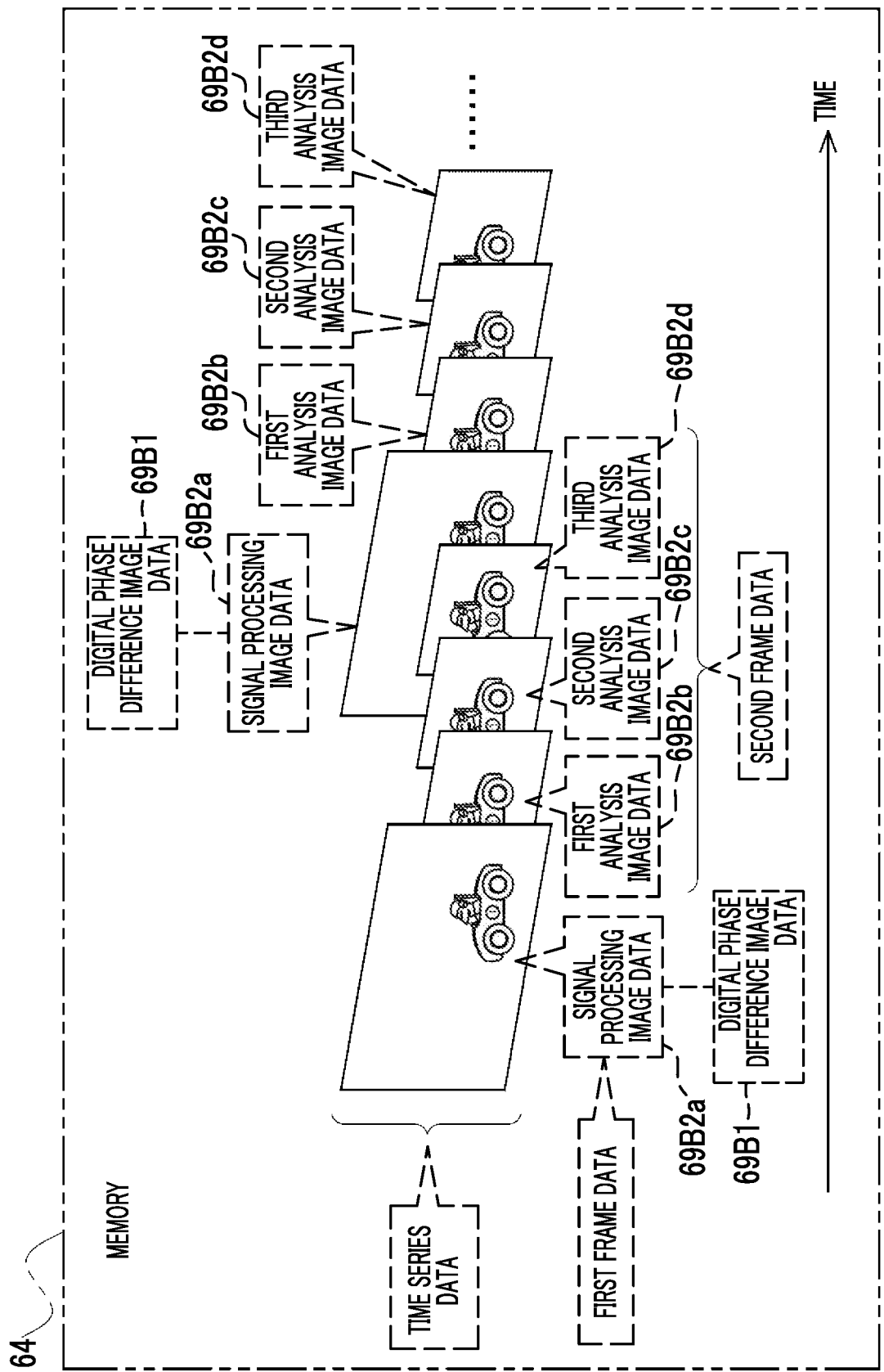
FIG. 13 is a conceptual diagram illustrating an example of time series data stored in a memory 64 by a control circuit included in the imaging element of the imaging apparatus according to the first embodiment.

As illustrated in FIG. 13 as an example, the control circuit 62D generates time series data based on the digital non-phase difference image data 69B2 of the time series obtained by performing imaging at the imaging frame rate, and stores the generated time series data in the memory 64 using a FIFO method. The time series data is broadly divided into first frame data related to a part of the frames and second frame data related to the remaining frames. The second frame data is frame data indicating a plurality of frames.

The first frame data is signal processing image data 69B2a. The signal processing image data 69B2a is the digital non-phase difference image data 69B2 and is associated with the digital phase difference image data 69B1 in the same frame. The second frame data includes first analysis image data 69B2b, second analysis image data 69B2c, and third analysis image data 69B2d. Specifically, as will be described later, each of the first analysis image data 69B2b, the second analysis image data 69B2c, and the third analysis image data 69B2d is partial image data indicating a partial image of the digital non-phase difference image data 69B2 of one frame based on all pixels of the imaging surface 44A. The "partial image data indicating the partial image" here refers to a partial image of the subject within an angle of view of the imaging apparatus 10.

Frames periodically determined in the time series data are frames determined at a time interval defined as 60 fps. That is, a time interval between periodically determined frames is a time interval corresponding to a period defined as 60 fps. For example, "between frames" here refers to between temporally adjacent signal processing image data 69B2a, between temporally adjacent first analysis image data 69B2b, between temporally adjacent second analysis image data 69B2c, and between temporally adjacent third analysis image data 69B2d. Each of the signal processing image data 69B2a, the first analysis image data 69B2b, the second analysis image data 69B2c, and the third analysis image data 69B2d is obtained at the time interval defined as 60 fps and stored in the memory 64 using the FIFO method.

Hereinafter, for convenience of description, the first analysis image data 69B2b, the second analysis image data 69B2c, and the third analysis image data 69B2d will be referred to as "N-th analysis image data" unless otherwise necessary to distinguish therebetween. In addition, an image indicated by the N-th analysis image data will be referred to as an "N-th analysis image". That is, the N-th analysis image refers to a collective term of a first analysis image that is an image indicated by the first analysis image data 69B2b, a second analysis image that is an image indicated by the second analysis image data 69B2c, and a third analysis image that is an image indicated by the third analysis image data 69B2d.

Figure 14:
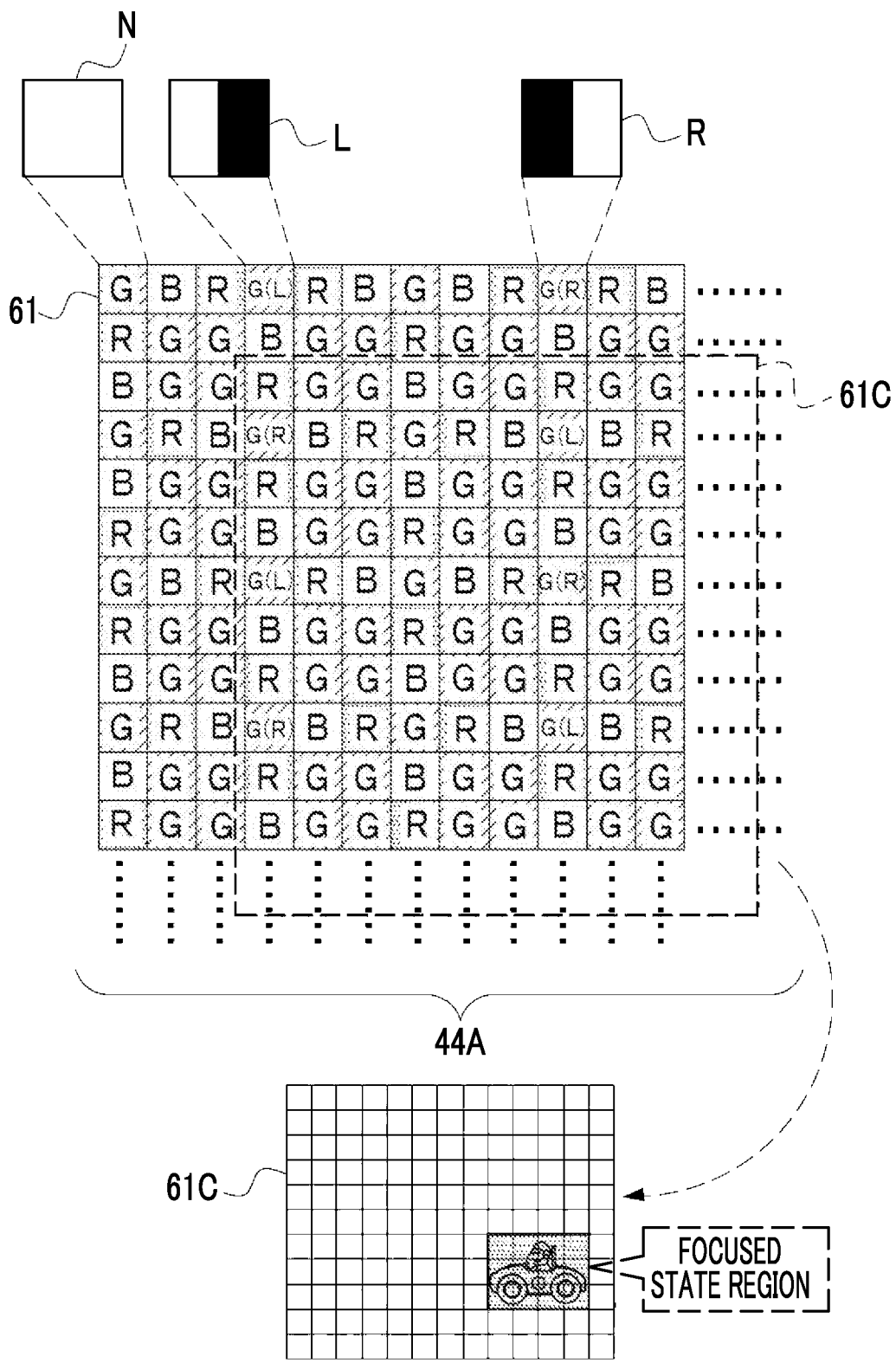
FIG. 14 is a conceptual diagram illustrating an example of a positional relationship among the imaging surface of the imaging element according to the first embodiment, an AF control target region, and a focused state region.

Here, the N-th analysis image data will be described. As illustrated in FIG. 14 as an example, the imaging surface 44A includes an AF control target region 61C that is an image side region as a target of the AF control. The AF control target region 61C corresponds to an object side region of a part of the subject that is designated and followed as the target of the AF control in the continuous AF mode. The AF control target region 61C may be a region designated in accordance with an instruction received by the reception device 43A (refer to FIG. 2) or may be a region specified as a face region by a so-called face detection function.

The N-th analysis image data is the digital non-phase difference image data 69B2 that corresponds to a focused state region in the digital non-phase difference image data 69B2 obtained by reading out the analog non-phase difference image data 69A2 by the first reading circuit 62A1. The focused state region is an example of a "region in which a focused state is set" according to the embodiments of the technology of the present disclosure. The focused state region refers to an image side region of the photosensitive pixel group in which the focused state is set in the AF control target region 61C, that is, an image side region in which the focused state is continuously maintained in the continuous AF mode. The focused state region is specified by analyzing the digital phase difference image data 69B1 obtained in the same frame as the digital non-phase difference image data 69B2 by the control circuit 62D.

Figure 15:
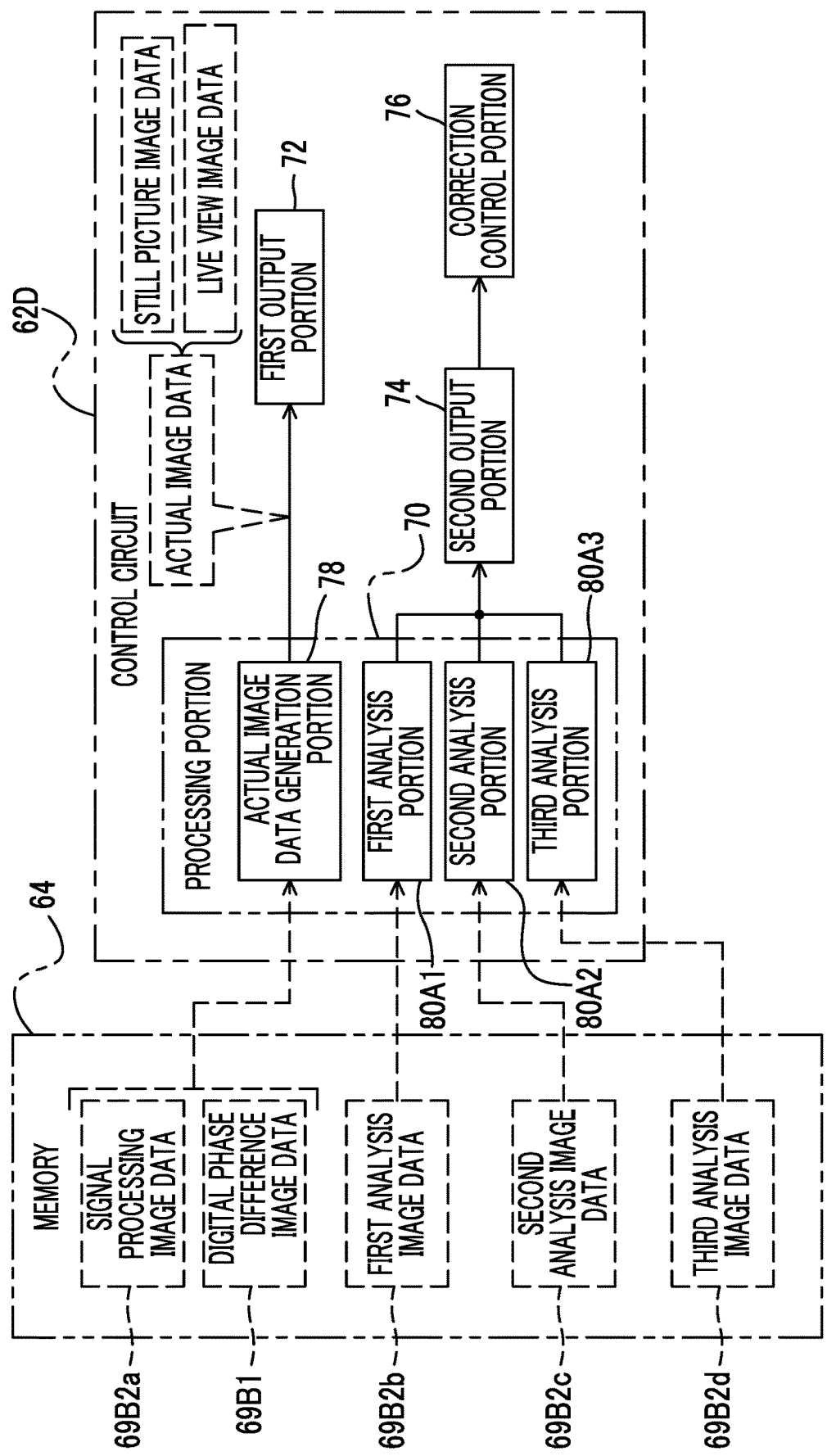
FIG. 15 is a block diagram illustrating an example of a configuration of the control circuit included in the imaging element according to the first embodiment.

As illustrated in FIG. 15 as an example, the control circuit 62D comprises a processing portion 70, a first output portion 72, a second output portion 74, and a correction control portion 76. The processing portion 70 is an example of a "processing portion (processing circuit)" according to the embodiments of the technology of the present disclosure. The first output portion 72 is an example of a "first output portion (first output circuit)" according to the embodiments of the technology of the present disclosure. The second output portion 74 is an example of a "second output portion" according to the embodiments of the technology of the present disclosure. The correction control portion 76 is an example of a "correction control portion (correction control circuit)" according to the embodiments of the technology of the present disclosure.

The processing portion 70 processes the image data 69. The processing portion 70 includes an actual image data generation portion 78, a first analysis portion 80A1, a second analysis portion 80A2, and a third analysis portion 80A3. The actual image data generation portion 78 is connected to the first output portion 72. The first analysis portion 80A1, the second analysis portion 80A2, and the third analysis portion 80A3 are connected to the second output portion 74. The second output portion 74 is connected to the correction control portion 76. Hereinafter, for convenience of description, the first analysis portion 80A1, the second analysis portion 80A2, and the third analysis portion 80A3 will be referred to as an "N-th analysis portion 80A" unless otherwise necessary to distinguish therebetween.

The actual image data generation portion 78 acquires the signal processing image data 69B2$a$ and the digital phase difference image data 69B1 associated with the signal processing image data 69B2$a$ from the memory 64. The actual image data generation portion 78 generates the actual image data by performing the signal processing on the signal processing image data 69B2$a$ acquired from the memory 64. For example, the actual image data refers to still picture image data indicating the still picture image or live view image data indicating the live view image. In the first embodiment according to the technology of the present disclosure, the still picture image data and the live view image data are selectively switched in accordance with the instruction received by the reception device 43A. Here, while the still picture image data and the live view image data are employed as the actual image data, the technology of the present disclosure is not limited thereto. The actual image data may be recording motion picture data indicating a recording motion picture.

The first output portion 72 acquires the actual image data generated by the actual image data generation portion 78 and the digital phase difference image data 69B1 corresponding to the actual image data and outputs the acquired actual image data and the digital phase difference image data 69B1 at the output frame rate.

The N-th analysis portion 80A acquires the N-th analysis image data from the memory 64 and derives shake degree information using the acquired N-th analysis image data. The shake degree information refers to information indicating a degree of shake included in the N-th analysis image which is the image indicated by the N-th analysis image data. In other words, the degree of shake is an indicator indicating an effect of correction of the shake by the optical shake correction portion 29.

The first analysis portion 80A1 acquires the first analysis image data 69B2$b$ and the digital phase difference image data 69B1 corresponding to the first analysis image data from the memory 64. As will be described in detail later, the first analysis portion 80A1 derives the shake degree information by analyzing the first analysis image data 69B2$b$ and the digital phase difference image data 69B1 acquired from the memory 64. The shake degree information derived by the first analysis portion 80A1 is information indicating the degree of shake included in the first analysis image. The shake degree information derived by the first analysis portion 80A1 corresponds to a shift amount of the reference output level and is represented by, for example, the number of pixels corresponding to a shake amount that is not corrected by the optical shake correction portion 29 and remains in the first analysis image.

The second analysis portion 80A2 acquires the second analysis image data 69B2$c$ and the digital phase difference image data 69B1 corresponding to the second analysis image data from the memory 64. As will be described in detail later, the second analysis portion 80A2 derives the shake degree information by analyzing the second analysis image data 69B2$c$ and the digital phase difference image data 69B1 acquired from the memory 64. The shake degree information derived by the second analysis portion 80A2 is information indicating the degree of shake included in the second analysis image. The shake degree information derived by the second analysis portion 80A2 corresponds to the shift amount of the reference output level and is represented by, for example, the number of pixels corresponding to a shake amount that is not corrected by the optical shake correction portion 29 and remains in the second analysis image.

The third analysis portion 80A3 acquires the third analysis image data 69B2$d$ and the digital phase difference image data 69B1 corresponding to the third analysis image data from the memory 64. As will be described in detail later, the third analysis portion 80A3 derives the shake degree information by analyzing the third analysis image data 69B2$d$ and the digital phase difference image data 69B1 acquired from the memory 64. The shake degree information derived by the third analysis portion 80A3 is information indicating the degree of shake included in the third analysis image. The shake degree information derived by the third analysis portion 80A3 corresponds to the shift amount of the reference output level and is represented by, for example, the number of pixels corresponding to a shake amount that is not corrected by the optical shake correction portion 29 and remains in the third analysis image.

The second output portion 74 acquires the shake degree information derived by the N-th analysis portion 80A from the N-th analysis portion 80A and outputs the acquired shake degree information to the correction control portion 76 at the same rate as the output frame rate.

As illustrated in FIG. 16 as an example, in a case where the still picture image indicated by the still picture image data employed as the actual image data is compared with the live view image indicated by the live view image data employed as the actual image data, the number of pixels of the entirety is different. That is, while the still picture image is an image having the maximum resolution, that is, a full resolution, the live view image is an image having a lower resolution than the still picture image. In the example illustrated in FIG. 16, while the pixels are not thinned out in the still picture image, the pixels are periodically thinned out in each of the row direction and the column direction in the live view image.

Figure 17:
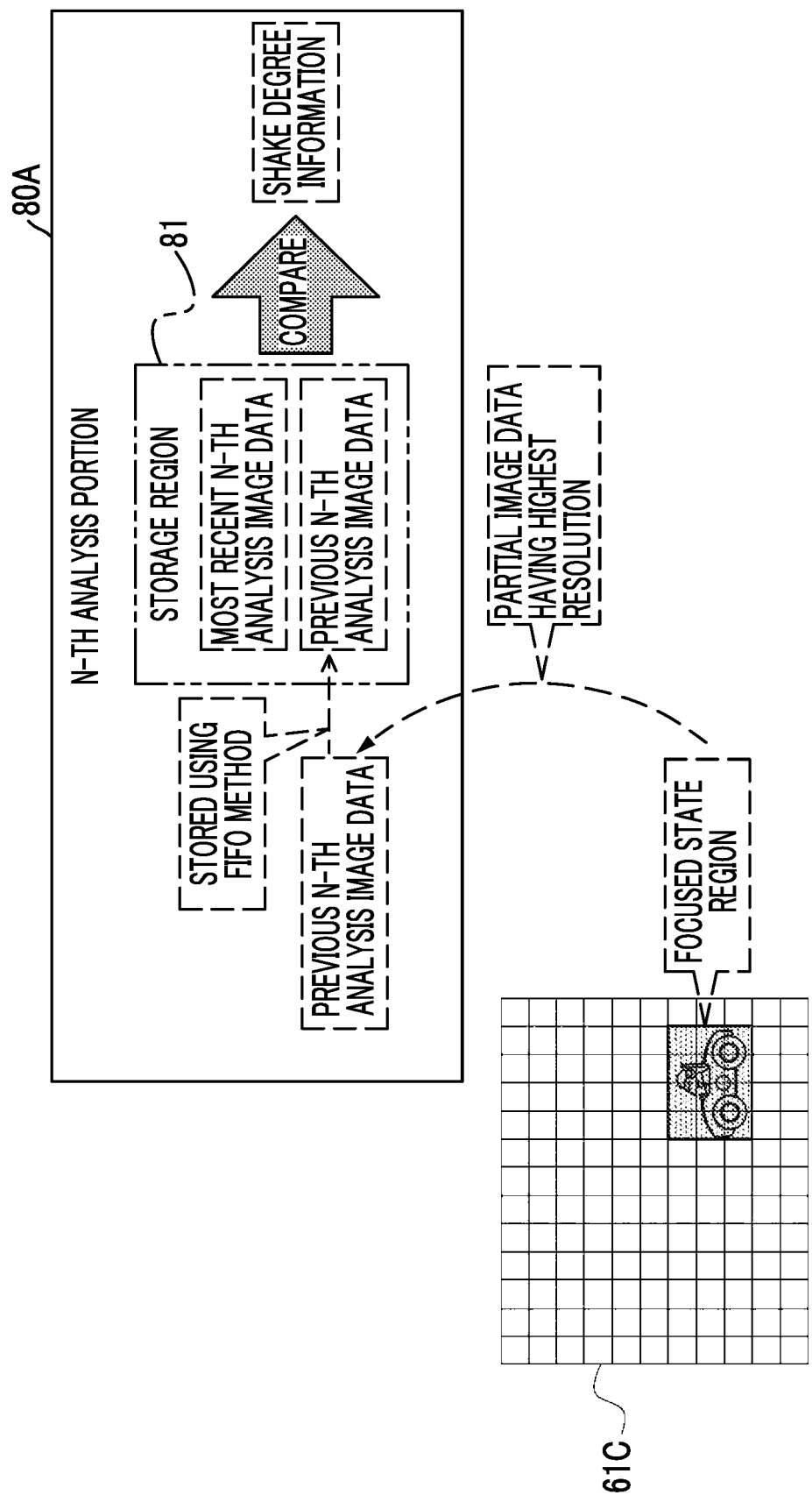
FIG. 17 is a block diagram illustrating an example of a function of an N-th analysis portion of the processing portion included in the control circuit according to the first embodiment.

As illustrated in FIG. 17 as an example, the N-th analysis portion 80A acquires the most recent N-th analysis image data from the memory 64. The N-th analysis image data acquired from the memory 64 is partial image data having the highest resolution (full resolution) in the digital non-phase difference image data 69B2 of one frame. The partial image data refers to the digital non-phase difference image data 69B2 that corresponds to the focused state region in the AF control target region 61C in the digital non-phase difference image data 69B2 of one frame.

The N-th analysis portion 80A includes a storage region 81. In the storage region 81, the N-th analysis image data acquired from the memory 64 is stored using the FIFO method, and a pair of pieces of temporally adjacent N-th analysis image data (hereinafter, simply referred to as the "pair of pieces of N-th analysis image data") are stored. That is, each time the N-th analysis image data is acquired from the memory 64 by the N-th analysis portion 80A, the acquired N-th analysis image data is stored in the storage region 81 using the FIFO method, and the previous N-th analysis image data and the most recent N-th analysis image data in the storage region 81 are updated.

Each time a storage content in the storage region 81 is updated, the N-th analysis portion 80A compares the pair of pieces of the N-th analysis image data in the storage region 81 and derives the shake degree information from a comparison result. That is, by comparing the pair of pieces of the N-th analysis image data in the storage region 81, the N-th analysis portion 80A specifies the number of pixels corresponding to the shake amount remaining in the most recent N-th analysis image data and decides the specified number of pixels as the shake degree information.

Figure 18:
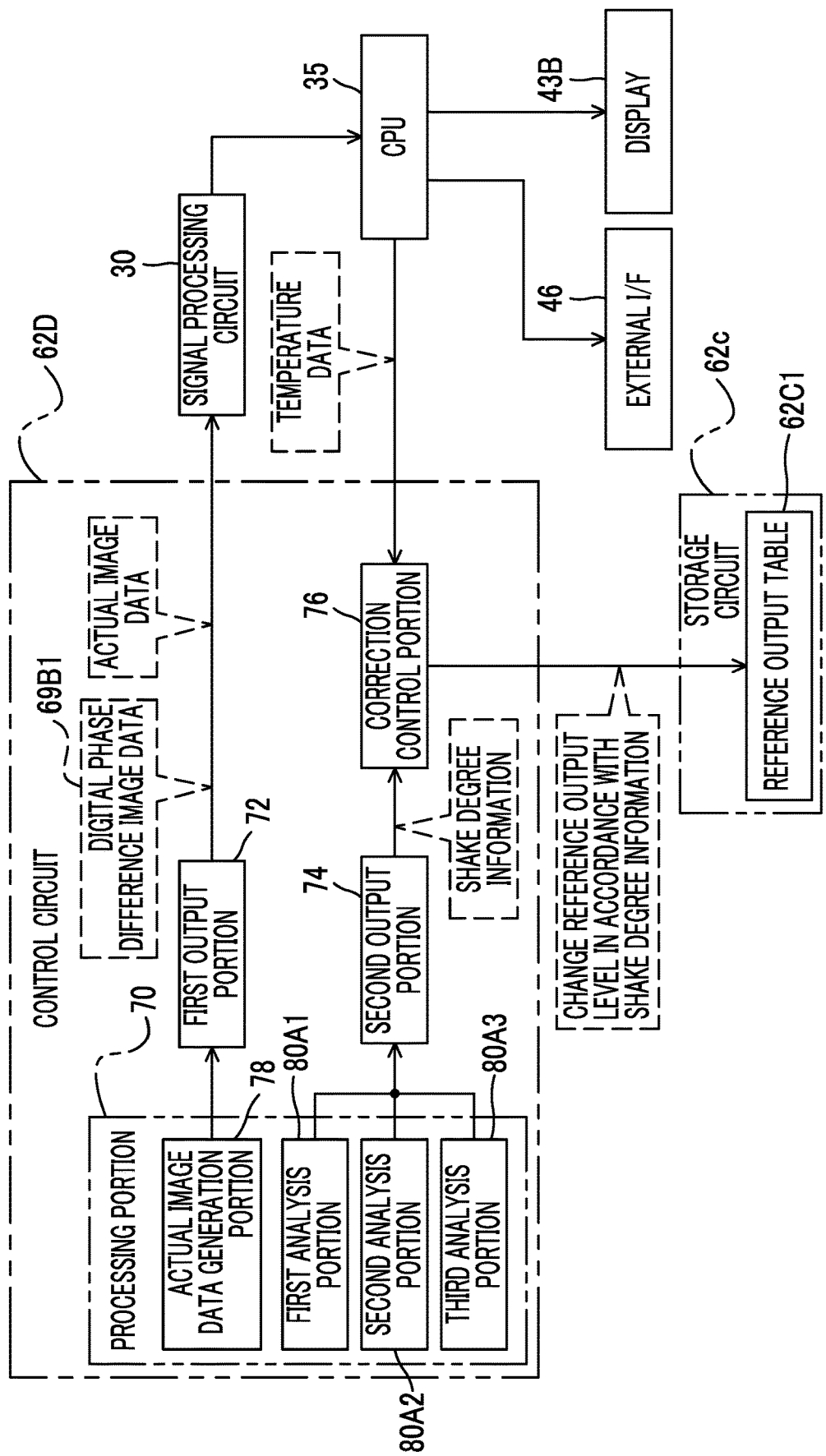
FIG. 18 is a block diagram illustrating an example of a relationship between the control circuit included in the imaging element according to the first embodiment and each apparatus around the control circuit.

As illustrated in FIG. 18 as an example, the second output portion 74 acquires the shake degree information from the N-th analysis portion 80A and outputs the acquired shake degree information to the correction control portion 76 at the same rate as the output frame rate. Meanwhile, the first output portion 72 acquires the actual image data and the digital phase difference image data 69B1 from the actual image data generation portion 78 for each frame and outputs the acquired actual image data and the digital phase difference image data 69B1 to the signal processing circuit 30 at the output frame rate.

The actual image data is subjected to various types of signal processing by the signal processing circuit 30 and then, is output to the CPU 35 together with the digital phase difference image data 69B1 by the signal processing circuit 30. The CPU 35 performs a continuous AF control in accordance with the digital phase difference image data 69B1 input from the signal processing circuit 30. In addition, the CPU 35 performs various types of processing based on the actual image data input from the signal processing circuit 30. For example, in a case where the actual image data is the still picture image data, the CPU 35 stores the still picture image data in the predetermined storage device through the external I/F 46 or displays the still picture image on the display 43B. In addition, in a case where the actual image data is the live view image data, the CPU 35 displays the live view image on the display 43B.

The correction control portion 76 performs a control for causing the optical shake correction portion 29 to correct the shake, using the vibration data and the used reference output level in the reference output table 62C1.

In addition, the correction control portion 76 updates the reference output table 62C1. In order to update the reference output table 62C1, the correction control portion 76 acquires the temperature data and the shake degree information. That is, the correction control portion 76 acquires the temperature data from the CPU 35 and acquires the shake degree information from the second output portion 74. Based on the temperature data and the shake degree information, the correction control portion 76 determines whether or not an update of the reference output table 62C1 (refer to FIG. 11) is necessary, and updates the reference output table 62C1 in a case where it is determined that the update is necessary.

In this case, first, the correction control portion 76 acquires the reference output level corresponding to the temperature indicated by the temperature data from the reference output table 62C1. Here, in a case where the reference output level corresponding to the temperature indicated by the temperature data is not present in the reference output table 62C1, the correction control portion 76 calculates the reference output level corresponding to the temperature indicated by the temperature data using a linear interpolation method (for example, interpolation). In the example illustrated in FIG. 19, as the reference output level in a case where the temperature (hereinafter, referred to as a "non-present temperature") not present in the reference output table 62C1 is 23.25° C., "506.2" is calculated from the reference output level for a predetermined temperature and a predetermined temperature using the linear interpolation method. The "predetermined temperature" here refers to a temperature predetermined in the reference output table 62C1. In the example illustrated in FIG. 19, 23.0° C. and 23.5° C. are illustrated as the predetermined temperature, and a reference output level "506" for 23.0° C. and a reference output level "507" for 23.5° C. are illustrated as the reference output level for the predetermined temperature.

Next, the correction control portion 76 calculates the changed reference output level based on the reference output level acquired from the reference output table 62C1, the shake degree information acquired from the second output portion 74, and the temperature indicated by the temperature data. For example, the changed reference output level is calculated using a predetermined operation expression that takes the reference output level, the shake degree information, the temperature, and a changed reference output level restriction value as independent variables and takes the changed reference output level as a dependent variable. In addition, here, the changed reference output level restriction value refers to a value with which a changed amount of the reference output level is restricted within the number of thinned pixels (described later).

In a case where the number of pixels corresponding to a difference (hereinafter, referred to as an "output level difference") between the reference output level and the calculated changed reference output level (hereinafter, referred to as the "number of pixels corresponding to the difference") is greater than the number of thinned pixels for the number of pixels of the live view image with respect to the number of pixels of the image having the highest resolution (hereinafter, simply referred to as the "number of thinned pixels"), a possibility that a shake corresponding to the output level difference is visually perceived in the image such as the live view image is increased even after the shake is corrected, compared to a case where the number of pixels corresponding to the difference is less than or equal to the number of thinned pixels.

The output level difference appears as an increase or decrease in angular velocity of the gyro sensor included in the vibration sensor 32. Thus, the displayed image is shifted by an amount of the increase or decrease in angular velocity. The number of pixels by which the image is shifted due to the reference output level input from the vibration sensor 32 is decided by an optical system such as the objective lens 15A and the lens group 15B (hereinafter, simply referred to as the "optical system") included in the imaging lens 40.

The "number of thinned pixels" is an example of a "degree of reduction of the number of pixels of the image data" according to the embodiments of the technology of the present disclosure. In addition, here, while "thinning" is illustrated as an example of reduction of the number of pixels, the number of pixels may be reduced using a method other than thinning, such as combining pixels.

Next, the correction control portion 76 determines whether or not the update of the reference output table 62C1 is necessary, in accordance with the changed reference output level obtained by calculation. In a case where it is determined that the update of the reference output table 62C1 is necessary, the correction control portion 76 updates the reference output table 62C1.

The update of the reference output table 62C1 refers to addition of a new changed reference output level and changing of the existing changed reference output level. Addition of the new changed reference output level refers to addition of a new changed reference output level to the reference output table 62C1 in a case where the changed reference output level for a certain temperature is not decided. In the example illustrated in FIG. 11, the changed reference output level within a range of 20.0° C. to 22.5° C. and a range of 26.5° C. to 27.0° C. is not decided. Thus, in a case where the changed reference output level for a temperature within this range is calculated, the new calculated changed reference output level is added.

Changing of the existing changed reference output level refers to changing of the changed reference output level already decided for a certain temperature. In the example illustrated in FIG. 11, the changed reference output level within a range of 23.0° C. to 26.0° C. is decided. In a case where the changed reference output level is calculated for a temperature within this range, and the new calculated changed reference output level is different from the existing changed reference output level in the reference output table 62C1, the existing changed reference output level is changed to the new calculated changed reference output level.

In the example illustrated in FIG. 11, for example, in a case where the changed reference output level calculated for a temperature of 23.0° C. by the correction control portion 76 is "510", changing of the changed reference output level is not necessary. However, in a case where the changed reference output level calculated for a temperature of 23.0° C. by the correction control portion 76 is a value other than "510", the changed reference output level for a temperature of 23.0° C. is changed to the most recent value calculated by the correction control portion 76. Accordingly, the used reference output level for a temperature of 23.0° C. is also changed to the same value as the changed reference output level after update. In addition, in a case where the changed reference output level for another temperature is decided in the reference output table 62C1, the changed reference output level for the other temperature is also changed using the linear interpolation method.

Figure 19:
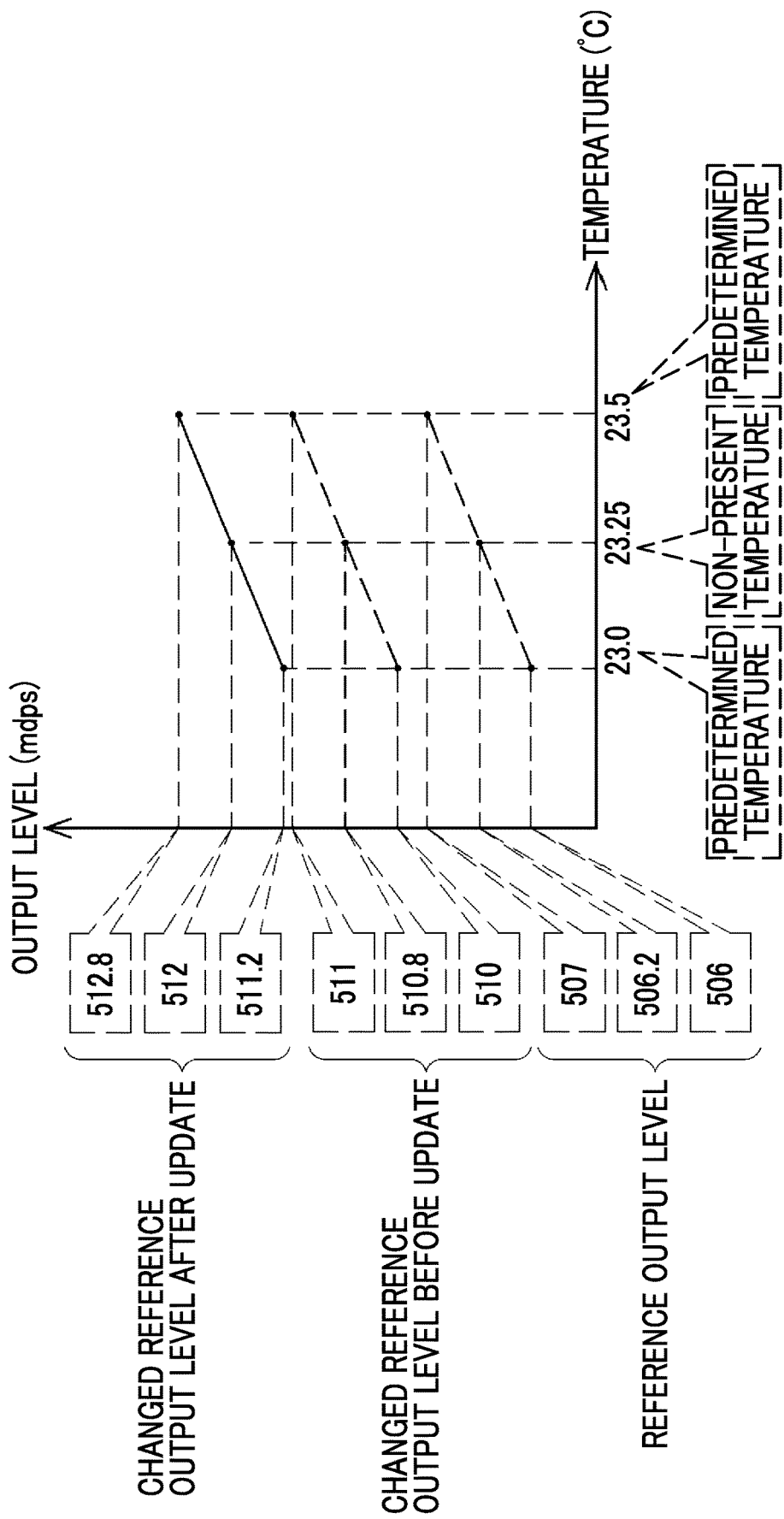
FIG. 19 is a graph for describing a method of calculating a changed reference output level from the reference output level and is a graph illustrating an example of a relationship between the output level and a temperature.

In addition, in a case where the changed reference output level is calculated for the non-present temperature, the changed reference output level for the existing temperature in the reference output table 62C1 is also changed. Specifically, the changed reference output level in the reference output table 62C1 is changed using the linear interpolation method based on the non-present temperature and the changed reference output level calculated for the non-present temperature. For example, as illustrated in FIG. 19, the changed reference output level "510" at 23.0° C. is changed to "511.2", and the changed reference output level "511" at 23.5° C. is changed to "512.8" in accordance with a change in changed reference output level at the non-present temperature of 23.25° C. from "510.8" to "512". In the same manner, the changed reference output level for the other existing temperature is also changed.

In addition, for example, in a state where the changed reference output level is not decided at all in the reference output table 62C1, in a case where the changed reference output level for the non-present temperature is calculated, the changed reference output level for an adjacent temperature is calculated using the linear interpolation method from the non-present temperature, the reference output level calculated for the non-present temperature, the changed reference output level calculated for the non-present temperature, a temperature (hereinafter, referred to as the "adjacent temperature") adjacent to the non-present temperature in the reference output table 62C1, and the reference output level for the adjacent temperature in the reference output table 62C1. The calculated changed reference output level is added to the reference output table 62C1.

Figure 20:
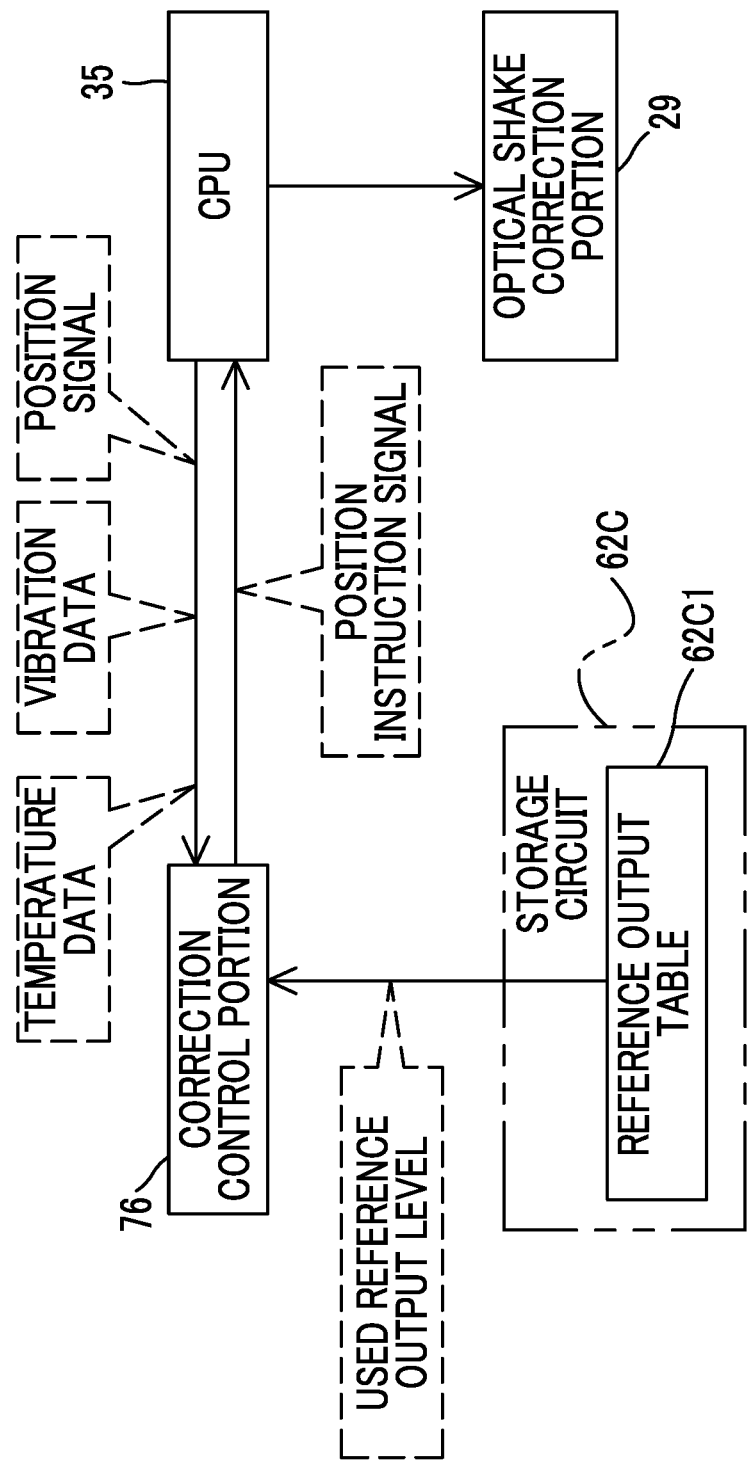
FIG. 20 is a block diagram illustrating an example of a relationship among a correction control portion of the control circuit included in the imaging element according to the first embodiment, the storage circuit, the CPU, and an optical shake correction portion.

As illustrated in FIG. 20 as an example, the correction control portion 76 acquires the temperature data from the CPU 35 and acquires the used reference output level corresponding to the temperature indicated by the acquired temperature data from the reference output table 62C1. The correction control portion 76 acquires the vibration data from the CPU 35 and calculates the shake correction amount based on the acquired vibration data and the used reference output level. The correction control portion 76 acquires the position signal from the CPU 35, generates the position instruction signal based on the acquired position signal and the shake correction amount, and outputs the generated position instruction signal to the CPU 35. The CPU 35 controls the optical shake correction portion 29 in accordance with the position instruction signal input from the correction control portion 76. That is, the position of the vibration-proof lens 15B2 is adjusted to the position indicated by the position instruction signal in the optical shake correction portion 29. Accordingly, the shake is corrected.

Next, an action of the imaging apparatus 10 will be described.

First, phase difference pixel processing executed by the processing circuit 62 will be described with reference to FIG. 21.

Figure 21:
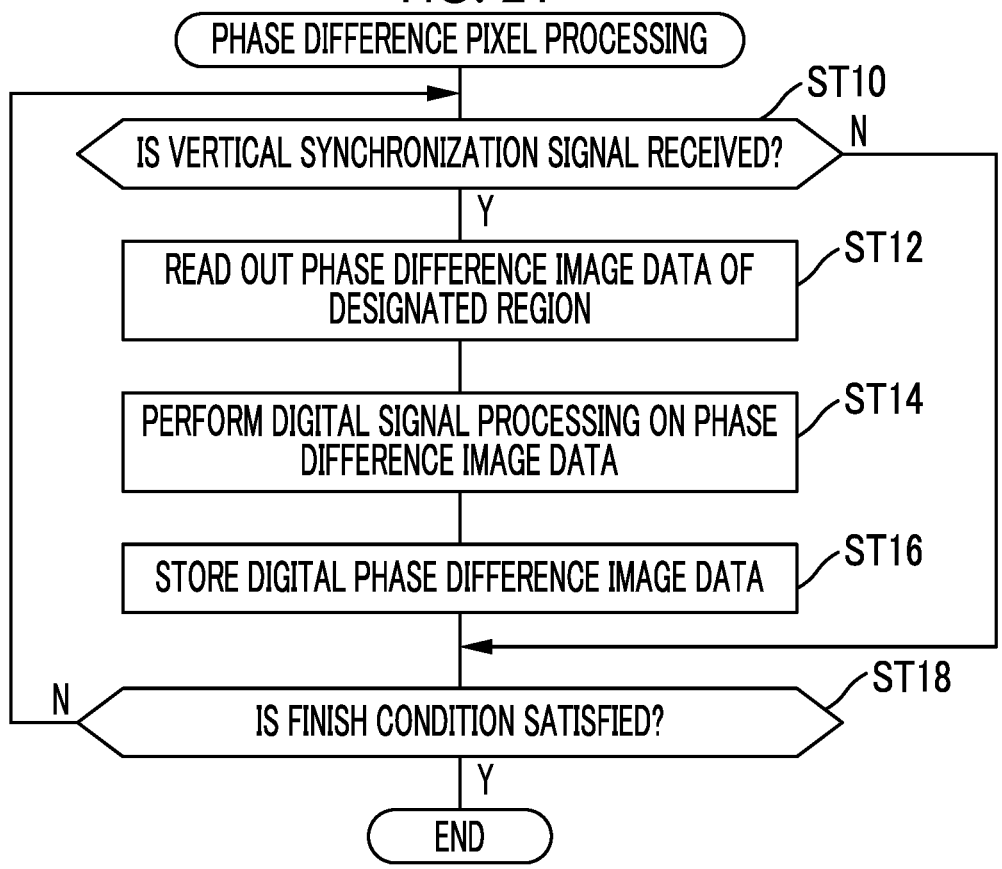
FIG. 21 is a flowchart illustrating an example of a flow of phase difference pixel processing according to the first embodiment.

In the phase difference pixel processing illustrated in FIG. 21, first, in step ST10, the control circuit 62D determines whether or not the vertical synchronization signal is received as the timing control signal. In step ST10, in a case where the vertical synchronization signal is not received, a negative determination is made, and the phase difference pixel processing transitions to step ST18. In step ST10, in a case where the vertical synchronization signal is received, a positive determination is made, and the phase difference pixel processing transitions to step ST12.

In step ST12, the first reading circuit 62A1 reads out the analog phase difference image data 69A1 from the phase difference pixel using all phase difference pixel lines 61A of one frame as a target. Then, the phase difference pixel processing transitions to step ST14.

In step ST14, the digital processing circuit 62B converts the analog phase difference image data 69A1 into the digital phase difference image data 69B1 by performing the digital signal processing on the analog phase difference image data 69A1 read out by the first reading circuit 62A1.

In subsequent step ST16, the control circuit 62D acquires the digital phase difference image data 69B1 from the digital processing circuit 62B and stores the acquired digital phase difference image data 69B1 in the memory 64. Then, the phase difference pixel processing transitions to step ST18.

In step ST18, the control circuit 62D determines whether or not a condition (hereinafter, referred to as a "phase difference pixel processing finish condition") under which the phase difference pixel processing is finished is satisfied. For example, a condition that an instruction to finish the phase difference pixel processing is received by the reception device 43A (refer to FIG. 2) is exemplified as the phase difference pixel processing finish condition. In step ST18, in a case where the phase difference pixel processing finish condition is not satisfied, a negative determination is made, and the phase difference pixel processing transitions to step ST10. In step ST18, in a case where the phase difference pixel processing finish condition is satisfied, a positive determination is made, and the phase difference pixel processing is finished.

Next, non-phase difference pixel processing executed by the processing circuit 62 will be described with reference to FIG. 22.

Figure 22:
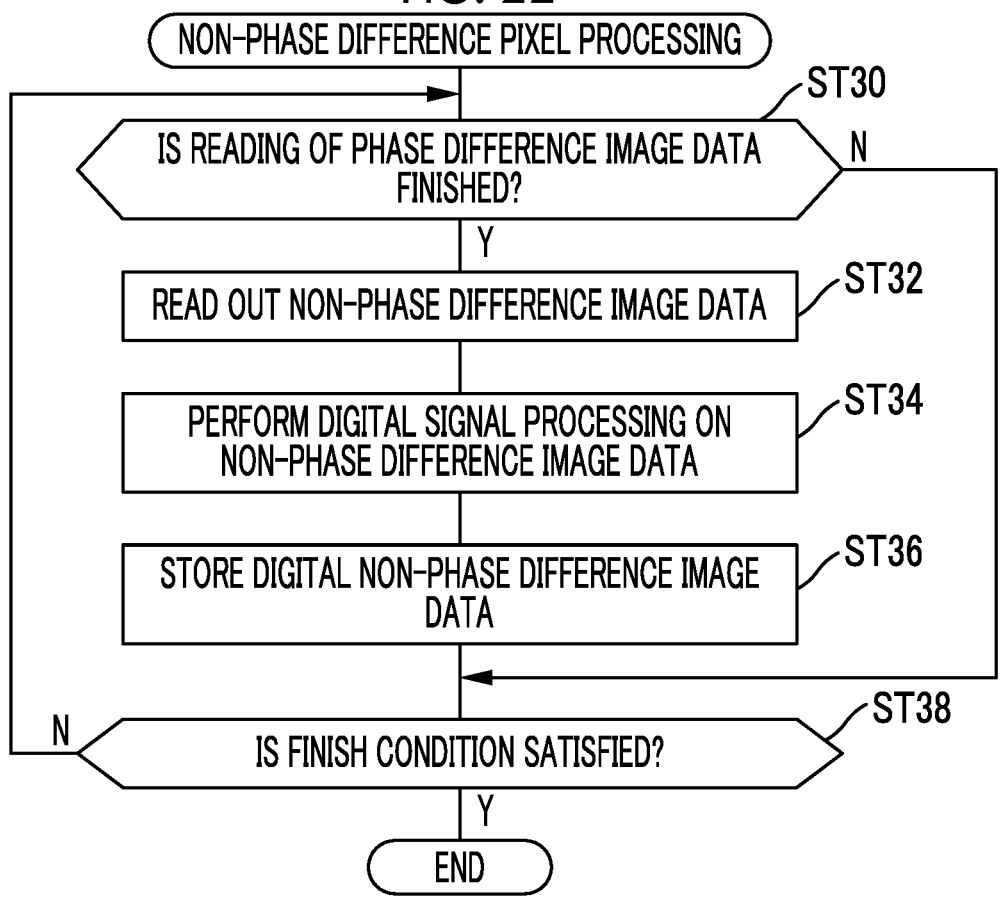
FIG. 22 is a flowchart illustrating an example of a flow of non-phase difference pixel processing according to the first embodiment.

In the non-phase difference pixel processing illustrated in FIG. 22, first, in step ST30, a determination as to whether or not reading of the analog phase difference image data 69A1 of one frame by the first reading circuit 62A1 is finished is performed. In step ST30, in a case where reading of the analog phase difference image data 69A1 of one frame by the first reading circuit 62A1 is not finished, a negative determination is made, and the non-phase difference pixel processing transitions to step ST38. In step ST30, in a case where reading of the analog phase difference image data 69A1 of one frame by the first reading circuit 62A1 is finished, a positive determination is made, and the non-phase difference pixel processing transitions to step ST32.

In step ST32, the second reading circuit 62A2 reads out the analog non-phase difference image data 69A2 from the non-phase difference pixel N using all non-phase difference pixel lines 61B of one frame as a target. Then, the non-phase difference pixel processing transitions to step ST34.

In step ST34, the digital processing circuit 62B converts the analog non-phase difference image data 69A2 into the digital non-phase difference image data 69B2 by performing the digital signal processing on the analog non-phase difference image data 69A2 read out by the second reading circuit 62A2.

In subsequent step ST36, the control circuit 62D acquires the digital non-phase difference image data 69B2 from the digital processing circuit 62B and stores the acquired digital non-phase difference image data 69B2 in the memory 64. Then, the non-phase difference pixel processing transitions to step ST38.

In step ST38, the control circuit 62D determines whether or not a condition (hereinafter, referred to as a "non-phase difference pixel processing finish condition") under which the non-phase difference pixel processing is finished is satisfied. For example, a condition that an instruction to finish the non-phase difference pixel processing is received by the reception device 43A (refer to FIG. 2) is exemplified as the non-phase difference pixel processing finish condition. In step ST38, in a case where the non-phase difference pixel processing finish condition is not satisfied, a negative determination is made, and the non-phase difference pixel processing transitions to step ST30. In step ST38, in a case where the non-phase difference pixel processing finish condition is satisfied, a positive determination is made, and the non-phase difference pixel processing is finished.

Next, actual image data generation portion processing executed by the processing circuit 62 will be described with reference to FIG. 23.

Figure 23:
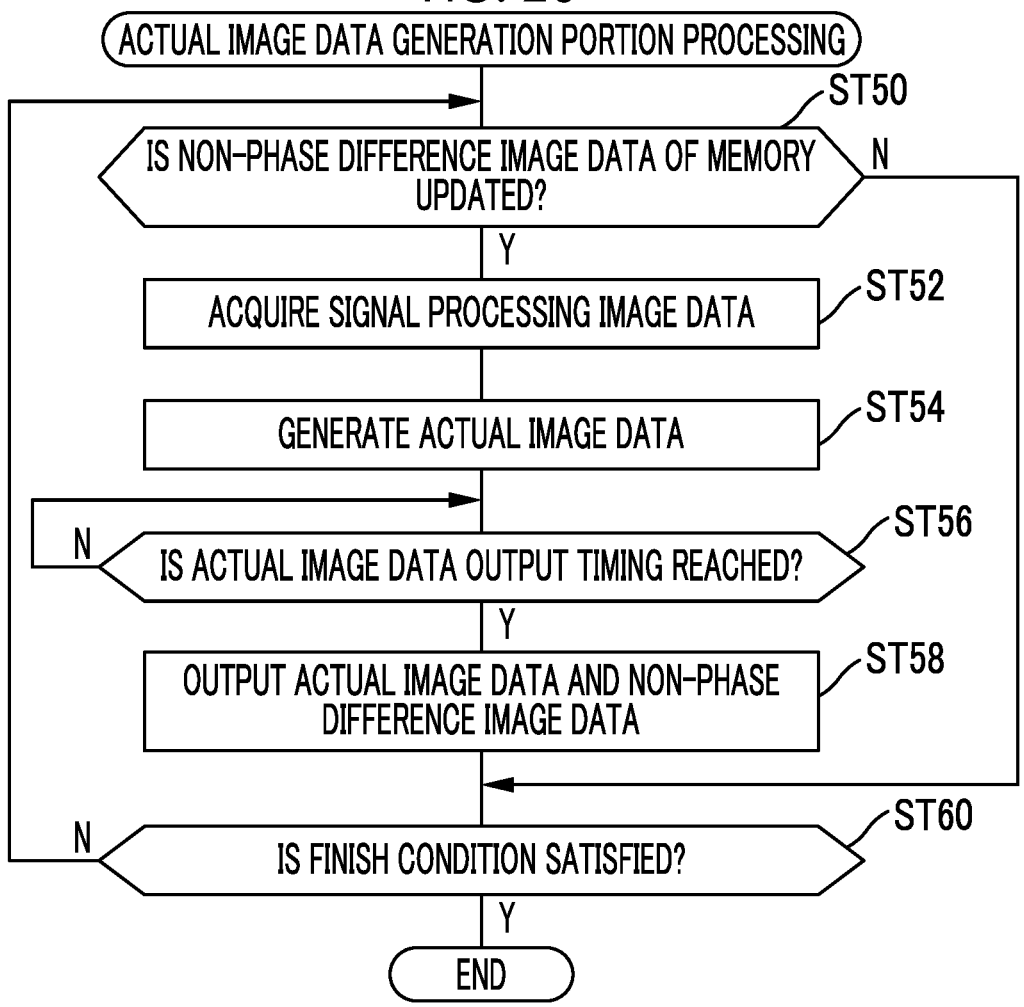
FIG. 23 is a flowchart illustrating an example of a flow of actual image data generation portion processing according to the first embodiment.

In the actual image data generation portion processing illustrated in FIG. 23, first, in step ST50, the actual image data generation portion 78 determines whether or not the digital non-phase difference image data 69B2 in the memory 64 is updated. In step ST50, in a case where the digital non-phase difference image data 69B2 in the memory 64 is not updated, a negative determination is made, and the actual image data generation portion processing transitions to step ST60. In step ST50, in a case where the digital non-phase difference image data 69B2 in the memory 64 is updated, a positive determination is made, and the actual image data generation portion processing transitions to step ST52.

In step ST52, the actual image data generation portion 78 acquires the signal processing image data and the digital phase difference image data 69B1 from the memory 64. Then, the actual image data generation portion processing transitions to step ST54.

In step ST54, the actual image data generation portion 78 generates the actual image data by performing the signal processing on the signal processing image data acquired in step ST52. Then, the actual image data generation portion processing transitions to step ST56.

In step ST56, the first output portion 72 determines whether or not a timing (actual image data output timing) at which the actual image data is output is reached. The actual image data output timing is a timing defined by the output frame rate. In step ST56, in a case where the actual image data output timing is not reached, a negative determination is made, and the determination of step ST56 is performed again. In step ST56, in a case where the actual image data output timing is reached, a positive determination is made, and the actual image data generation portion processing transitions to step ST58.

In step ST58, the first output portion 72 acquires the actual image data and the digital phase difference image data 69B1 from the actual image data generation portion 78 and outputs the acquired actual image data and the digital phase difference image data 69B1 to the signal processing circuit 30.

In the signal processing circuit 30, various types of signal processing are performed on the actual image data input from the imaging element 44, and the actual image data on which the various types of signal processing are performed is output to the CPU 35. The CPU 35 displays the image indicated by the actual image data on the display 43B or stores the actual image data in the predetermined storage device through the external I/F 46. In addition, the digital phase difference image data 69B1 is output to the CPU 35 by the signal processing circuit 30, and the digital phase difference image data 69B1 is used for the AF control by the CPU 35.

In subsequent step ST60, the control circuit 62D determines whether or not a condition (hereinafter, referred to as an "actual image data generation portion processing finish condition") under which the actual image data generation portion processing is finished is satisfied. For example, a condition that an instruction to finish the actual image data generation portion processing is received by the reception device 43A (refer to FIG. 2) is exemplified as the actual image data generation portion processing finish condition. In step ST60, in a case where the actual image data generation portion processing finish condition is not satisfied, a negative determination is made, and the actual image data generation portion processing transitions to step ST50. In step ST60, in a case where the actual image data generation portion processing finish condition is satisfied, a positive determination is made, and the actual image data generation portion processing is finished.

Next, N-th analysis image data acquisition processing executed by the processing circuit 62 will be described with reference to FIG. 24.

Figure 24:
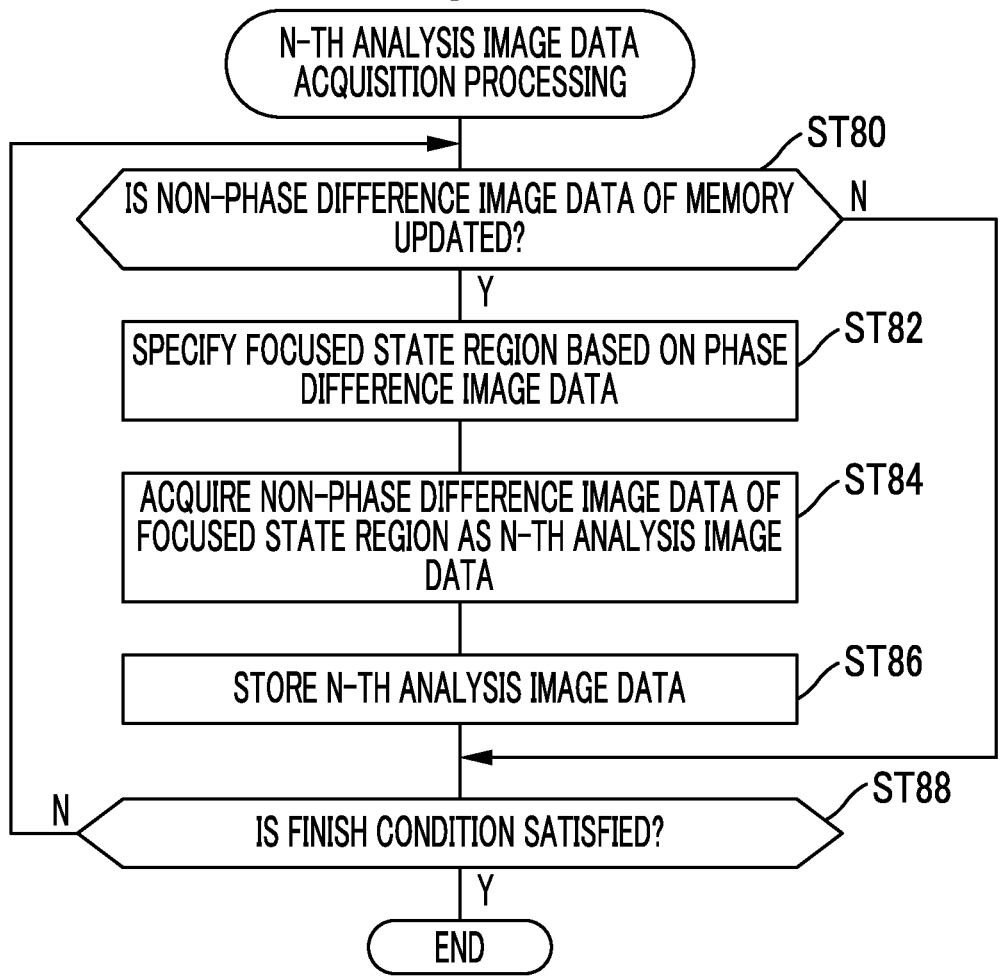
FIG. 24 is a flowchart illustrating an example of a flow of N-th analysis image data acquisition processing according to the first embodiment.

In the N-th analysis image data acquisition processing illustrated in FIG. 24, first, in step ST80, the control circuit 62D determines whether or not the digital non-phase difference image data 69B2 in the memory 64 is updated. In step ST80, in a case where the digital non-phase difference image data 69B2 in the memory 64 is not updated, a negative determination is made, and the N-th analysis image data acquisition processing transitions to step ST88. In step ST80, in a case where the digital non-phase difference image data 69B2 in the memory 64 is updated, a positive determination is made, and the N-th analysis image data acquisition processing transitions to step ST82.

In step ST82, the control circuit 62D acquires the digital phase difference image data 69B1 from the memory 64 and specifies the focused state region based on the acquired digital phase difference image data 69B1. Then, the N-th analysis image data acquisition processing transitions to step ST84.

In step ST84, the control circuit 62D acquires the digital non-phase difference image data 69B2 of the same frame as the digital phase difference image data 69B1 acquired in step ST82 from the memory 64. The control circuit 62D acquires, as the N-th analysis image data, the digital non-phase difference image data 69B2 that corresponds to the focused state region specified in step ST82 in the digital non-phase difference image data 69B2 acquired from the memory 64. Then, the N-th analysis image data acquisition processing transitions to step ST86.

In step ST86, the control circuit 62D stores the N-th analysis image data acquired in step ST84 in the memory 64. Then, the N-th analysis image data acquisition processing transitions to step ST88.

In step ST88, the control circuit 62D determines whether or not a condition (hereinafter, referred to as an "N-th analysis image data acquisition processing finish condition") under which the N-th analysis image data acquisition processing is finished is satisfied. For example, a condition that an instruction to finish the N-th analysis image data acquisition processing is received by the reception device 43A (refer to FIG. 2) is exemplified as the N-th analysis image data acquisition processing finish condition. In step ST88, in a case where the N-th analysis image data acquisition processing finish condition is not satisfied, a negative determination is made, and the N-th analysis image data acquisition processing transitions to step ST80. In step ST88, in a case where the N-th analysis image data acquisition processing finish condition is satisfied, a positive determination is made, and the N-th analysis image data acquisition processing is finished.

Next, N-th analysis portion processing executed by the processing circuit 62 will be described with reference to FIG. 25.

Figure 25:
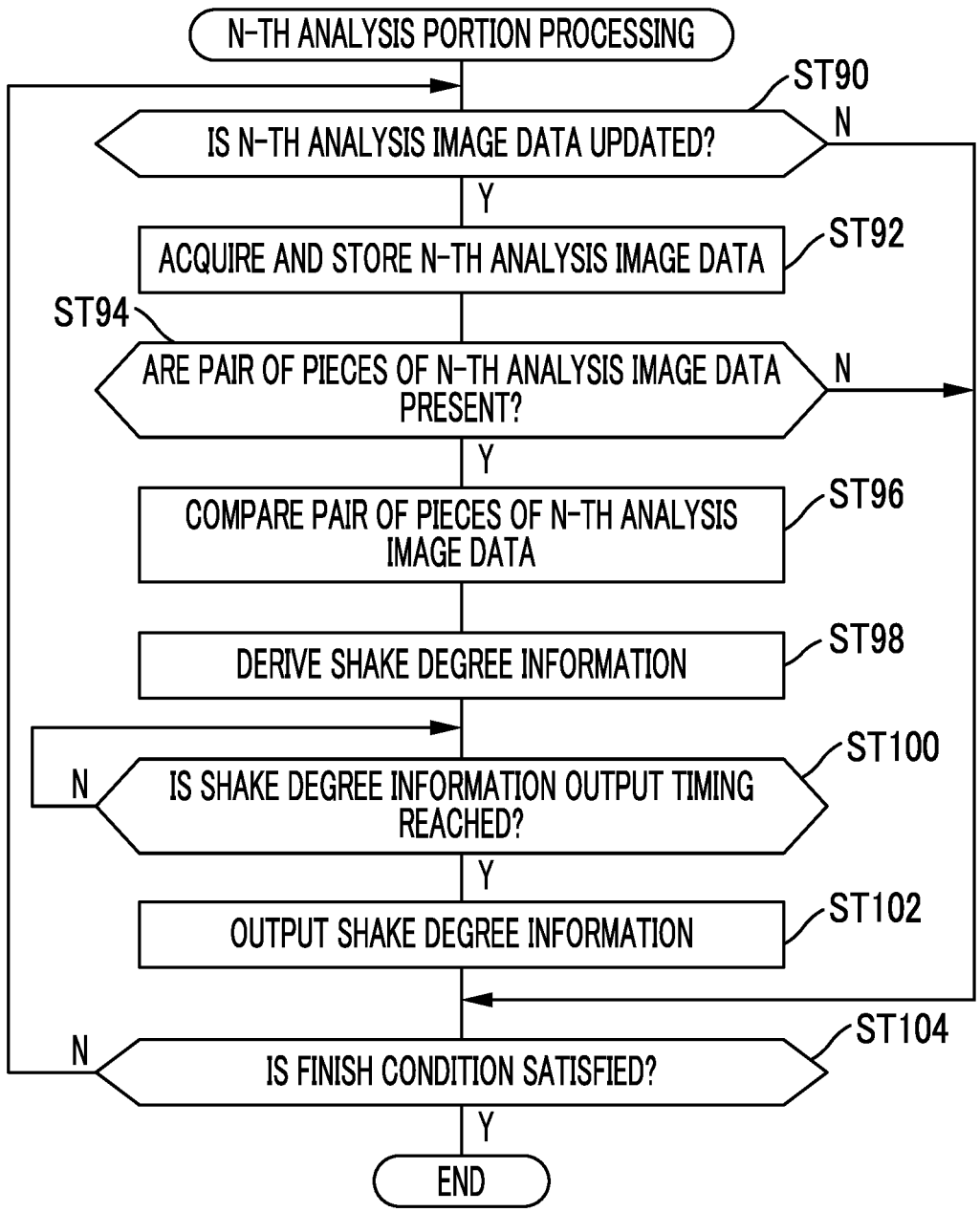
FIG. 25 is a flowchart illustrating an example of a flow of N-th analysis portion processing according to the first embodiment.

In the N-th analysis portion processing illustrated in FIG. 25, first, in step ST90, the N-th analysis portion 80A determines whether or not the N-th analysis image data in the memory 64 is updated by executing processing of step ST86 illustrated in FIG. 24. In step ST90, in a case where the N-th analysis image data in the memory 64 is not updated, a negative determination is made, and the N-th analysis portion processing transitions to step ST104. In step ST90, in a case where the N-th analysis image data in the memory 64 is updated, a positive determination is made, and the N-th analysis portion processing transitions to step ST92.

In step ST92, the N-th analysis portion 80A acquires the N-th analysis image data from the memory 64 and stores the acquired N-th analysis image data in the storage region 81 using the FIFO method. Then, the N-th analysis portion processing transitions to step ST94.

In step ST94, the N-th analysis portion 80A determines whether or not the pair of pieces of the N-th analysis image data are stored in the storage region 81. In step ST94, in a case where the pair of pieces of the N-th analysis image data are not stored in the storage region 81, a negative determination is made, and the N-th analysis portion processing transitions to step ST104. In step ST94, in a case where the pair of pieces of the N-th analysis image data are stored in the storage region 81, a positive determination is made, and the N-th analysis portion processing transitions to step ST96.

In step ST96, the N-th analysis portion 80A compares the pair of pieces of the N-th analysis image data. Then, the N-th analysis portion processing transitions to step ST98.

In step ST98, the N-th analysis portion 80A derives the shake degree information from the comparison result of the pair of pieces of the N-th analysis image data in step ST96. Then, the N-th analysis portion processing transitions to step ST100.

In step ST100, the second output portion 74 determines whether or not a timing (shake degree information output timing) at which the shake degree information is output is reached. The shake degree information output timing is a timing defined by the same rate as the output frame rate. In step ST100, in a case where the shake degree information output timing is not reached, a negative determination is made, and the determination of step ST100 is performed again. In step ST100, in a case where the shake degree information output timing is reached, a positive determination is made, and the N-th analysis portion processing transitions to step ST102.

In step ST102, the second output portion 74 acquires the shake degree information derived in step ST98 and outputs the acquired shake degree information to the correction control portion 76. Then, the N-th analysis portion processing transitions to step ST104.

In step ST104, the control circuit 62D determines whether or not a condition (hereinafter, referred to as an "N-th analysis portion processing finish condition") under which the N-th analysis portion processing is finished is satisfied. For example, a condition that an instruction to finish the N-th analysis portion processing is received by the reception device 43A (refer to FIG. 2) is exemplified as the N-th analysis portion processing finish condition. In step ST104, in a case where the N-th analysis portion processing finish condition is not satisfied, a negative determination is made, and the N-th analysis portion processing transitions to step ST90. In step ST104, in a case where the N-th analysis portion processing finish condition is satisfied, a positive determination is made, and the N-th analysis portion processing is finished.

Next, correction control portion processing executed by the processing circuit 62 will be described with reference to FIG. 26. For convenience of description, the description here assumes that the changed reference output level in the reference output table 62C1 is not decided (not present).

Figure 26:
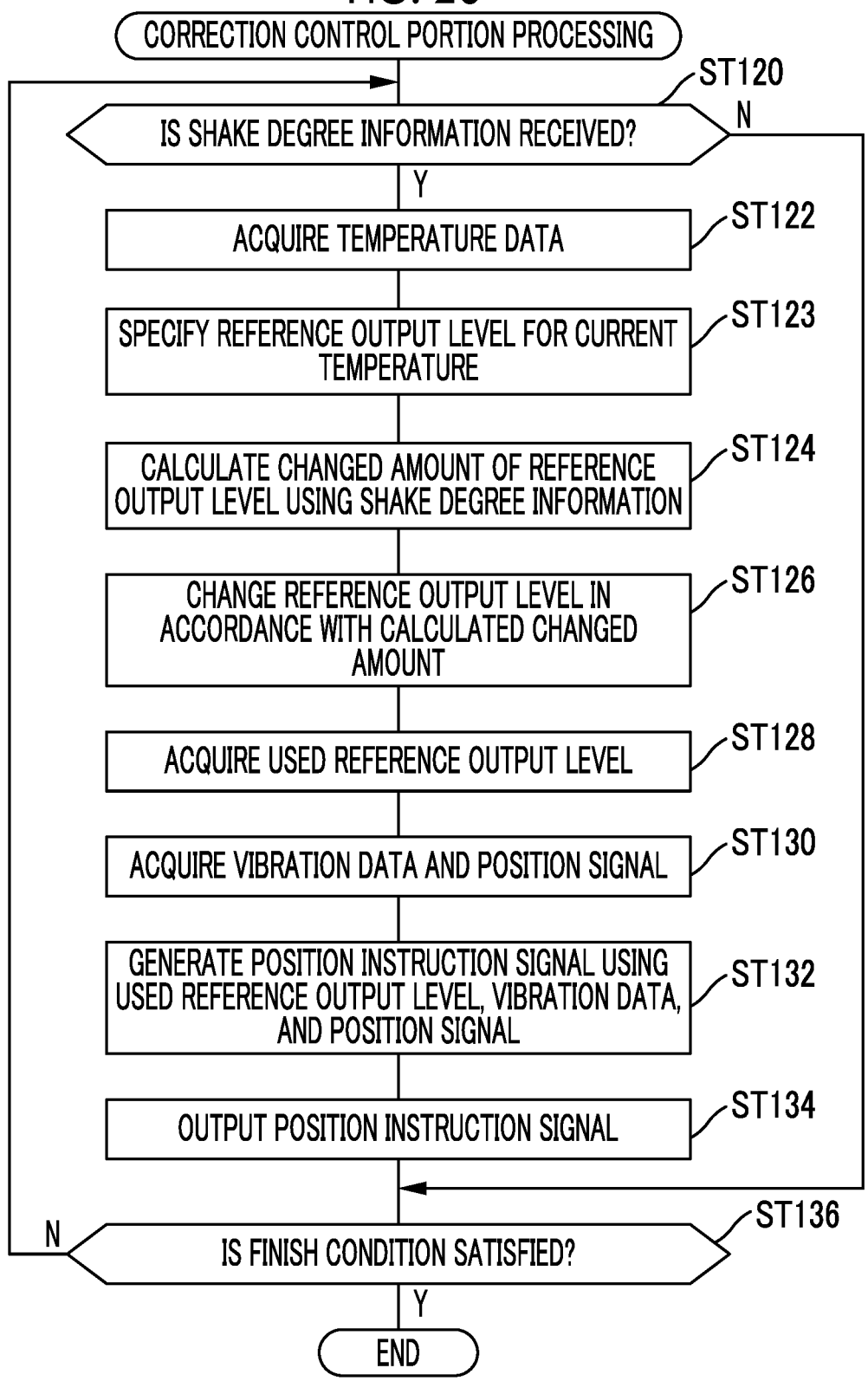
FIG. 26 is a flowchart illustrating an example of a flow of correction control portion processing according to the first embodiment.

In the correction control portion processing illustrated in FIG. 26, first, in step ST120, the correction control portion 76 determines whether or not the shake degree information output from the second output portion 74 is received. In step ST120, in a case where the shake degree information output from the second output portion 74 is not received, a negative determination is made, and the correction control portion processing transitions to step ST136. In step ST120, in a case where the shake degree information output from the second output portion 74 is received, a positive determination is made, and the correction control portion processing transitions to step ST122.

In step ST122, the correction control portion 76 acquires the most recent temperature data measured by the temperature sensor 34 from the CPU 35. Then, the correction control portion processing transitions to step ST123.

In step ST123, the correction control portion 76 specifies, from the reference output table 62C1, the reference output level for the current temperature that is the temperature indicated by the temperature data acquired in step ST122. Then, the correction control portion processing transitions to step ST124.

In step ST124, the correction control portion 76 calculates the changed amount of the reference output level specified in step ST123 using the shake degree information received in step ST120. Then, the correction control portion processing transitions to step ST126.

In step ST126, the correction control portion 76 generates the changed reference output level by changing the reference output level in accordance with the changed amount calculated in step ST124. Accordingly, the reference output table 62C1 is updated as described above. The changed reference output level generated in step ST126 is employed as the used reference output level.

In subsequent step ST126, the correction control portion 76 acquires the used reference output level corresponding to the current temperature from the reference output table 62C1 updated in step ST126. Then, the correction control portion processing transitions to step ST130.

In step ST130, the correction control portion 76 acquires the vibration data and the position signal from the CPU 35. Then, the correction control portion processing transitions to step ST132.

In step ST132, the correction control portion 76 generates the position instruction signal using the used reference output level acquired in step ST128, the vibration data acquired in step ST130, and the position signal acquired in step ST130. Then, the correction control portion processing transitions to step ST134.

In step ST134, the correction control portion 76 outputs the position instruction signal generated in step ST132 to the CPU 35. Then, the correction control portion processing transitions to step ST136.

In step ST136, the control circuit 62D determines whether or not a condition (hereinafter, referred to as a "correction control portion processing finish condition") under which the correction control portion processing is finished is satisfied. For example, a condition that an instruction to finish the correction control portion processing is received by the reception device 43A (refer to FIG. 2) is exemplified as the correction control portion processing finish condition. In step ST136, in a case where the correction control portion processing finish condition is not satisfied, a negative determination is made, and the correction control portion processing transitions to step ST120. In step ST136, in a case where the correction control portion processing finish condition is satisfied, a positive determination is made, and the correction control portion processing is finished.

Each time the reference output level is changed in step ST126 included in the correction control portion processing, the reference output level after change, that is, the changed reference output level, is reflected on correction of the shake by the optical shake correction portion 29, by executing processing of step ST128 to step ST134. Accordingly, the changed reference output level which is the reference output level after change is reflected on correction of the shake by the optical shake correction portion 29 for each periodically determined frame. The N-th analysis image data obtained after correction of the shake is acquired by the N-th analysis portion 80A in step ST92 of the N-th analysis portion processing illustrated in FIG. 25 and used.

That is, the first analysis image data 69B2b, the second analysis image data 69B2c, and the third analysis image data 69B2d are image data for each periodically determined frame, and the changed reference output level which is the reference output level after change is reflected on correction of the shake by the optical shake correction portion 29 for each of the image data. The changed reference output level is reflected on correction of the shake by the optical shake correction portion 29 for each frame, and the first analysis image data 69B2b obtained after correction of the shake is used for deriving the shake degree information by the first analysis portion 80A1. In addition, the changed reference output level which is the reference output level after change is reflected on correction of the shake by the optical shake correction portion 29 for each frame, and the second analysis image data 69B2c obtained after correction of the shake is used for deriving the shake degree information by the second analysis portion 80A2. Furthermore, the changed reference output level which is the reference output level after change is reflected on correction of the shake by the optical shake correction portion 29 for each frame, and the third analysis image data 69B2d obtained after correction of the shake is used for deriving the shake degree information by the third analysis portion 80A3. While the description here assumes that the changed reference output level in the reference output table 62C1 is not decided, the changed reference output level after update may be reflected on correction of the shake by the optical shake correction portion 29 even in a case where the changed reference output level is decided.

In such a manner, by reflecting the reference output level after change on correction of the shake by the optical shake correction portion 29, the shake degree information is derived in the first analysis portion 80A1 based on the first analysis image data 69B2b in which the shake is corrected by the optical shake correction portion 29. In addition, the shake degree information is derived in the second analysis portion 80A2 based on the second analysis image data 69B2c in which the shake is corrected by the optical shake correction portion 29. Furthermore, the shake degree information is derived in the third analysis portion 80A3 based on the third analysis image data 69B2d in which the shake is corrected by the optical shake correction portion 29.

As described above, in the imaging apparatus 10, the actual image data is output at the output frame rate by the first output portion 72. In addition, the shake degree information is derived by the N-th analysis portion 80A based on the N-th analysis image data, and the shake degree information is output at the same rate as the output frame rate by the second output portion 74. That is, there is no difference between a period in which the actual image data is output, and a period in which the shake degree information is output. Accordingly, real-timeness of output of the shake degree information with respect to output of the actual image data can be improved, compared to a case where the shake degree information is output at a time interval longer than a period defined by the output frame rate.

In addition, in the imaging apparatus 10, the highest resolution is employed as a resolution of the N-th analysis image data. Accordingly, the shake degree information having high accuracy can be derived, compared to a case where the resolution of the N-th analysis image data analyzed by the N-th analysis portion 80A is less than the highest resolution.

In addition, in the imaging apparatus 10, the N-th analysis image data is partial image data indicating a partial image of the digital non-phase difference image data 69B2. Accordingly, a processing load for analysis in the N-th analysis portion 80A can be reduced, compared to a case where image data of all pixels of the digital non-phase difference image data 69B2 is analyzed by the N-th analysis portion 80A.

In addition, in the imaging apparatus 10, the N-th analysis image data is the digital non-phase difference image data 69B2 that corresponds to the focused state region in the digital non-phase difference image data 69B2. Accordingly, the shake degree information having high accuracy can be derived, compared to a case where the digital non-phase difference image data 69B2 corresponding to an image side region in a non-focused state is analyzed by the N-th analysis portion 80A.

In addition, in the imaging apparatus 10, the focused state region is specified by analyzing the digital phase difference image data 69B1 obtained in the same frame as the digital non-phase difference image data 69B2 by the control circuit 62D. Accordingly, a speed of derivation of the shake degree information can be increased, compared to a case where the shake degree information is derived by analyzing the digital non-phase difference image data 69B2.

In addition, in the imaging apparatus 10, in the processing portion 70, the actual image data is generated based on the time series data obtained by performing imaging at the imaging frame rate, and the shake degree information is derived. Accordingly, generation of the actual image data and derivation of the shake degree information can be performed in parallel.

In addition, in the imaging apparatus 10, the actual image data is output by the first output portion 72, and the N-th analysis image data is used for deriving the shake degree information by the N-th analysis portion 80A. Accordingly, real-timeness of derivation of the shake degree information with respect to output of the actual image data by the first output portion 72 can be improved, compared to a case where output of the actual image data and derivation of the shake degree information are performed by only the N-th analysis portion 80A without using the first output portion 72.

In addition, in the imaging apparatus 10, the N-th analysis portion 80A derives the shake degree information for each periodically determined frame (for each frame in the period defined by 60 fps) based on the N-th analysis image data. Accordingly, a large number of pieces of the shake degree information can be derived, compared to a case where the shake degree information is derived for only a single frame.

In addition, in the imaging apparatus 10, the time interval between the frames of the time series data is the same as a period defined by the imaging frame rate (240 fps). The actual image data is output at the output frame rate (60 fps) by the first output portion 72. In addition, the time interval between the frames of the first analysis image data is the same as the period defined by the output frame rate. The time interval between the frames of the second analysis image data is also the same as the period defined by the output frame rate. The time interval between the frames of the third analysis image data is also the same as the period defined by the output frame rate. Accordingly, a frequency of acquisition of the N-th analysis image data can be increased while securing a frame rate necessary as the output frame rate of the actual image data, compared to a case where the time interval between the frames of the first analysis image data is a time interval longer than the period defined by the output frame rate.

In addition, in the imaging apparatus 10, the reference output level is changed in accordance with the shake degree information by the correction control portion 76 incorporated in the imaging element 44. The control for causing the optical shake correction portion 29 to correct the shake is performed by the correction control portion 76 based on the vibration data and the reference output level after change. Accordingly, correction accuracy of the shake can be increased, compared to a case where the reference output level is fixed.

In addition, in the imaging apparatus 10, the changed amount of the reference output level is restricted within a range of which an upper limit is the number of thinned pixels. Accordingly, visual perception of a change in reference output level can be suppressed, compared to a case where the reference output level is changed without restriction.

In addition, in the imaging apparatus 10, each of the first analysis image data 69B2b, the second analysis image data 69B2c, and the third analysis image data 69B2d is image data that is obtained by reflecting the reference output level after change on correction of the shake by the optical shake correction portion 29 each time the reference output level is changed. Accordingly, the shake degree information having high accuracy can be derived, compared to a case where the shake degree information is derived by analyzing image data obtained by reflecting the fixed reference output level on correction of the shake by the optical shake correction portion 29.

In addition, in the imaging apparatus 10, the shake is optically corrected by the optical shake correction portion 29. Accordingly, a load for the image processing can be reduced, compared to a case of using the EIS.

In addition, in the imaging apparatus 10, the imaging element 44 is an imaging element in which the photoelectric conversion element 61, the processing circuit 62, and the memory 64 are formed in one chip. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, in the imaging apparatus 10, the laminated imaging element in which the photoelectric conversion element 61 is laminated with the memory 64 is employed as the imaging element 44. Accordingly, since a wire that connects the photoelectric conversion element 61 to the memory 112 can be shortened, a wire delay can be reduced. Consequently, a transfer speed of the image data 69 from the photoelectric conversion element 61 to the memory 64 can be increased, compared to a case where the photoelectric conversion element 61 and the memory 64 are not laminated. Improving the transfer speed contributes to high-speed processing in the entire processing circuit 62. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

Furthermore, in the imaging apparatus 10, the live view image or the like based on the actual image data is displayed on the display 43B. In addition, the actual image data is stored in the predetermined storage device. Accordingly, general-purpose properties of the actual image data can be increased.

While the imaging element in which the photoelectric conversion element 61, the processing circuit 62, and the memory 64 are formed in one chip is illustrated as the imaging element 44 in the first embodiment, the technology of the present disclosure is not limited thereto. For example, at least the photoelectric conversion element 61 and the memory 64 among the photoelectric conversion element 61, the processing circuit 62, and the memory 64 may be formed in one chip.

In addition, in the first embodiment, while the highest resolution is employed as the resolution of the N-th analysis image data, the technology of the present disclosure is not limited thereto. For example, the resolution of the N-th analysis image data may be a resolution higher than a resolution of the actual image data output by the first output portion 72. In this case, the shake degree information having high accuracy can be derived, compared to a case where the resolution of the N-th analysis image data is a resolution less than or equal to the resolution of the actual image data output by the first output portion 72.

In addition, in the first embodiment, while an example of a form in which the focused state is continuously maintained by the continuous AF mode is illustratively described, the technology of the present disclosure is also established in a case of the normal AF mode. In addition, the shake degree information may be derived using the digital non-phase difference image data 69B2 obtained in the non-focused state.

In addition, in the first embodiment, while the image data input into each of the actual image data generation portion 78 and the N-th analysis portion 80A is image data of different frames, the technology of the present disclosure is not limited thereto. Image data of the same frame may be used by each of the actual image data generation portion 78 and the N-th analysis portion 80A.

In addition, in the first embodiment, while an example of a form in which the shake degree information is output at the same rate as the output frame rate is illustratively described, the shake degree information may be output at a rate higher than the output frame rate, that is, in a period shorter than the period defined by the output frame rate.

In addition, in the first embodiment, while each of the time interval between the frames of the signal processing image data and the time interval between the frames of the N-th analysis image data is the same as the period defined by the output frame rate, the technology of the present disclosure is not limited thereto. For example, each of the time interval between the frames of the signal processing image data and the time interval between the frames of the N-th analysis image data may be a time interval that is longer than the period defined by the imaging frame rate and less than the period defined by the output frame rate.

In addition, in the embodiment, while an example of a form in which the signal processing image data is input into the actual image data generation portion 78 by skipping three frames, and image data of three frames between the signal processing image data is input into the N-th analysis portion 80A as the N-th analysis image data is illustrated, the technology of the present disclosure is not limited thereto. For example, acquisition of the signal processing image data by the actual image data generation portion 78 and acquisition of the N-th analysis image data by the N-th analysis portion 80A may be alternately performed for each frame.

In addition, in the first embodiment, while three pieces of analysis image data including the first analysis image data 69B2$b$, the second analysis image data 69B2$c$, and the third analysis image data 69B2$d$ are illustrated, the technology of the present disclosure is not limited thereto. For example, the number of pieces of the analysis image data may be changed in accordance with a difference between the imaging frame rate and the output frame rate. For example, in a case where the imaging frame rate is 300 fps, and the output frame rate is 60 fps, four pieces of the analysis image data (first to fourth analysis image data) may be used.

In addition, in the first embodiment, while an example of a form in which the focused state region is specified based on the digital phase difference image data 69B1 is illustratively described, the technology of the present disclosure is not limited thereto. For example, in a case where a contrast AF function is implemented in the imaging apparatus 10, focused state region specification information for specifying a position of the focused state region may be transmitted to the control circuit 62D from the CPU 35, and the control circuit 62D may specify the focused state region in accordance with the focused state region specification information.

In addition, in the first embodiment, while a thinned image obtained by thinning out the pixels is illustrated as the live view image, a method of reducing a data amount is not limited thereto. The data amount may be reduced by compression by combining the pixels using the image processing. In addition, in the first embodiment, while an example of a form in which processing of thinning out the pixels from the image data having the full resolution is performed is illustratively described, the image data may be acquired by thinning out the photosensitive pixels of the photoelectric conversion element 61.

In addition, in the first embodiment, while the OIS is illustrated as the method of correcting the shake, the technology of the present disclosure is not limited thereto. For example, the BIS or the EIS may be employed instead of the OIS, or correction methods of two or more of the OIS, the BIS, and the EIS may be combined.

Second Embodiment According to Technology of Present Disclosure

In the first embodiment, an example of a form in which the correction control portion 76 is incorporated in the imaging element 44 is described. In a second embodiment according to the technology of the present disclosure, an example of a form in which the correction control portion 76 is not incorporated in the imaging element will be described. Hereinafter, the same constituents as the first embodiment will be designated by the same reference signs and will not be described.

Figure 27:
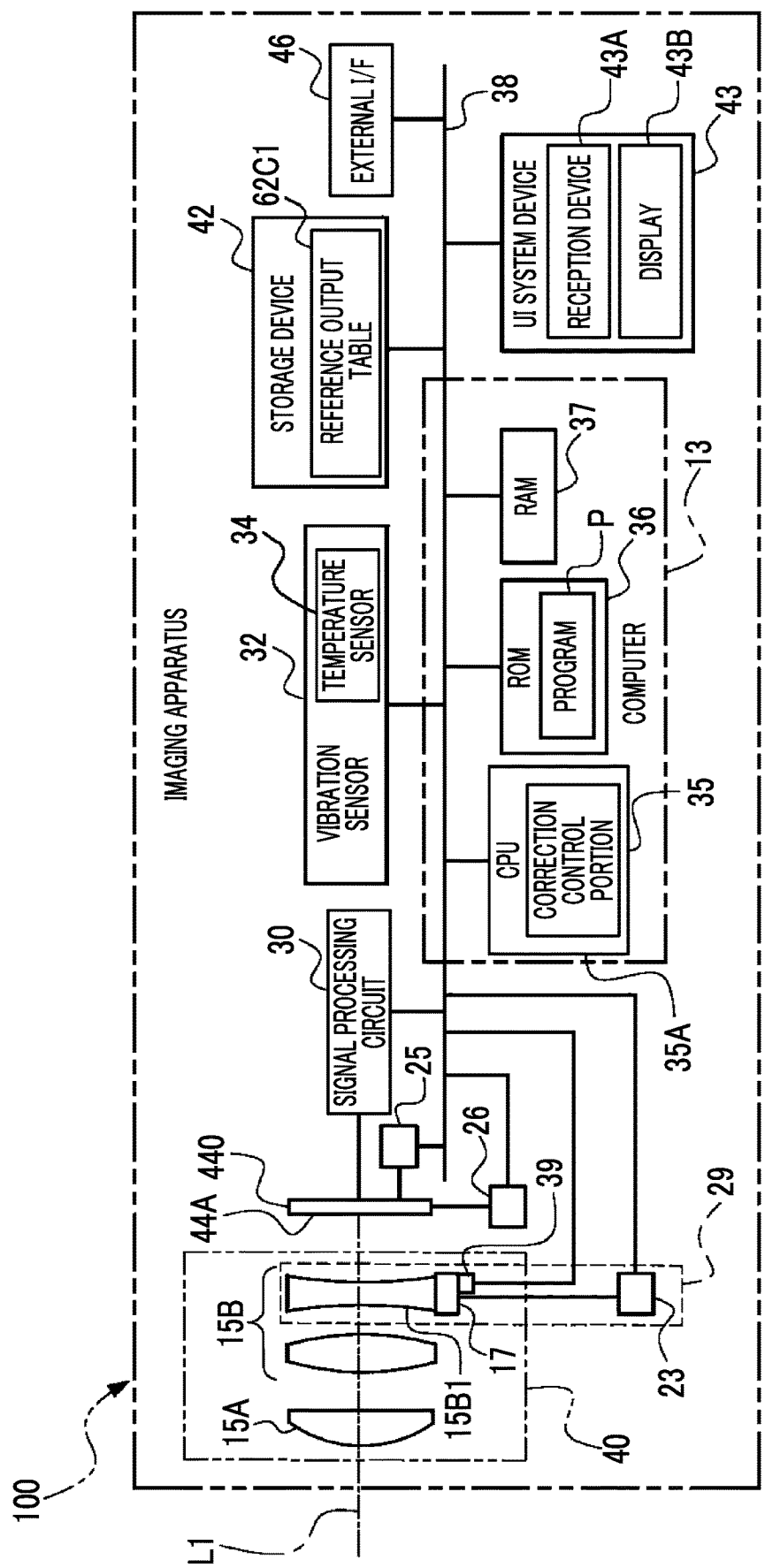
FIG. 27 is a block diagram illustrating an example of a configuration of the imaging apparatus according to the second embodiment.

As illustrated in FIG. 27 as an example, an imaging apparatus 100 of the second embodiment according to the technology of the present disclosure is different from the imaging apparatus 10 of the first embodiment in that an imaging element 440 is included instead of the imaging element 44. In addition, the imaging apparatus 100 is different from the imaging apparatus 10 in that the CPU 35 that is a rear stage circuit of the imaging element 440 operates as a correction control portion 35A. Furthermore, the imaging apparatus 100 is different from the imaging apparatus 10 in that the reference output table 62C1 is stored in the storage device 42.

The ROM 36 stores a program P. The CPU 35 operates as the correction control portion 35A by reading out the program P from the ROM 36, loading the program P into the RAM 37, and executing the loaded program P. The correction control portion 35A has the same function as the correction control portion 76 described in the first embodiment. Accordingly, the correction control portion 35A updates the reference output table 62C1 stored in the storage device 42 and acquires the used reference output level from the reference output table 62C1.

Figure 28:
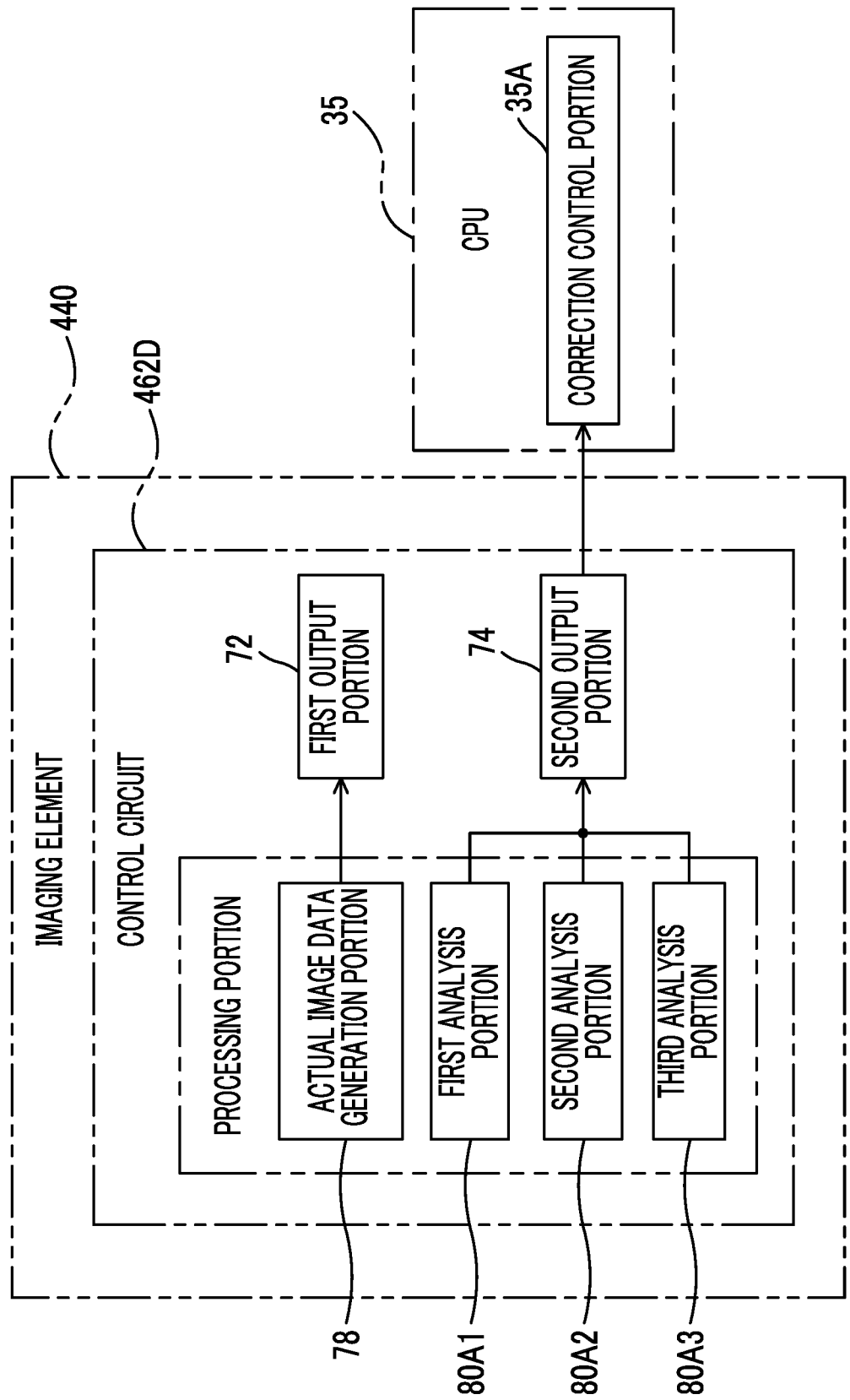
FIG. 28 is a block diagram illustrating an example of a relationship between the imaging element according to the second embodiment and the CPU.

As illustrated in FIG. 28 as an example, the imaging element 440 is different from the imaging element 44 in that a control circuit 462D is included instead of the control circuit 62D. The control circuit 462D is different from the control circuit 62D in that the correction control portion 76 is not included. The second output portion 74 outputs the shake degree information to the correction control portion 35A of the CPU 35.

In such a manner, in the imaging apparatus 100, the CPU 35 which is the rear stage circuit of the imaging element 440 operates as the correction control portion 35A without disposing the correction control portion 76 in the imaging element 440. Accordingly, a processing load for the imaging element 440 can be reduced, compared to the imaging element 44 of the first embodiment.

In addition, in the imaging apparatus 100, in the same manner as the first embodiment, the reference output level is changed in accordance with the shake degree information by the correction control portion 35A. The control for causing the optical shake correction portion 29 to correct the shake is performed by the correction control portion 35A based on the vibration data and the reference output level after change. Accordingly, correction accuracy of the shake can be increased, compared to a case where the reference output level is fixed.

In addition, even in the imaging apparatus 100, in the same manner as the first embodiment, the changed amount of the reference output level is restricted within a range of which an upper limit is the number of thinned pixels. Accordingly, visual perception of a change in reference output level can be suppressed, compared to a case where the reference output level is changed without restriction.

In addition, even in the imaging apparatus 100, in the same manner as the first embodiment, each of the first analysis image data 69B2b, the second analysis image data 69B2c, and the third analysis image data 69B2d is image data that is obtained by reflecting the reference output level after change on correction of the shake by the optical shake correction portion 29 each time the reference output level is changed. Accordingly, the shake degree information having high accuracy can be derived, compared to a case where the shake degree information is derived by analyzing image data obtained by reflecting the fixed reference output level on correction of the shake by the optical shake correction portion 29.

In addition, while an example of a form of implementing the processing circuit 62 by the device including the ASIC and the FPGA is illustratively described in each of the embodiments, the technology of the present disclosure is not limited thereto. For example, the phase difference pixel processing, the non-phase difference pixel processing, the actual image data generation portion processing, the N-th analysis image data acquisition processing, the N-th analysis portion processing, and the correction control portion processing (hereinafter, referred to as "in-imaging apparatus processing" unless otherwise necessary to distinguish therebetween) may be implemented by a software configuration using a computer. The in-imaging apparatus processing is an example of a "specific type of processing" according to the embodiments of the technology of the present disclosure.

Figure 29:
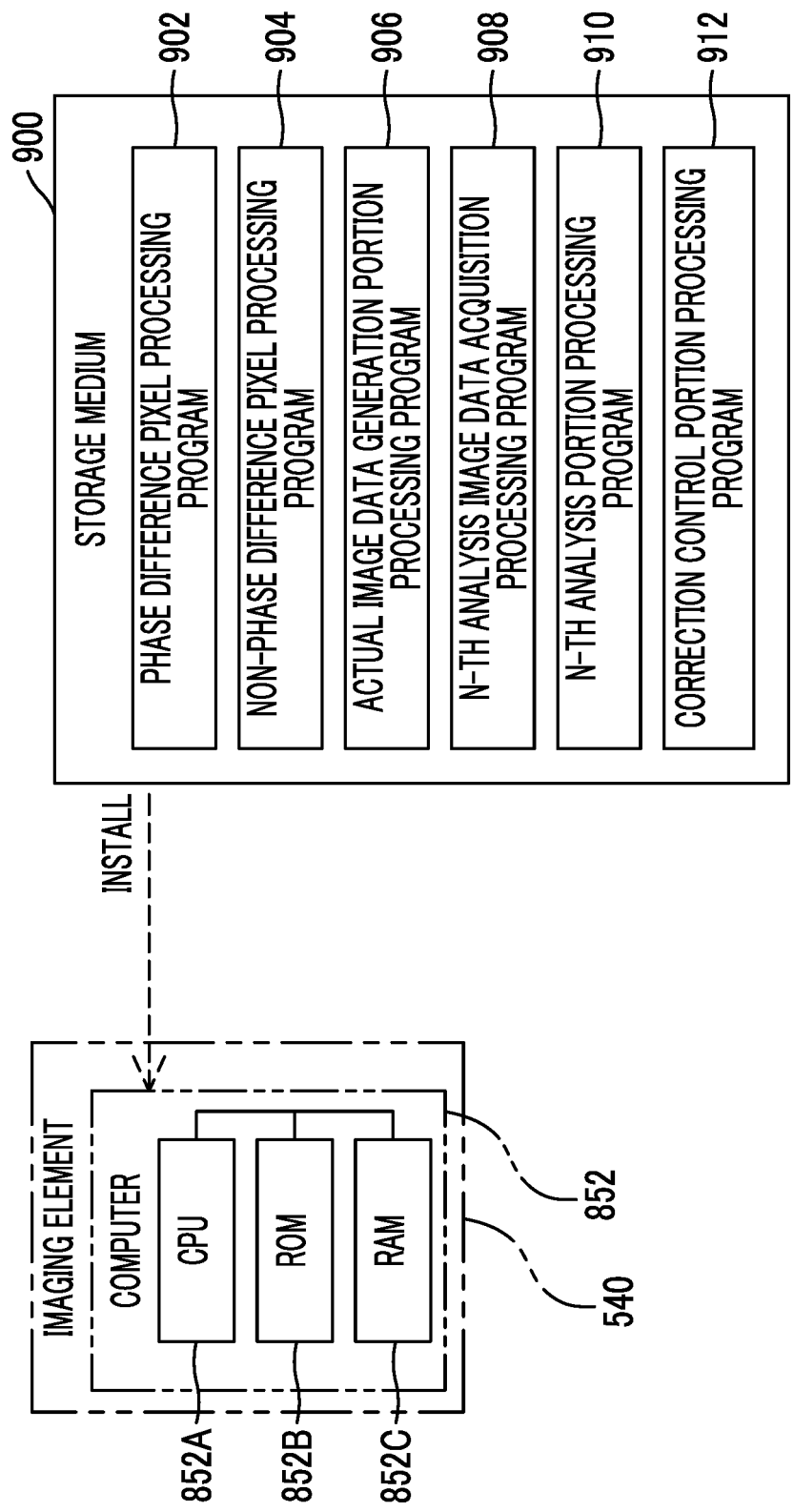
FIG. 29 is a conceptual diagram illustrating an example of an aspect in which various programs are installed on a computer in the imaging element from a storage medium storing the various programs.

In this case, for example, as illustrated in FIG. 29, various programs causing a computer 852 incorporated in an imaging element 540 to execute the in-imaging apparatus processing are stored in a storage medium 900.

The various programs refer to a phase difference pixel processing program 902, a non-phase difference pixel processing program 904, an actual image data generation portion processing program 906, an N-th analysis image data acquisition processing program 908, an N-th analysis portion processing program 910, and a correction control portion processing program 912. The phase difference pixel processing program 902 is a program causing the computer 852 to execute the phase difference pixel processing. The various programs are an example of a "program" according to the embodiments of the technology of the present disclosure. The non-phase difference pixel processing program 904 is a program causing the computer 852 to execute the non-phase difference pixel processing. The actual image data generation portion processing program 906 is a program causing the computer 852 to execute the actual image data generation portion processing. The N-th analysis image data acquisition processing program 908 is a program causing the computer 852 to execute the N-th analysis image data acquisition processing. The N-th analysis portion processing program 910 is a program causing the computer 852 to execute the N-th analysis portion processing. The correction control portion processing program 912 is a program causing the computer 852 to execute the correction control portion processing.

As illustrated in FIG. 29 as an example, the computer 852 is an example of a "computer" according to the embodiments of the technology of the present disclosure and comprises a CPU 852A, a ROM 852B, and a RAM 852C. The various programs stored in the storage medium 900 are installed on the computer 852. The CPU 852A executes the in-imaging apparatus processing in accordance with the various programs.

While a single CPU is illustrated as the CPU 852A here, the technology of the present disclosure is not limited thereto. A GPU may be used, or a plurality of CPUs may be employed instead of the CPU 852A. The storage medium 900 is a non-temporary storage medium. Any portable storage medium such as an SSD or a USB memory is exemplified as an example of the storage medium 900.

While the various programs are stored in the storage medium 900 in the example illustrated in FIG. 29, the technology of the present disclosure is not limited thereto. For example, the various programs may be stored in advance in the ROM 852B, and the CPU 852A may read out the various programs from the ROM 852B, load the various programs into the RAM 852C, and execute the loaded various programs.

In addition, the various programs may be stored in a storage portion of another computer, a server apparatus, or the like connected to the computer 852 through a communication network (not illustrated), and the various programs may be downloaded to the computer 852 in response to a request from the imaging apparatus 10. In this case, the downloaded various programs are executed by the CPU 852A of the computer 852.

In addition, the computer 852 may be disposed on an outside of the imaging element 44. In this case, the computer 852 may control the processing circuit 62 in accordance with the various programs.

Various processors illustrated below can be used as a hardware resource for executing the in-imaging apparatus processing. For example, as described above, a CPU that is a general-purpose processor functioning as the hardware resource for executing the in-imaging apparatus processing by executing software, that is, the programs, is exemplified as a processor. In addition, a dedicated electric circuit such as an FPGA, a PLD, or an ASIC that is a processor having a circuit configuration dedicatedly designed to execute a specific type of processing is exemplified as a processor.

The hardware resource for executing the in-imaging apparatus processing may be configured with one of those various processors or may be configured with a combination of two or more processors of the same type or different types (for example, a combination of a plurality of FPGAs or a combination of a CPU and an FPGA). In addition, the hardware resource for executing the in-imaging apparatus processing may be one processor.

As an example of a configuration with one processor, first, as represented by a computer such as a client and a server, a form in which one processor is configured with a combination of one or more CPUs and software, and in which this processor functions as a hardware resource for executing in-imaging apparatus processing is available. Second, as represented by an SoC or the like, a form of using a processor that implements, by one IC chip, a function of the entire system including a plurality of hardware resources for executing the in-imaging apparatus processing is available. In such a manner, the in-imaging apparatus processing is implemented using one or more of the various processors as the hardware resource.

Furthermore, as a hardware structure of those various processors, more specifically, an electric circuit in which circuit elements such as semiconductor elements are combined can be used.

Figure 30:
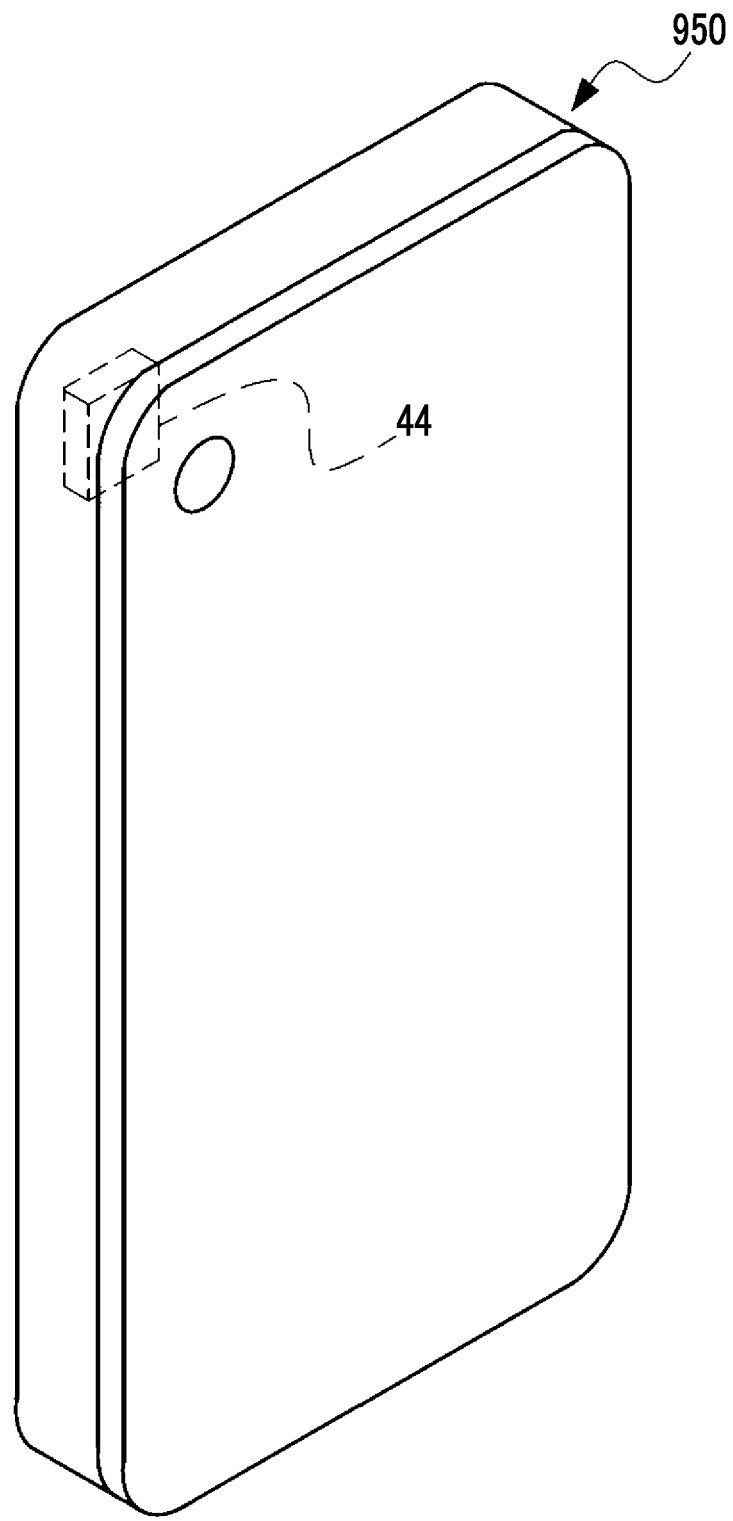
FIG. 30 is a block diagram illustrating an example of a schematic configuration of a smart device incorporating the imaging element according to the first or second embodiment.

While an interchangeable lens camera is illustrated as the imaging apparatus 10 in each of the embodiments, the technology of the present disclosure is not limited thereto. For example, the technology of the present disclosure may be applied to a smart device 950 illustrated in FIG. 30. The smart device 950 illustrated in FIG. 30 as an example is an example of the imaging apparatus according to the embodiments of the technology of the present disclosure. The imaging element 44 (440) is mounted in the smart device 950. Even with the smart device 950 configured in such a manner, the same actions and effects as the imaging apparatuses 10 and 100 described in each of the embodiments are obtained. The technology of the present disclosure can be applied to not only the smart device 950 but also a personal computer or a wearable terminal apparatus.

In addition, while the display 43B is illustrated in each of the embodiments, the technology of the present disclosure is not limited thereto. For example, a separate display that is retrofit into the imaging apparatus main body 12 may be used as the "display device" according to the embodiments of the technology of the present disclosure.

In addition, the various types of processing are merely an example. Accordingly, unnecessary steps may be deleted, new steps may be added, or a processing order may be rearranged without departing from a gist of the technology of the present disclosure.

Above described contents and illustrated contents are detailed description for parts according to the embodiments of the technology of the present disclosure and are merely an example of the technology of the present disclosure. For example, description related to the above configurations, functions, actions, and effects is description related to an example of configurations, functions, actions, and effects of the parts according to the embodiments of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiments of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

The following appendices are further disclosed with respect to the embodiments.

(Appendix 1)

An imaging element incorporating a memory, and a processor, in which the memory stores image data obtained by performing imaging at a first frame rate, and the processor is configured to process the image data, output the processed image data at a second frame rate that is a frame rate less than the first frame rate, derive shake degree information indicating a degree of shake included in an image indicated by the image data, using the image data stored in the memory, and output the derived shake degree information at a rate greater than or equal to the second frame rate.

What is claimed is:

1. An imaging element comprising:
a processor; and
a memory that is incorporated in or connected to the processor,
wherein the memory stores image data obtained by performing imaging at a first frame rate,
the processor is configured to:
acquire the stored image data from the memory,
then process the acquired image data to convert the acquired image data to processed image data at a second frame rate, output the processed image data having the second frame rate,
derive shake degree information indicating a degree of shake included in an image indicated by the image data, using the image data, and
output the derived shake degree information at a rate greater than or equal to the second frame rate, and
the first frame rate is a frame rate greater than or equal to the second frame rate.

2. The imaging element according to claim 1, wherein a resolution of the image data used by the processor is higher than a resolution of the image data output by the processor.

3. The imaging element according to claim 1, wherein a resolution of the image data used by the processor is a maximum resolution.

4. The imaging element according to claim 1, wherein the image data used by the processor is partial image data indicating a partial image.

5. The imaging element according to claim 4, further comprising:
a photosensitive pixel group,
wherein the partial image data is image data obtained from a region of the photosensitive pixel group in which a focused state is set.

6. The imaging element according to claim 5, wherein the region in which the focused state is set is a region in which the focused state is continuously maintained in an operation mode in which the focused state is continuously maintained.

7. The imaging element according to claim 5, wherein the photosensitive pixel group includes a plurality of phase difference pixels, and
the region in which the focused state is set is specified by the processor from the photosensitive pixel group based on pixel data of a phase difference pixel of at least a part of the plurality of phase difference pixels.

8. The imaging element according to claim 1, wherein the image data is time series data obtained by performing imaging at the first frame rate.

9. The imaging element according to claim 8, wherein first frame data related to a part of frames of the time series data is output by the processor, and second frame data related to the remaining frames is used for deriving the shake degree information by the processor.

10. The imaging element according to claim 9, wherein the second frame data is frame data indicating a plurality of frames, and
the processor is configured to derive the shake degree information for each periodically determined frame based on the second frame data.

11. The imaging element according to claim 10, wherein the periodically determined frames are frames determined at a time interval that is longer than a period defined by the first frame rate and less than or equal to a period defined by the second frame rate.

12. The imaging element according to claim 1, wherein at least a photoelectric conversion element and the memory are formed in one chip.

13. The imaging element according to claim 12, wherein the imaging element is a laminated imaging element in which the photoelectric conversion element is laminated with the memory.

14. An imaging apparatus comprising:
the imaging element according to claim 1;
a vibration sensor that detects an exerted vibration; and
a correction device that corrects the shake based on vibration data output from the vibration sensor and the shake degree information output from the processor.

15. The imaging apparatus according to claim 14, wherein the processor is configured to derive the shake degree information based on the image data in which the shake is corrected by the correction device,
the imaging apparatus further includes a rear stage circuit that receives the shake degree information output from the processor,
the rear stage circuit performs a control for causing the correction device to correct the shake, using the vibration data and a reference output level of the vibration sensor, and
the rear stage circuit changes the reference output level in accordance with the shake degree information output from the processor.

16. The imaging apparatus according to claim 14, wherein the processor is configured to derive the shake degree information based on the image data in which the shake is corrected by the correction device,
the imaging element further includes a correction control circuit that performs the control for causing the correction device to correct the shake, using the vibration data and the reference output level of the vibration sensor, and
the correction control circuit changes the reference output level in accordance with the shake degree information output from the processor.

17. The imaging apparatus according to claim 15, wherein a changed amount of the reference output level is restricted within a range that does not exceed a degree of reduction of the number of pixels of the image data used by the processor.

18. The imaging apparatus according to claim 15, wherein the image data is time series data obtained by performing imaging at the first frame rate,
first frame data related to a part of frames of the time series data is output by the processor,
second frame data related to the remaining frames of the time series data is frame data indicating a plurality of frames and is used for deriving the shake degree information by the processor for each periodically determined frame, and
the plurality of frames are frames that are obtained by reflecting the reference output level after change on correction of the shake by the correction device each time the reference output level is changed.

19. The imaging apparatus according to claim 14, wherein the correction device optically corrects the shake.

20. The imaging apparatus according to claim 14, further comprising:
a control processor configured to perform at least one of a control for storing the image data output from the processor in a storage device or a control for displaying an image based on the image data output from the processor on a display device.

21. An operation method of an imaging element incorporating a memory that stores image data obtained by performing imaging at a first frame rate, and a processor configured to process the image data and output the processed image data at a second frame rate, the operation method comprising:
acquiring the stored image data from the memory;
then processing the acquired image data to convert the acquired image data to processed image data having the second frame rate;

outputting the processed image data at the second frame rate;

deriving shake degree information indicating a degree of shake included in an image indicated by the image data, using the image data; and outputting the derived shake degree information at a rate greater than or equal to the second frame rate, wherein the first frame rate is a frame rate greater than or equal to the second frame rate.

22. A non-transitory computer-readable storage medium storing a program for causing a computer to execute a specific type of processing, the computer being applied to an imaging element incorporating a memory that stores image data obtained by performing imaging at a first frame rate, and a processor configured to process the image data and output the processed image data at a second frame rate, wherein the specific type of processing includes:
acquiring the image data from the memory;
then processing the acquired image data to convert the acquired image data to processed image data having the second frame rate;
outputting the processed image data at the second frame rate;
deriving shake degree information indicating a degree of shake included in an image indicated by the image data, using the image data, and
outputting the derived shake degree information at a rate greater than or equal to the second frame rate, and the first frame rate is a frame rate greater than or equal to the second frame rate.

* * * * *